United States Patent
Sakamoto et al.

(10) Patent No.: US 7,562,127 B2
(45) Date of Patent: Jul. 14, 2009

(54) CONTENTS ADDITIONAL SERVICE INQUIRY SERVER FOR IDENTIFYING SERVERS PROVIDING ADDITIONAL SERVICES AND DISTINGUISHING BETWEEN SERVERS

(75) Inventors: Hideki Sakamoto, Tokyo (JP); Hiroshi Fujii, Kanagawa-ken (JP); Sachiko Irie, Kanagawa-ken (JP); Hiroyuki Yamashita, Kanagawa-ken (JP); Tsukasa Kimura, Kanagawa-ken (JP)

(73) Assignee: Nippon Telegraph and Telephone Corporation (JP)

( * ) Notice: Subject to any disclaimer, the term of this patent is extended or adjusted under 35 U.S.C. 154(b) by 535 days.

(21) Appl. No.: 10/114,570

(22) Filed: Apr. 2, 2002

(65) Prior Publication Data

US 2003/0065747 A1 Apr. 3, 2003

(30) Foreign Application Priority Data

Apr. 3, 2001 (JP) ............................. 2001-104198

(51) Int. Cl.
*G06F 15/16* (2006.01)
(52) U.S. Cl. ................. 709/219; 709/203; 709/223; 709/225; 709/228; 709/229; 709/246; 709/247; 707/10; 705/59
(58) Field of Classification Search ................. 709/217, 709/204, 223, 219, 203, 228, 229, 225, 246, 709/247; 705/59; 707/10
See application file for complete search history.

(56) References Cited

U.S. PATENT DOCUMENTS

| 5,841,978 | A | 11/1998 | Rhoads |
| 6,122,403 | A | 9/2000 | Rhoads |
| 6,625,605 | B1 * | 9/2003 | Terakura et al. ............... 707/10 |
| 6,708,166 | B1 * | 3/2004 | Dysart et al. .................... 707/6 |
| 7,143,162 | B2 * | 11/2006 | Takayama ..................... 709/224 |
| 7,165,069 | B1 * | 1/2007 | Kahle et al. ..................... 707/10 |
| 7,167,841 | B2 * | 1/2007 | Hatano et al. .................. 705/56 |
| 7,200,575 | B2 * | 4/2007 | Hans et al. ..................... 705/59 |
| 2001/0044800 | A1 * | 11/2001 | Han ........................ 707/104.1 |
| 2001/0054064 | A1 * | 12/2001 | Kannan ....................... 709/203 |
| 2001/0056468 | A1 * | 12/2001 | Okayasu et al. ............. 709/204 |
| 2002/0032776 | A1 * | 3/2002 | Hasegawa et al. ........... 709/225 |
| 2002/0033844 | A1 * | 3/2002 | Levy et al. .................... 345/744 |
| 2002/0037091 | A1 * | 3/2002 | Terasaki ...................... 382/100 |
| 2002/0049580 | A1 * | 4/2002 | Kutaragi et al. ................ 704/1 |
| 2002/0052913 | A1 * | 5/2002 | Yamada et al. .............. 709/202 |
| 2002/0073058 | A1 * | 6/2002 | Kremer et al. .................. 707/1 |
| 2002/0073214 | A1 * | 6/2002 | Iinuma ........................ 709/229 |

(Continued)

*Primary Examiner*—Alina N. Boutah
(74) *Attorney, Agent, or Firm*—Kilpatrick Stockton LLP

(57) ABSTRACT

A contents additional services inquiry server for receiving inquiries for additional services provided by a contents center and a third-party contents additional services providing server, wherein a registration request specifies a contents identifier uniquely identifying contents, and requests registration of registration request information including each additional service information regarding service that can be provided with respect to the contents having the contents identifier and provider location information regarding a location of a respective provider of each additional service. Registration request information registered by the contents center and registration request information registered by the third-party contents additional service providing server are separately stored. The registration request information specified by the contents identifier is searched and returned when there is a request for the additional service, where registration request information registered by the contents center and registration request information registered by the third-party contents additional service providing server are separately presented.

18 Claims, 39 Drawing Sheets

U.S. PATENT DOCUMENTS

| | | | |
|---|---|---|---|
| 2002/0077988 A1* | 6/2002 | Sasaki et al. | 705/59 |
| 2002/0078239 A1* | 6/2002 | Howard et al. | 709/245 |
| 2002/0091592 A1* | 7/2002 | Sugiura et al. | 705/28 |
| 2002/0107718 A1* | 8/2002 | Morrill et al. | 705/10 |
| 2002/0116293 A1* | 8/2002 | Lao et al. | 705/27 |
| 2002/0124077 A1* | 9/2002 | Hill et al. | 709/224 |
| 2002/0141584 A1* | 10/2002 | Razdan et al. | 380/203 |
| 2003/0018792 A1* | 1/2003 | Shiouchi et al. | 709/229 |
| 2003/0018978 A1* | 1/2003 | Singal et al. | 725/115 |
| 2003/0135464 A1* | 7/2003 | Mourad et al. | 705/50 |
| 2005/0091268 A1* | 4/2005 | Meyer et al. | 707/103 R |
| 2006/0190358 A1* | 8/2006 | Slik | 705/27 |
| 2007/0061313 A1* | 3/2007 | Kahle et al. | 707/3 |
| 2007/0266252 A1* | 11/2007 | Davis et al. | 713/176 |

* cited by examiner

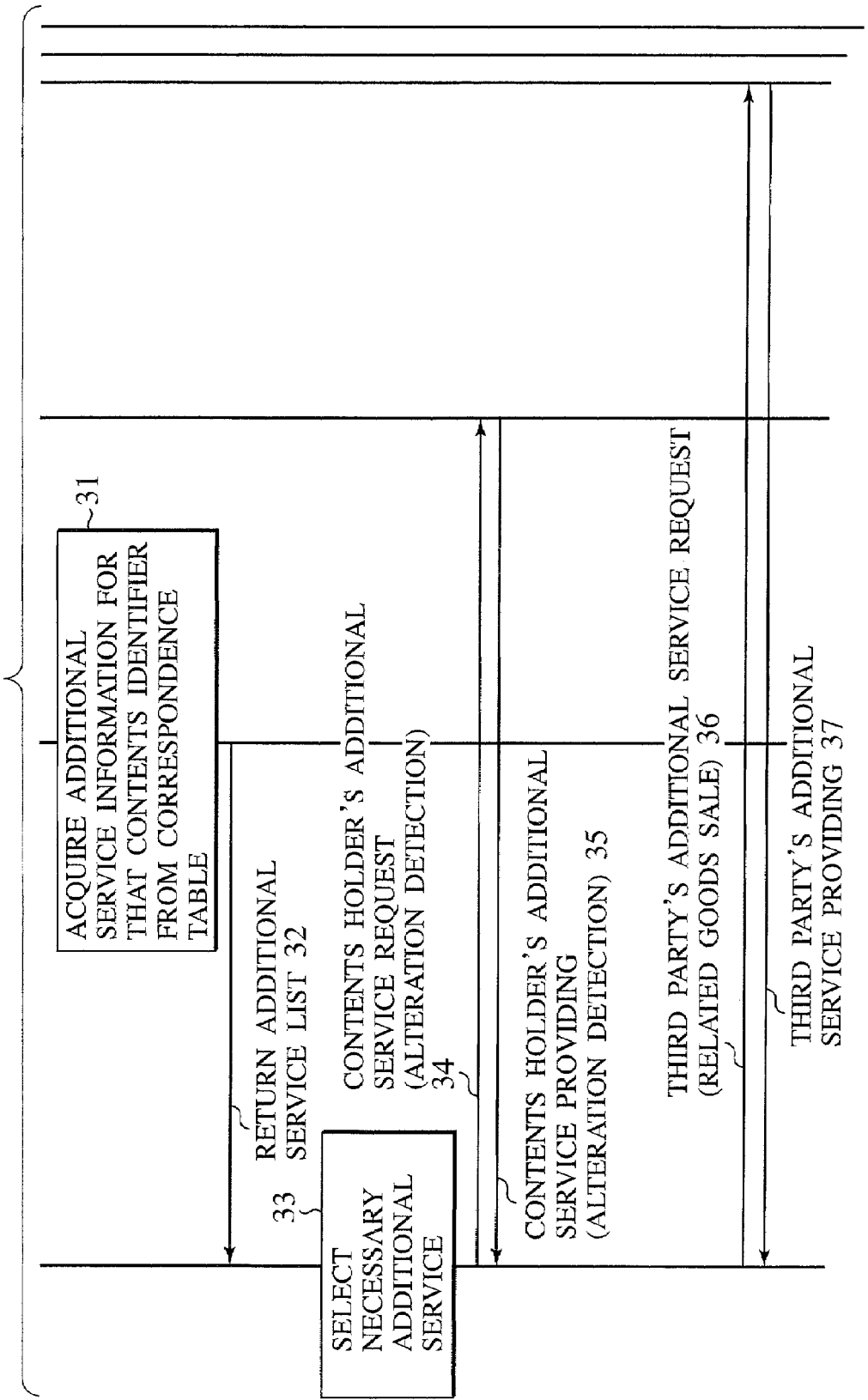

FIG.3

| CONTENTS IDENTIFIER | ADDITIONAL SERVICE PROVIDER | ADDITIONAL SERVICE TYPE | LOCATION |
|---|---|---|---|
| 123 | CONTENTS CENTER | ATTRIBUTE INFORMATION READING | 184.34.34.33 |
| | CONTENTS CENTER | ALTERATION DETECTION | 184.34.34.33 |
| | THIRD PARTY | RELATED GOODS SALE | 129.60.40.20 |
| | THIRD PARTY | SECONDARY USE APPROVAL PROXY | 123.22.11.23 |
| 124 | CONTENTS CENTER | ATTRIBUTE INFORMATION READING | 184.34.34.33 |
| | CONTENTS CENTER | ORIGINAL DOWNLOADING | http://www.holder.com/124 |
| | THIRD PARTY | CONTENTS UTILIZATION LOG DISPLAY | 129.60.40.20 |
| | THIRD PARTY | RELATED CONTENTS RECOMMENDATION | 123.22.11.23 |
| ...... | ...... | | |

LIST OF ADDITIONAL SERVICES BY CONTENTS HOLDER
41

CONTENTS DISPLAY UNIT
40

ADDITIONAL SERVICES BY CONTENTS HOLDER (1) ATTRIBUTE INFORMATION READING
(2) ALTERATION DETECTION

ADDITIONAL SERVICES BY THIRD PARTY (1) RELATED GOODS SALE
(2) SECONDARY USE APPROVAL PROXY

CONTENTS IDENTIFIER=123

LIST OF ADDITIONAL SERVICES BY THIRD PARTY
42

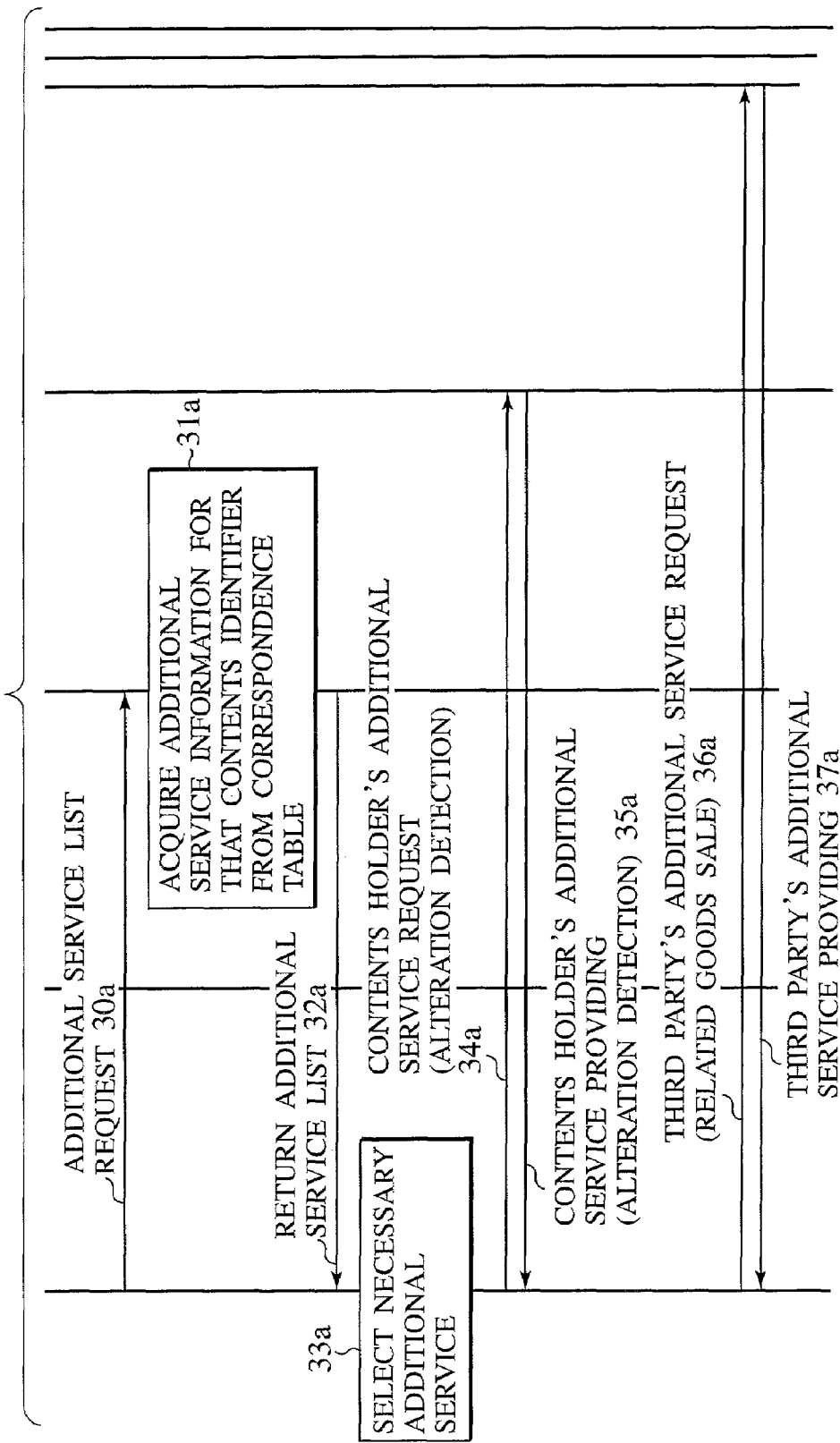

FIG.6

| CONTENTS IDENTIFIER | CONTENTS ADDITIONAL SERVICE INQUIRY SERVER |
|---|---|
| 123 | 192. 30. 32. 10 |
| 231 | 234. 10. 40. 22 |
| 232 | www.SG.com |
| 254 | www.SG.com |
| ...... | ...... |

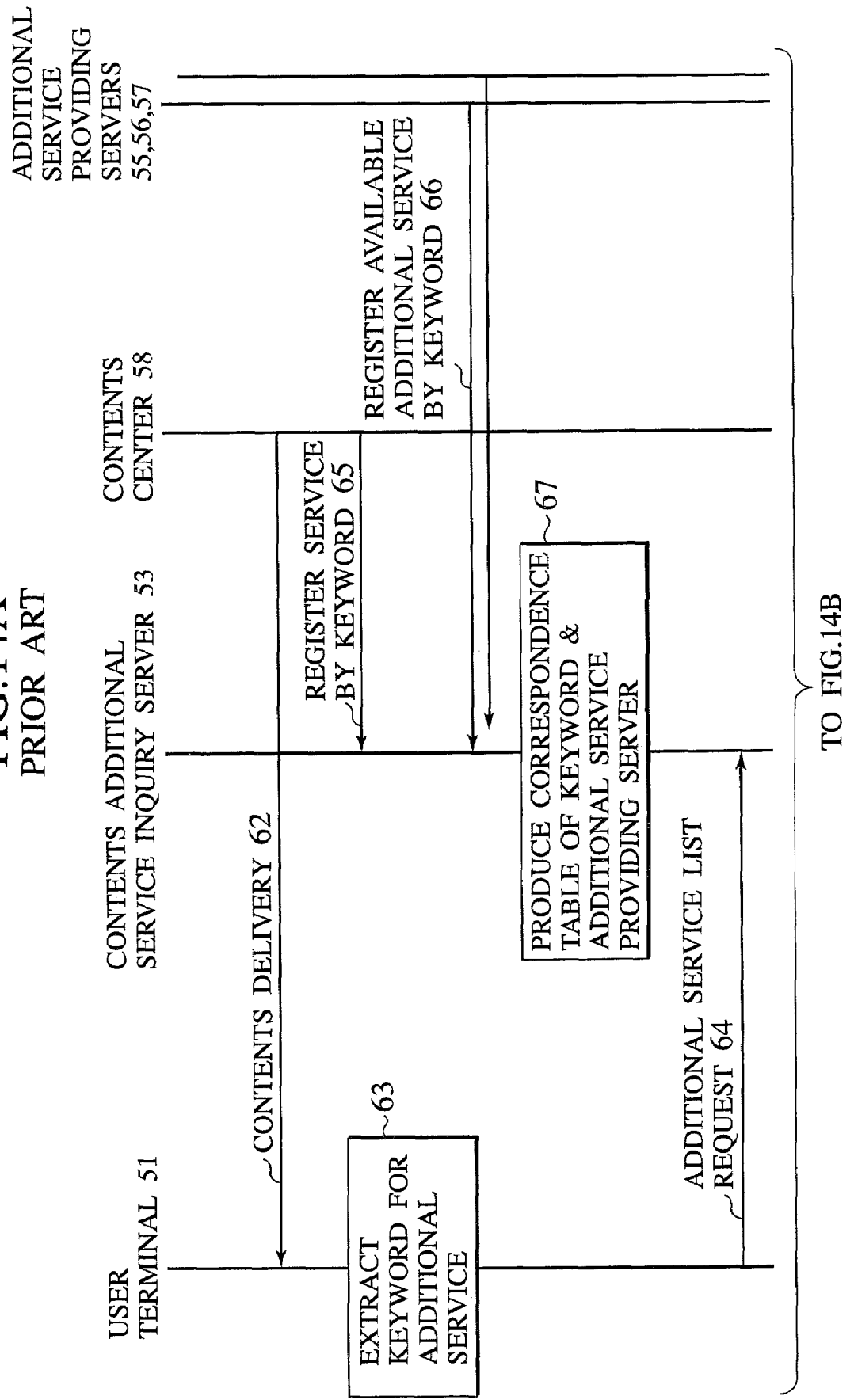

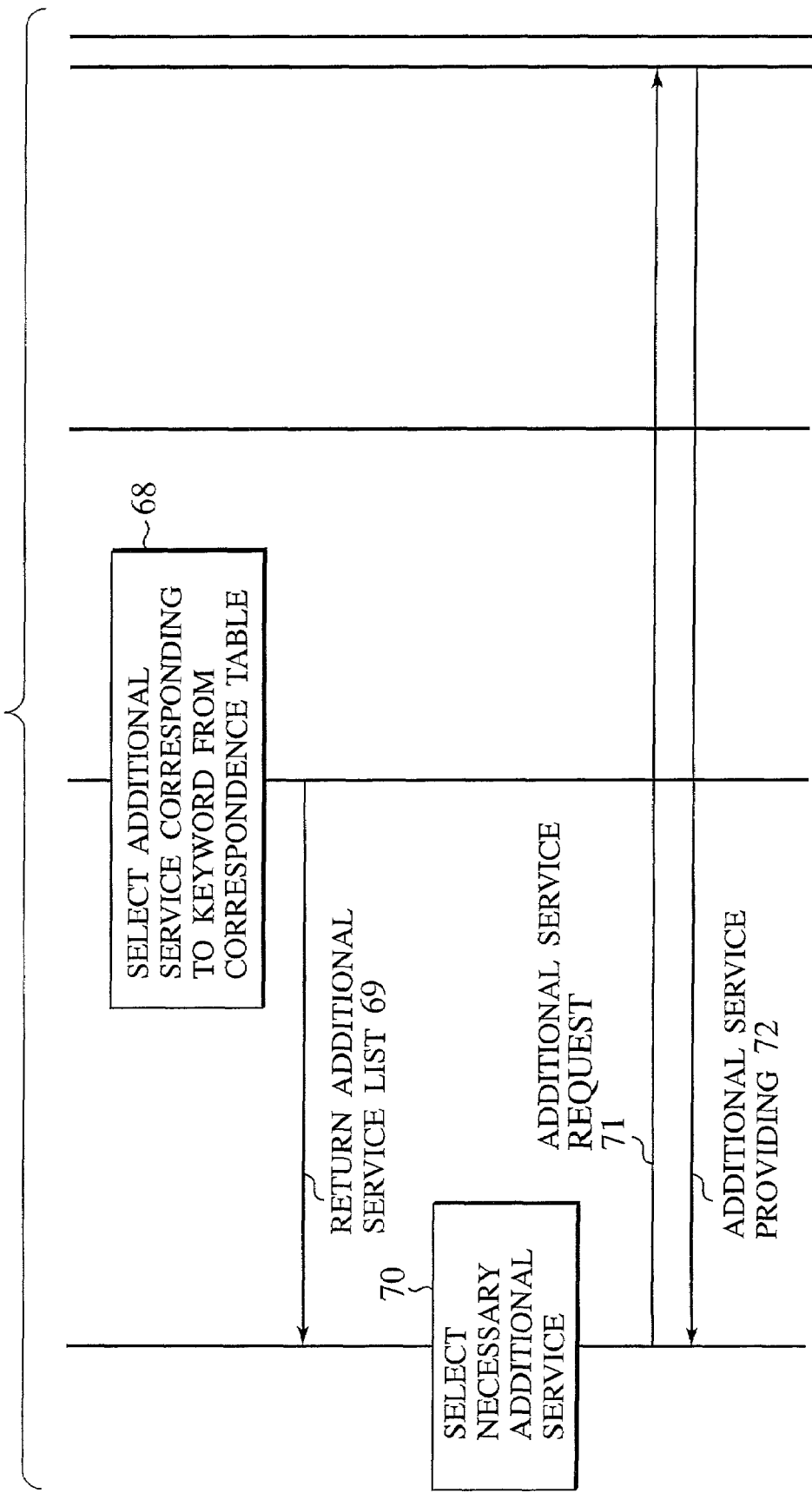

FIG.16

|  | (a) CASE WHERE CONTENTS ADDITIONAL SERVICE INQUIRY SERVER CAN HAVE SAME THINGS AS CONTENTS CENTER | (b) CASE WHERE CONTENTS ADDITIONAL SERVICE INQUIRY SERVER CAN ONLY HAVE CALCULATION RESULTS |
|---|---|---|
| (1) AUTHENTICATION UTILIZING FACT THAT ONLY CONTENTS CENTER HAS BOTH "ORIGINAL OF CONTENTS" & "IDENTIFIER EMBEDDING MEANS" | (1a) | (1b) |
| (2) AUTHENTICATION UTILIZING FACT THAT ONLY CONTENTS CENTER HAS "ORIGINAL OF CONTENTS" | (2a) | (2b) |
| (3) AUTHENTICATION UTILIZING FACT THAT ONLY CONTENTS CENTER HAS "IDENTIFIER EMBEDDING MEANS" | (3a) | (3b) |

FIG.23

| WATERMARK INTENSITY | WATERMARK BASIC PATTERN SIZE | READ OUT KEY | FILE NAME OF WATERMARK EMBEDDED CONTENTS |
|---|---|---|---|
| 1 | 128×128 | 0022 | 1111.wm |
| 2 | 129×129 | Ff50 | 1112.wm |
| 3 | 130×130 | 4400 | 1113.wm |
| 4 | 256×256 | 2222 | 1114.wm |
| 5 | 1024×1024 | 1232 | 1115.wm |

FIG.36

| WATERMARK INTENSITY | WATERMARK BASIC PATTERN SIZE | READ OUT KEY | FILE NAME OF SAMPLE CONTENTS |
|---|---|---|---|
| 1 | 128×128 | 0022 | 1111.sam |
| 2 | 129×129 | Ff50 | 1112.sam |
| 3 | 130×130 | 4400 | 1113.sam |
| 4 | 256×256 | 2222 | 1114.sam |
| 5 | 1024×1024 | 1232 | 1115.sam |

CONTENTS ADDITIONAL SERVICE INQUIRY SERVER FOR IDENTIFYING SERVERS PROVIDING ADDITIONAL SERVICES AND DISTINGUISHING BETWEEN SERVERS

BACKGROUND OF THE INVENTION

1. Field of the Invention

The present invention relates to a contents additional service inquiry server for inquiring additional services of contents with respect to user terminals, and a contents additional service providing system using that contents additional service inquiry server.

2. Description of the Related Art

Only one contents identifier is assigned to each contents so that the system utilizing the contents identifier can be considered as providing a function of the so called "census registration database" with respect to the contents which provides the only reliable meta data regarding the contents authorized by the contents holder.

However, from a viewpoint of the contents user side, this alone is insufficient. In addition, it is indispensable to provide a mechanism for ascertaining the information regarding the utilization method of the contents, i.e., what additional services (services such as acquisition of an original of the contents, attribute inquiry, contents alteration detection, checking of an identity of the contents provider, secondary utilization permission negotiation agency, for example) related to that contents can be received, and a mechanism for selecting the related service according to the need.

FIG. 13 shows a configuration of a conventional realization system and FIGS. 14A and 14B show a conventional processing sequence chart.

In FIG. 13, 51 is a user terminal, 52 is a network such as the Internet, 53 is a contents additional service inquiry server (service gateway) for carrying out the inquiry of the additional service providing servers, 54 is a correspondence table for describing a correspondence relationship of keywords and available additional service providing servers, 55 to 57 are additional service providing servers, 58 is a contents center for providing contents and providing additional services, and 59 and 60 are contents.

The contents center 58 for providing the contents is usually operated either directly by a contents holder who has the copyright of the contents or by a party who is entrusted from that contents holder.

The contents holder 58 provides a formal attribute inquiry service (for displaying a title, a creator, a creation date, etc.) as the copyright holder, an alteration detection service, an original data downloading service, a contents provider identity checking service, etc., with respect to the contents provided by that center.

On the other hand, the additional service providing servers 55 to 57 are servers operated by third parties who are not directly related to the copyright holders, for providing additional services that can be operated without having the copyright such as a contents secondary utilization permission negotiation agent service, a contents related product sale, etc.

Next, according to FIGS. 14A and 14B, the conventional processing sequence with such a configuration will be described.

In the conventional contents additional service providing of this type, first the user obtains the contents 59 from the contents center 58 (procedure 62). Then, the user first associates a keyword from that obtained contents 60 (59) (procedure 63).

Then, the user makes a connection from the user terminal 51 through the network 52 to the contents additional service inquiry server 53, and requests an additional service search by using the keyword associated from the above described obtained contents 60 (procedure 64).

Here, this keyword to be specified by the user can be one that indicates a type of the service such as "attribute search"/ "acquisition of original"/"right management proxy", etc., or one that indicates a type of contents such as "Mt. Fuji"/"a picture of the sea", etc.

On the other hand, the contents center 58 and the additional service providing servers 55 to 57 register the keyword of the additional service provided by the own server into the contents additional service inquiry server 53 in advance (procedures 65 and 66). This keyword on the additional service providing server side is also similar to the above described keyword to be specified by the user.

The contents additional service inquiry server 53 produces the correspondence table 54 for describing the correspondence relationship of the registered keywords and the additional services (procedure 67). Then, the contents additional service inquiry server 53 obtains the information of the additional service registered in the above described correspondence table 54 in response to the additional service inquiry request from the user (procedure 68), and returns the corresponding additional service list to the user (procedure 69).

The user terminal 51 selects the necessary additional service according to that returned additional service list (procedure 70), and this time makes the additional service request to the additional service providing server 56 or the like (procedure 71).

At this point, suppose that the selected additional service is the attribute information displaying, for example. The providing of the service from the additional service providing server 56 is started (procedure 72).

The conventional system for searching the additional service for the contents has been such that the keyword associated from the contents 60 obtained by the user and the keyword associated to the own additional service by the service provider are matched at the contents additional service inquiry server 53. For this reason, the following two problems arise.

The first problem is that it is very difficult to find the available additional service uniquely for the contents possessed by the user because it is a search based on an ambiguous parameter in a form of the keyword.

In the case of the directory service for searching a desired home page on the Internet, the search using a free keyword has a possibility of providing a list of pages that are not intended as the specified keyword is taken for a different meaning, or of providing too many candidates to be narrowed down one by one manually because the keyword is too ambiguous. Moreover, as can be easily guessed from the case of associating the keyword to the 2 hour long movie, for example, the keyword association with respect to the contents contains even more ambiguity than the Web pages.

On the other hand, from a viewpoint of the additional service providing service side, it is impossible to judge whether the additional service with respect to that contents can be provided or not unless the contents owned by the user are accurately identified. Consequently, the keyword association at the additional service providing server side is also not unique.

As described, in the prior art, the means capable of uniquely identifying the additional service providing server that is really related to the contents without any ambiguity, with respect to the contents owned by the user, is not provided.

The second problem is that the means by which the user can distinguish the legitimate additional service operated by the contents center which delivered that contents and the additional service provided by the third party which is not delivering the contents is not provided.

Among the additional services for the contents owned by the user, services such as the attribute inquiry service (for displaying a title, a creator, a creation date, etc.), the alteration detection service, the original data downloading service, and the contents provider identity checking service should be provided by the contents holder or an organization to which the operation is formally entrusted by the contents holder.

However, in the method for carrying out the keyword matching on the contents additional service inquiry server, the identification of the target contents is difficult so that there is no method for judging whether it is a legitimate service from the contents center or not at the contents additional service inquiry server.

On the other hand, from a viewpoint of the contents center side, it is impossible to identify whether it is really a legitimate service with respect to that contents or not unless the legitimate services registered at the contents additional service inquiry server are registered only from the contents center. Consequently, in the prior art, there is no method for judging whether it is really a legitimate additional service operated by the contents center which has delivered that contents or not, with respect to the contents owned by the user.

An object of the present invention is to provide a contents additional service inquiry server and a contents additional service providing system which are capable of enabling the unique identification of the additional service providing server that is really related to the contents from the contents owned at the user terminal, and also the identification as to whether that additional service providing server is operated by the contents center which has delivered that contents or operated by a third party.

BRIEF SUMMARY OF THE INVENTION

The present invention is applied to a contents additional service searching and providing system, which has a "contents center" for delivering each contents and providing its additional service, a "user terminal" for receiving a service providing regarding the contents, a "contents additional service inquiry server" for inquiring additional services regarding the contents, one or a plurality of "additional service providing servers" for providing the additional services regarding the contents which are operated by third parties that are not delivering the contents.

In order to realize the present invention, the "contents center"/"user terminal"/"contents additional service inquiry server"/"additional service providing servers" are equipped with the means as described in the following.

(1) Means Equipped by the "Contents Center"

It is equipped with ① means for entering a unique contents identifier with respect to each contents in advance, before the distribution, and ② means for registering an information of an additional service provided by itself and a location information of itself into the contents additional service inquiry server, while taking a correspondence with that contents identifier, so as to register that it is a server for executing the additional service with respect to the contents having that contents identifier.

(2) Means Equipped by the "User Terminal"

It is equipped with ① means for reading out the contents identifier from the contents delivered from the contents center, ② means for making an inquiry for the information of the additional services that can be provided with respect to that contents and the location information of the servers that provides these additional services and acquiring these informations, according to the contents identifier of that contents, with respect to the contents additional service inquiry server, and ③ means for outputting the information of the additional services that can be provided that is transmitted from the contents additional service inquiry server, in a form that distinguishes those of the contents center that delivered that contents and those operated by the other third parties.

(3) Means provided by the "contents additional service inquiry server" includes

① means for receiving informations in the case where a registration request for information for an additional service that can be provided with respect to the contents having that contents identifier and location information for a provider for that additional service is issued by specifying the contents identifier, ② means for authenticating that the contents center is a delivery source of the contents having the contents identifier specified by the registration request when that registration request is issued by the contents center, ③ means for storing the information for the additional service that can be provided with respect to the contents having that contents identifier and the location information of its provider, for each contents identifier, by distinguishing those provided by the contents center and those provided by third parties, and ④ means for searching and returning the contents identifier from the stored information, in the case where the inquiry request for the additional service is issued by specifying the contents identifier.

Also, in order to make only the formal services from the contents center are registered, as a means for identifying whether the registration source is really the contents center of that contents or not, it is possible to consider a method for identifying by making the contents center to enter a password before the registration of the additional service related to that contents from the contents center. However, it becomes necessary for the contents center to have a separate means for managing such that the password will not be leaked to the third party other than the contents center, and there is a possibility for the third party to register the illegitimate additional service by pretending the contents center in the case where the password is decoded intentionally by the eavesdropping of the communication path or the like even if it is not leaked. Consequently, in the present invention, any of the following six kinds of means can be equipped as the authentication means of ②.

(1a) Means for receiving an identifier embedding means from the contents center and original contents before identifier embedding, means for generating parameters of the identifier, means for embedding the identifier into the original contents according to the parameters of the identifier where the parameters are identical to those used by the contents center in embedding the identifier in the original contents, and means for directly comparing the contents after the contents identifier is embedded by the contents center and contents after the contents identifier is embedded by the contents additional service inquiry server, or comparing representative values of the contents after the contents identifier is embedded by said contents center and the contents after the contents identifier is embedded by the contents additional service inquiry server.

(1b) Means for receiving a correspondence table of parameter values and embedding result data for the original of contents, when the embedding of the identifier is carried out by changing values of embedding parameters, with respect to the original of contents before embedding the identifier that is possessed by said contents center, from the contents center, means for generating parameters of said identifier embedding means, means for looking up the embedding result data by using said correspondence table in the case where the identifier is to be embedded with respect to said original of contents according to the parameters of said identifier embedding means identical to those used by said contents center in embedding the identifier with respect to said original of contents, and means for directly comparing contents after the identifier is embedded in said contents center and contents after the identifier is embedded that is looked up from said correspondence table in the contents additional service inquiry server, or comparing representative values of contents after the identifier is embedded in said contents center and contents after the identifier is embedded that is looked up from said correspondence table in the contents additional service inquiry server.

(2a) Means for receiving the original of contents before embedding the identifier that is possessed by said contents center, means for generating a calculation formula for a representative value of the original of contents, means for calculating the representative value with respect to said original of contents according to the calculation formula for the representative value of the original of contents identical to that used by said contents center in calculating the representative value of the contents, and means for comparing the representative value of the original of contents calculated in said contents center and the representative value of the original of contents calculated in the contents additional service inquiry server.

(2b) Means for receiving a correspondence table of representative values and representative value calculation formulae when calculations of representative values of the original of contents are carried out by a plurality of representative value calculation formulae, with respect to the original of contents before embedding the identifier that is possessed by said contents center, from the contents center, means for generating the calculation formulae for the representative value of the original of contents, means for looking up the representative value from said correspondence table according to the calculation formula for the representative value of the original of contents identical to that used by said contents center in calculating the representative value of the contents, and means for comparing the representative value of the original of contents calculated in said contents center and the representative value of the original of contents that is looked up from said correspondence table in the contents additional service inquiry server.

(3a) Means for receiving the identifier embedding means that is possessed by said contents center, means for generating parameters of said identifier embedding means and sample contents for the authentication, means for embedding the identifier with respect to said sample contents according to the parameters of said identifier embedding means identical to those used by said contents center in embedding the identifier with respect to said sample contents, and means for directly comparing the sample contents after the identifier is embedded in said contents center and the sample contents after the identifier is embedded in the contents additional service inquiry server, or comparing representative values of the sample contents after the identifier is embedded in said contents center and the sample contents after the identifier is embedded in the contents additional service inquiry server.

(3b) Means for receiving a correspondence table of identifier embedding result data, embedding parameter values, and sample contents, with respect to a plurality of combinations of parameter values and sample contents with respect to the the identifier embedding means that is possessed by said contents center, from said contents center, means for generating parameters of said identifier embedding means and sample contents for the authentication, means for looking up the identifier embedding result data in the case of embedding the identifier with respect to the sample contents from said correspondence table according to the parameters of said identifier embedding means identical to those used by said contents center in embedding the identifier with respect to said sample contents, and means for directly comparing the sample contents after the identifier is embedded in said contents center and the sample contents made after the identifier is embedded that is looked up from said correspondence table in the contents additional service inquiry server, or comparing representative values of the sample contents after the identifier is embedded in said contents center and the sample contents made after the identifier is embedded that is looked up from said correspondence table in the contents additional service inquiry server.

(4) Means provided by the "additional service providing server" (server operated by the third party) includes ① means for registering information for the additional service provided by the server and the location information for the server with respect to the contents additional service inquiry server (in the case where a plurality of the contents additional service inquiry servers are provided, the contents addition service inquiry server where the contents identifier is registered by the contents center) in correspondence with the contents identifier of the contents for which the additional service is provided by the server, so as to register that it is a server for executing the additional service with respect to the contents.

By the IPR database (Intellectual Property Rights database) or the like, the entity providing the contents to be distributed by the contents center, the contents identifiers assigned to the contents, and the attribute information of the contents are disclosed, so that the "additional service providing server" carries out a process for registering information for the additional service provided by itself and the location information for itself to the contents additional service inquiry server in correspondence with the contents identifier, according to this disclosed information.

In addition, in the present invention, in addition to this configuration, it can be equipped with a "resolution server" which has a function for teaching where the contents additional service inquiry server for managing the location information of the server that provides the additional service is located, with respect to the user terminal, by managing a correspondence relationship of the contents identifier and the location information of the contents additional service inquiry server.

When this "resolution server" is provided,
  (a) the contents center is equipped with means for registering the location information of that registration target contents additional service inquiry server into the resolution server, while taking a correspondence with the contents identifier information registered in the contents additional service inquiry server, and
  (b) the user terminal is equipped with means for acquiring the location information of the contents additional service inquiry server for managing the location information of the server that provides the additional service, by making an inquiry to said resolution server by specifying the contents identifier.

When this resolution server is provided, it becomes possible for the user terminal to learn where the contents additional service inquiry server for managing the location information of the server that provides the additional service with respect to the contents specified by that contents identifier is located, by making an inquiry to this resolution server by specifying the contents identifier.

In the contents additional service searching and providing system equipped with the present invention so configured, each contents has a unique contents identifier, and the most major feature is that the contents additional service inquiry server stores in advance the information of the additional service that can be provided and the location information of its provider for each contents identifier by separating those operated by the contents center and those operated by the other third parties, and according to that, what sorts of things are there as the additional services provided by the contents center (and the location information of their provider) and what sorts of things are there as information of the additional services provided by the other third parties (and the location information of their providers) are presented in a form that distinguishes them, with respect to the user terminal.

In addition, in the contents center authentication system which is equipped with any of the above described six kinds of means as the authentication means of ②, it has the major feature in that, as the means for identifying whether the registration source of the additional service related to the contents is really the contents center of that contents or not, the original of contents before the identifier embedding and the identifier embedding means of the contents center that originally embedded the identifier in that contents are utilized, so that no separate means for the authentication is necessary, and it has the tolerance against the pretending as that contents and that means that cannot be decoded even when the communication path is eavesdropped are utilized because they can only be known by the contents center to begin with. The original of contents with the identifier not entered therein is such that if it is leaked out to the external, it becomes impossible to identify the leakage route, and the judgment of the illegal copy and the legal copy becomes difficult, so that it is not taken out from the contents center in general.

Also, the identifier embedding means such as the electronic watermark is such that if that means is taken out to the external of the contents center, there is a possibility of having the identifier overwritten with respect to the contents or having the embedded identifier deleted by the reverse engineering, so that that means is not taken out. In particular, in the case of using the electronic watermark as the identifier embedding means, the identifier embedding is usually made by using the one-way random function, so that it is impossible to guess the embedding method at the contents center or guess the original of contents before the embedding by observing the embedded result at the external of the contents center. In addition, considering the fact that the electronic watermark is the image processing, the different image processing will be carried out in the case where the embedding parameters are different, so that the contents after that embedding will be different inevitably.

Similarly, it is impossible to guess the entire huge contents data that is the calculation target by observing the combination of the calculation formula for calculating the representative value such as the hash function and the representative value that is the calculation result, in general.

Also, it is not possible to easily produce the input data for which the same representative value will be calculated, and in addition, a possibility for having the same representative value calculated from different contents is sufficiently low.

In the case of realizing the present invention, at the contents center, the unique contents identifier is entered in advance with respect to the contents by using the method such as the electronic watermark, the visible electronic watermark, or the header insertion, such that the unique contents identifiers are attached to all the distributed contents in advance before the distribution.

At the user terminal, when the contents distributed through the various distribution routes such as the broadcasting, the network, or the packaged media, the contents identifier of the distributed contents is read out.

At the user terminal, next, with respect to the contents additional service inquiry server, an inquiry of what sorts of things are there as the additional services that are available with respect to the distributed contents and the location information of the providers of these additional service is made by specifying that read out contents identifier.

When this inquiry is received, the contents additional service inquiry server having stored in advance information for the additional service that can be provided with respect to the contents having tat contents identifier and the location information of its provider for each contents identifier, searches the stored information and returns the requested information to the user terminal.

The contents additional service inquiry server stores the information of the additional service provided by the contents center and the location information of its provider, and the information of the additional service provided by the other third party and the location information of its provider, in a form that distinguishes them.

For this reason, in the information to be returned at this point, the information of the additional service provided by the contents center and the location information of its provider, and the information of the additional service provided by the other third party and the location information of its provider, are distinguished, so that upon receiving it, the user terminal can learn what sorts of things are there as the available additional services provided by the contents center and what sorts of things are there as the available additional services provided by the other third parties in a form that distinguishes them.

Here, the contents additional service inquiry server has authenticated that it is the contents center that is delivering that contents by using the password or the like at a time of registration of the additional service information from the contents center, so that the legitimacy regarding this point is guaranteed.

Upon receiving this returned information, the user terminal selects the additional service with respect to the owned contents, and receives that additional service.

Moreover, in the case of realizing the present invention by utilizing the original or contents before the identifier embedding and the identifier embedding means possessed by the contents center rather than the password as the authentication means, any of the following six kinds is carried out.

(1a) The case where the identifier embedding means used by the contents center and the original contents before identifier embedding are available from the contents center, and are available at the contents additional service inquiry server.

The contents additional service inquiry server receives the identifier embedding means and the original of contents before the identifier embedding from the contents center in advance.

In the case where the registration request for the additional service corresponding to the contents identifier is received from the registration source, the parameters of the identifier embedding means are generated at the contents additional service inquiry server, said generated parameters of the identifier embedding means are transmitted to the contents center and the identifier is embedded with respect to said original of contents before the identifier embedding according to these parameters in the contents center, while the identifier is embedded with respect to said original of contents before the identifier embedding in the contents additional service inquiry server according to the identical parameters.

The contents after the identifier is embedded in the contents center or the representative value such as its hash value is returned to the contents additional service inquiry server, and compared with the contents after the identifier is embedded in the contents additional service inquiry sever or the representative value such as its hash value, and the registration source is authenticated as the contents center of that contents if they coincide.

(1b) The case where the identifier embedding means used by the contents center and the original contents before the identifier embedding are available from the contents center, and it is not possible to use the identifier embedding means and the original contents at the contents additional service inquiry server, and the contents after the identifier embedding or the representative value, such as its hash value, alone is available.

The contents additional service inquiry server receives a correspondence table of the parameter values and the contents after the embedding or the representative value such as its hash value in the case of carrying out the embedding of the identifier by changing the embedding parameters such as the embedding intensity to various values, from the contents center in advance.

In the case where the registration request for the additional service corresponding to the contents identifier is received from the registration source, the parameters of the identifier embedding means are generated at the contents additional service inquiry server, said generated parameters of the identifier embedding means are transmitted to the contents center and the identifier is embedded with respect to said original of contents before the identifier embedding according to these parameters in the contents center, while the contents after the identifier embedding or the representative value such as its hash value is generated by using said table in the contents additional service inquiry server according to the identical parameters.

The contents after the identifier is embedded in the contents center or the representative value such as its hash value is returned to the contents additional service inquiry server, and compared with the contents after the identifier is embedded in the contents additional service inquiry sever or the representative value such as its hash value, and the registration source is authenticated as the contents center of that contents if they coincide.

(2a) The case where the original of contents before the identifier embedding that is possessed by said contents center is available at the contents center, and it is possessed at the contents additional service inquiry server.

The contents additional service inquiry server receives the original of contents before the identifier embedding from the contents center in advance.

In the case where the registration request for the additional service corresponding to the contents identifier is received from the registration source, the calculation formula for the representative value of the contents such as the contents hash is generated at the contents additional service inquiry server and said generated calculation formula is transmitted to the contents center and the representative value of said original of contents before the identifier embedding is calculated according to that calculation formula in the contents center, while the representative value with respect to said original of contents before the identifier embedding is calculated in the contents additional service inquiry server according to the identical parameters.

The representative value calculated in the contents center is returned to the contents additional service inquiry server, and compared with the representative value calculated in the contents additional service inquiry server, and the registration source is authenticated as the contents center of that contents if they coincide.

(2b) The case where the original of contents before the identifier embedding that is possessed by said contents center is available at the contents center, and it is not possible to possess it at the contents additional service inquiry server and the representative value such as a hash value of the original of contents before the identifier embedding alone is possessed.

The contents additional service inquiry server receives a correspondence table of the representative value and the original of contents before the identifier embedding in the case of carrying out the calculation of the representative value of the original of contents before the identifier embedding by the representative value calculation formulae such as various hashes, from the contents center in advance.

In the case where the registration request for the additional service corresponding to the contents identifier is received from the registration source, the calculation formula for the representative value of the contents such as the contents hash is generated at the contents additional service inquiry server, said generated calculation formula is transmitted to the contents center and the representative value of said original of contents before the identifier embedding is calculated according to that calculation formula in the contents center, while the representative value is generated by using said table in the contents additional service inquiry server according to the identical parameters.

The representative value calculated in the contents center is returned to the contents additional service inquiry server, and compared with the representative value generated in the contents additional service inquiry server, and the registration source is authenticated as the contents center of that contents if they coincide.

(3a) The case where the identifier embedding means that is possessed by said contents center is available at the contents center, and it is possessed at the contents additional service inquiry server.

The contents additional service inquiry server receives the identifier embedding means from the contents center in advance.

In the case where the registration request for the additional service corresponding to the contents identifier is received from the registration source, the parameters of the identifier embedding means and the sample contents for the authentication are generated at the contents additional service inquiry server and said generated parameters of the identifier embedding means and said sample contents are transmitted to the contents center and the identifier is embedded with respect to said sample contents according to these parameters in the contents center, while the identifier is embedded with respect to said sample contents in the contents additional service inquiry server according to the identical parameters.

The sample contents after the identifier is embedded in the contents center or the representative value such as its hash value is returned to the contents additional service inquiry server, and compared with the sample contents after the identifier is embedded in the contents additional service inquiry server or the representative value such as its hash value, and the registration source is authenticated as the contents center of that contents if they coincide.

(3b) The case where the identifier embedding means that is possessed by said contents center is available at the contents center, and it is not possible to possess it at the contents additional service inquiry server and the contents after the identifier embedding or the representative value such as its hash value alone is possessed.

The contents additional service inquiry server receives a correspondence table of the parameter values, the sample contents, and the contents after the embedding or the representative value such as its hash value in the case of carrying out the embedding of the identifier by changing the embedding parameters such as the embedding intensity and the sample contents to various values, from the contents center in advance.

In the case where the registration request for the additional service corresponding to the contents identifier is received from the registration source, the parameters of the identifier embedding means and the sample contents are generated at the contents additional service inquiry server, said generated parameters of the identifier embedding means and the sample contents are transmitted to the contents center and the identifier is embedded with respect to said sample contents according to these parameters in the contents center, while the contents after the identifier embedding or the representative value such as its hash value is generated by using said table in the contents additional service inquiry server according to the identical parameters with respect to the identical sample contents.

The sample contents after the identifier is embedded in the contents center or the representative value such as its hash value is returned to the contents additional service inquiry server, and compared with the contents after the identifier is embedded in the contents additional service inquiry server or the representative value such as its hash value, and the registration source is authenticated as the contents center of that contents if they coincide.

In this way, in the present invention, it becomes possible to uniquely identify the server that provides the additional service related to that contents from the contents owned by the user, by making an inquiry to the server that carries out the inquiry of the additional service by using the contents identifier attached to that contents as a key, for the contents distributed by various distribution routes.

Then, at that point, it becomes possible to identify whether the server that provides that additional service is one that is operated by the legitimate contents center or one that is operated by the third party that is not the contents center.

In addition, in the contents additional service searching and providing system in which any of the above described six kinds of means is equipped as the means for recognizing whether the registration source of the additional service related to the contents is really the contents center of that contents or not, the original of contents before the identifier embedding and the identifier embedding means of the contents center that originally embedded the identifier in that contents are utilized, so that no separate means is necessary, and it has the tolerance against the pretending because that contents and that means that cannot be decoded even when the communication path is eavesdropped and that can only be known by the contents center to begin with are utilized.

BRIEF DESCRIPTION OF THE DRAWINGS

FIGS. 2A and 2B are processing sequence charts in one embodiment of the present invention.

FIG. 3 is one example of a correspondence table for describing a relationship between a contents identifier and additional service information.

FIGS. 5A and 5B are another processing sequence charts in one embodiment of the present invention.

FIG. 6 is one example of a correspondence table for describing a correspondence relationship of a contents identifier and a location information of a contents additional service inquiry server.

FIGS. 14A and 14B are processing sequence charts of the conventional additional service providing system.

FIG. 16 is a table showing that there are six kinds of configurations for an internal configuration of the contents center authentication system depending on authentication methods.

FIG. 23 is one example of a correspondence table of identifier embedding parameters and identifier embedded contents in the case of (1b).

FIG. 36 is one example of a correspondence table of identifier embedding parameters and identifier embedded sample contents in the case of (3b).

DETAILED DESCRIPTION OF THE INVENTION

Figure 1:
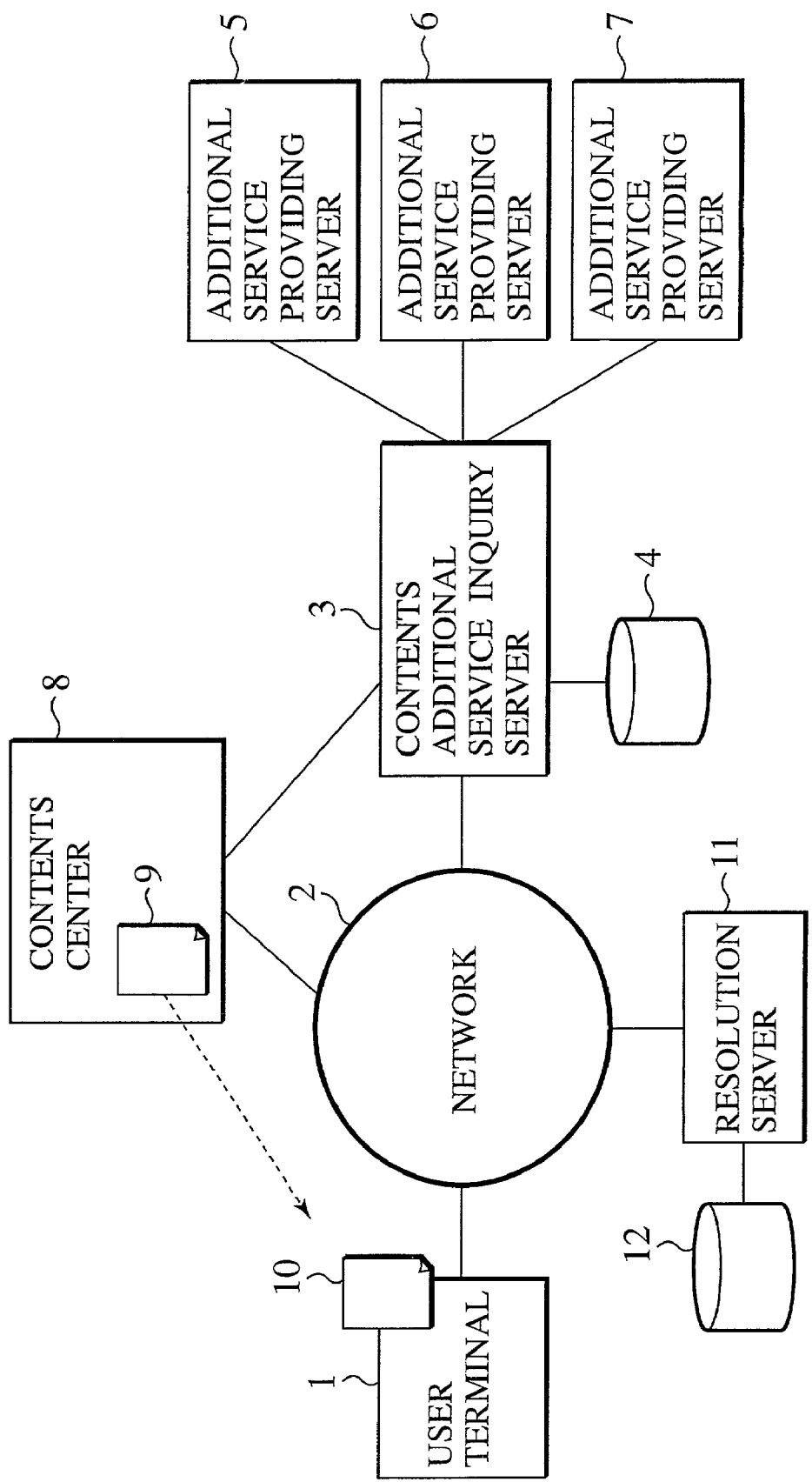
FIG. 1 is a diagram showing an exemplary configuration of an additional service providing system according to one embodiment of the present invention.

FIG. 1 shows a configuration of the additional service providing system according to one embodiment of the present invention.

In the figure, 1 is a user terminal, 2 is a network such as the Internet, 3 is a contents additional service inquiry server for carrying out the inquiry of the additional services, 4 is a correspondence table for describing a correspondence relationship of the contents identifier and available additional service information, 5 to 7 are additional service providing servers operated by the third parties, 8 is a contents center for delivering the contents by inserting a unique identifier therein and also providing its additional services, 9 and 10 are contents with the unique contents identifiers inserted therein, 11 is a resolution server for returning the location information of the contents additional service inquiry server 3 that manages the additional service information from the contents identifier, and 12 is a correspondence table for describing a correspondence relationship of the contents identifier and the location information of the contents additional service inquiry server.

Figure 2A:
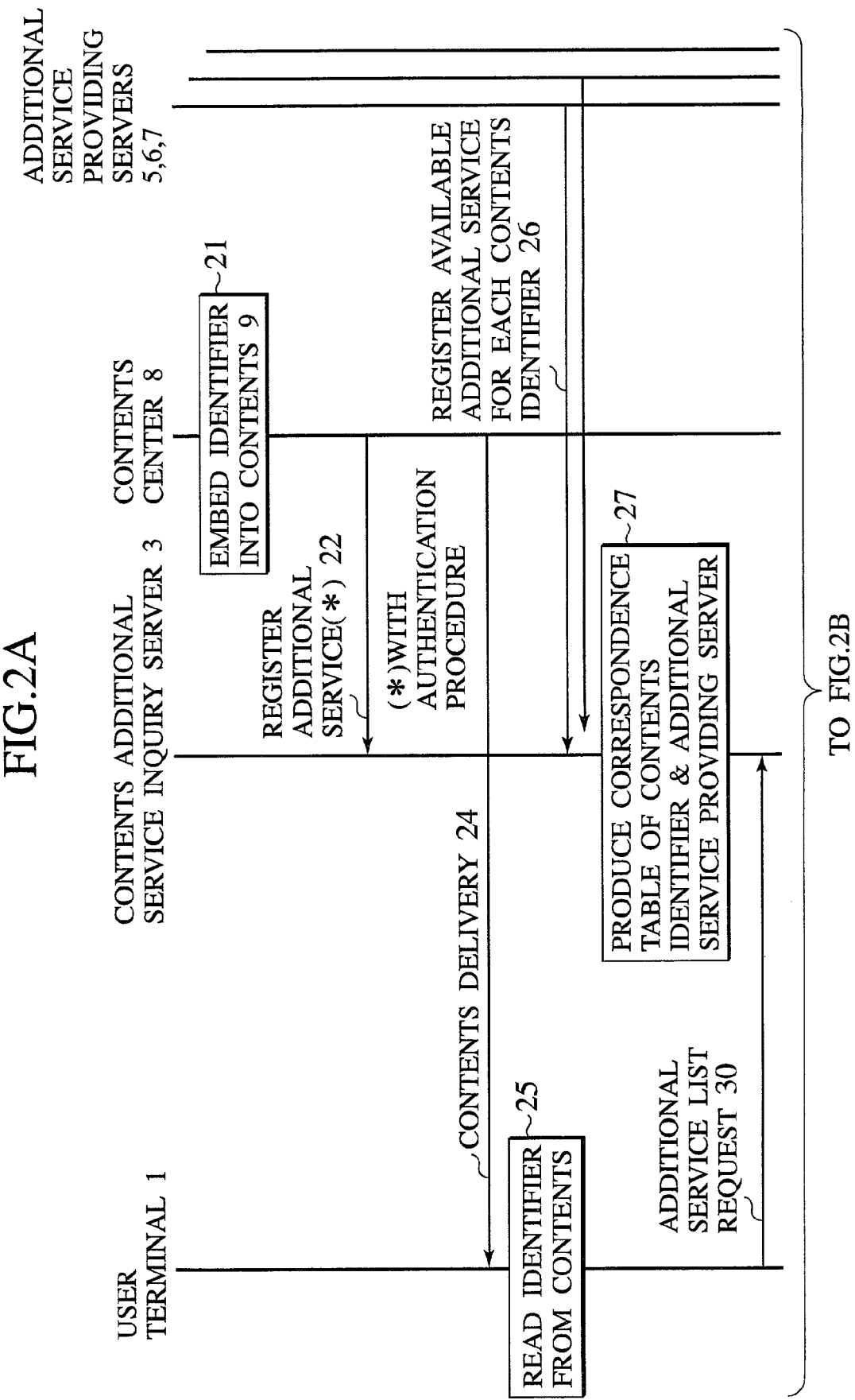

FIGS. 2A and 2B show the processing sequence chart indicating what processing is carried out by each of the contents center 8, the user terminal 1, the contents additional service inquiry server 3, and the additional service providing servers 5 to 7.

Next, according to FIGS. 2A and 2B, the processing sequence of the additional service providing system configured according to the present invention will be described.

First, before the distribution, the unique contents identifier is inserted into the contents 9 at the contents center 8 (procedure 21).

The contents 9 is media such as music, static images, dynamic images, text, CG, etc., or their composite. At this point, as a method for inserting the contents identifier, it is possible to consider a method for inserting it by an invisible electronic watermark, a method for inserting it as a part of the header information, a method for inserting it in superposition to the original contents in a form of visible characters (visible electronic watermark) in the case where the target contents are still images or dynamic images, etc.

The contents 9 with the contents identifier inserted is delivered to the user terminal 1 via the network 2, and arrives to the terminal 1 as the contents 10 (procedure 24).

The means for delivery via the network 2 at this point is the attaching to the electronic mail, the downloading by FTP or WWW, etc. Besides them, it is also possible to consider examples that use the delivery means such as a digital broadcasting, a packaged media such as CD-ROM, a rewritable media such as floppy disk or MO disk, a printing on a paper, a recording in an analog tape, a print out, etc., without passing through the network 2.

At the user terminal 1, the embedded contents identifier is read out from the contents 10 by means such as the electronic watermark reading, the header reading, or the visible electronic watermark reading (procedure 25).

At the user terminal, that read out contents identifier is transmitted to the contents additional service inquiry server 3 and requests the information of the additional services available with respect to that contents 10 (procedure 30).

On the other hand, the contents center 8 carries out the registration of that service content and the location information to the contents additional service inquiry server 3 in a format corresponding to the contents identifier, by regarding itself as the additional service server (procedure 22).

At this point, using the password or the like, the contents center 8 is a contents center that has delivered the contents having that contents identifier is authenticated at the contents additional service inquiry server 3 side.

Also, each of the additional service providing servers 5 to 7 operated buy the third parties also carries out the registration of the relating information regarding what additional service providing is possible with respect to the contents with which contents identifier, with respect to the contents additional service inquiry server (procedure 26).

By the IPR database or the like, the entity of the contents distributed by the contents center 8, the contents identifiers assigned to these contents, and the attribute information of these contents are disclosed, so that the additional service providing servers 5 to 7 carry out the processing to register the information of the additional services provided by itself and the location information of itself to the contents additional service inquiry server 3, while taking a correspondence with the contents identifier registered by the contents center 8, according to this disclosed information.

At the contents additional service inquiry server 3, the contents center 8 and the additional service providing servers 5 to 7 operated by the third parties are distinguished, and their relating informations are collected, and the correspondence table 4 for describing a correspondence relationship of the contents identifier and the additional service information is produced in advance (procedure 27).

FIG. 3 shows an exemplary configuration of this correspondence table 4. The correspondence table 4 has a format of a list of the additional service provider, the additional service type, and the location information of its providing server, for each contents identifier, as shown in the figure. In the correspondence table 4 shown in FIG. 3, a description indicating the logical location of the server such as the IP address is used for the location, but in the simplest case, it is also possible to directly write a URL from which the contents can be downloaded, for this location.

In the case where the identifier of the target contents is transmitted from the user terminal 1 to the contents additional service inquiry server 3 at the procedure 30 shown in FIGS. 2A and 2B, the contents additional service inquiry server 3 acquires the list information on the additional services that can be provided to that contents, the additional service providing servers that provide them, and the distinction as to whether it is a contents holder or a third party, from the corresponding contents identifier by using the correspondence table 4 for describing said correspondence relationship of the contents identifier and the additional service information (procedure 31). Then, that acquired information is transmitted to the user terminal 1 (procedure 32).

Figure 4:
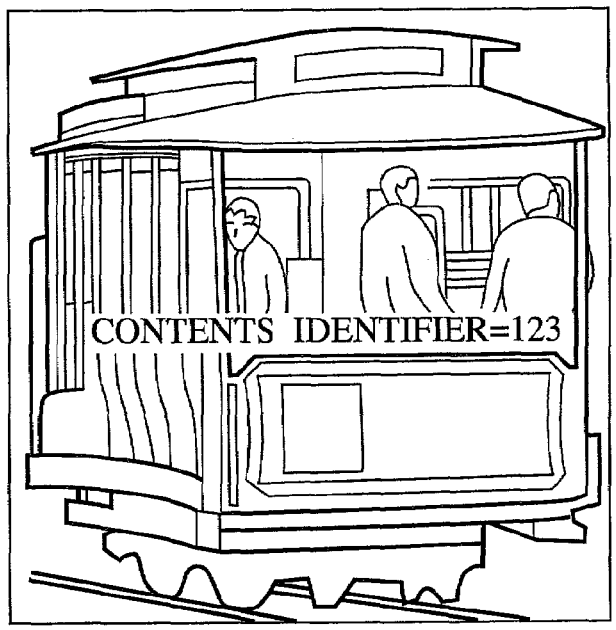
FIG. 4 is one example of an additional service information providing method.

FIG. 4 shows one example regarding how the additional services are displayed on a screen of the user terminal 1 at this point. The screen shown in this figure is showing an example for displaying in three separate portions including a contents display portion 40 (which is displaying the contents having the contents identifier of "123" in this example), a list of additional services by the contents center 8 portion 41, and a list of additional services by the third parties portion 42.

At the user terminal 1, using this screen, and taking the providers into consideration, the necessary additional service is selected.

For example, suppose that the alteration detection is requested to the contents center 8 from the user terminal 1 by attaching the contents (procedure 34).

In response, at the contents center 8 that has delivered that contents, the comparison of the original contents and the contents transmitted from the user terminal 1 is carried out, and the alteration detection service is executed (procedure 35).

Such an additional service is meaningless unless it is requested to the contents center 8 that has actually delivered the contents, and in the present invention, it is presented in a form in which the additional service to be provided is one that is provided by the contents center 8 or one that is provided by the third party can be seen with respect to the user, so that such an inconvenience as issuing the incorrect additional service providing request will not occur.

For example, suppose that the related goods sale is requested to the additional service providing server 5 from the user terminal 1 by attaching the contents identifier next (procedure 36). In the case of this additional service, it can be operated even if it is not the contents center 8 in particular, so that the user selects the additional service providing server 5 operated by the third party and the information of goods from this selected additional service providing server 5 is provided (procedure 37).

In the embodiment described above, at the procedure 30, it is assumed that the location information (the location on the network such as the IP address or the URL) of the contents additional service inquiry server 3 regarding the target contents 10 is already known at the user terminal 1.

However, in the case where the location information of the contents additional service inquiry server 3 is unknown at the procedure 30, the user terminal 1 can learn the location information of the contents additional service inquiry server 3 of that contents by using the resolution server 11.

Figure 5A:
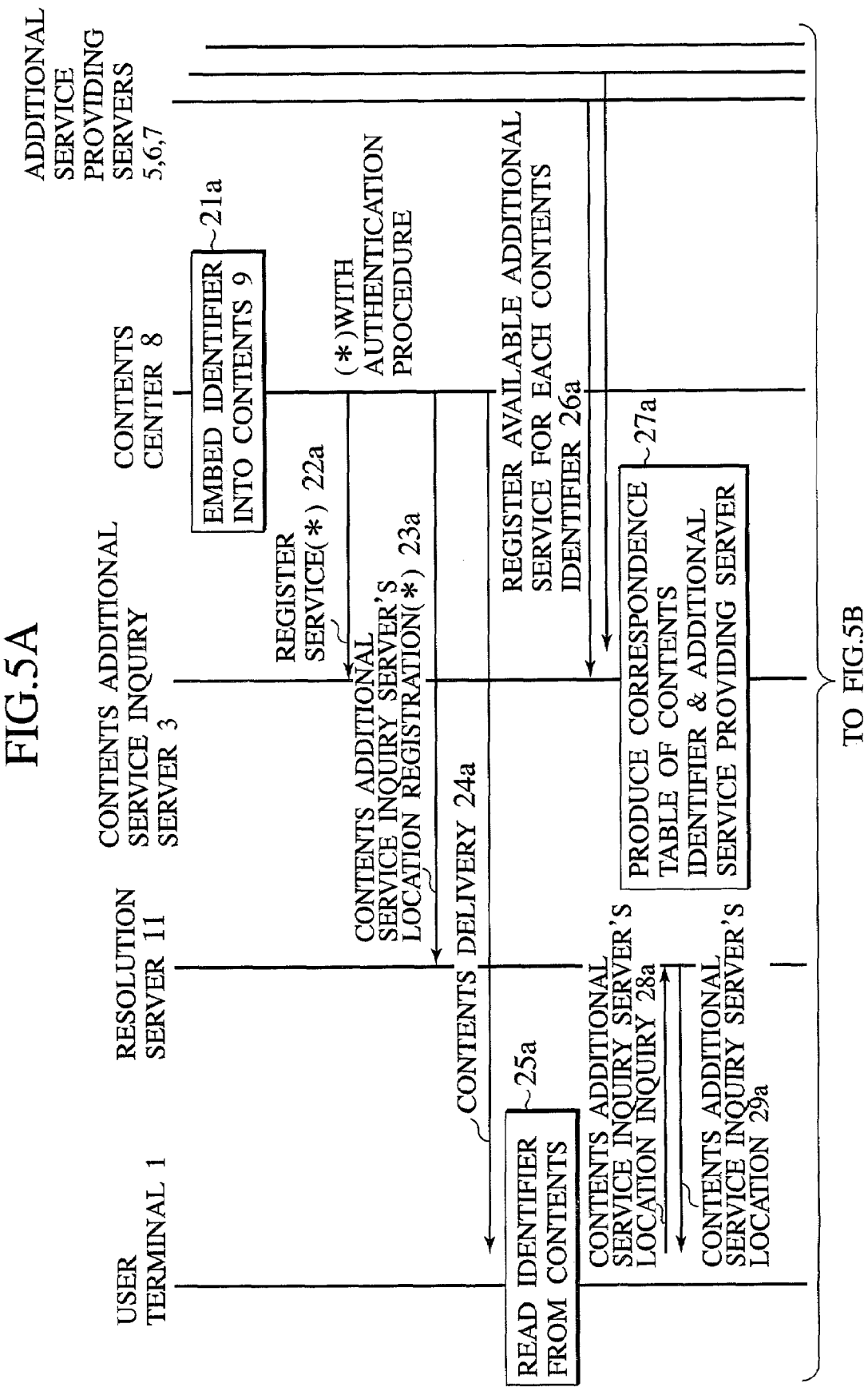

FIGS. 5A and 5B show the processing sequence chart in the case of having the resolution server 11 for identifying the location information of the contents additional service inquiry server 3.

Compared with FIGS. 2A and 2B, what is added in FIGS. 5A and 5B is three procedures including ① a procedure for registration of the location information of the contents additional service inquiry server 3 from the contents center 8 to the resolution server 11 (procedure 23a), ② a procedure for inquiring the location information of the contents additional service inquiry server 3 from the user terminal 1 to the resolution server 11 (procedure 28a), and ③ a procedure for returning the location information of the contents additional service inquiry server 3 from the resolution server 11 to the user terminal 1 (procedure 29a).

Note that the additional service providing servers 5 to 7 carry out the additional service registration with respect to the contents additional service inquiry server 3 registered by the contents center 8, so that even when a plurality of the contents additional service inquiry servers 3 are provided, there is no need to carry out the location registration for the contents additional service inquiry server 3 to the resolution server 11.

At this procedure 23a, similarly as the procedure 22a, the resolution server 11 has the procedure for authentication (password or the like) regarding whether the contents center 8 that carries out the registration is the contents center that has delivered that contents or not.

By means of this, it becomes possible to return the location information of the correct contents additional service inquiry server 3 that is approved by the contents center 8, to the user terminal 1, in response to the inquiry from the user terminal 1.

By collecting the registration results of this contents additional service inquiry server location information from the contents center 8, the resolution server 11 will produce the correspondence table 12 of the location information of the contents additional service inquiry server for each contents identifier, as shown in FIG. 6.

In the case of providing this resolution server 11, when the contents identifier is transmitted from the user terminal 1 to the resolution server 11 at the procedure 28a, the resolution server 11 can identify the location information of the contents additional service inquiry server 3 corresponding to it from the correspondence table 12 shown in FIG. 6, and return that to the user terminal 1 at the procedure 29a.

Note that it is assumed that the location information of the resolution server 11 itself is well-known.

FIG. 7 to FIG. 12 show one example of the processing flows to be executed in the case where the resolution server 11 is provided.

Next, according to these processing flows, the processing to be executed by the contents additional service inquiry server 3, the contents center 8, the additional service providing servers 5 to 7, the resolution server 11 and the user terminal 1 will be described.

Figure 7:
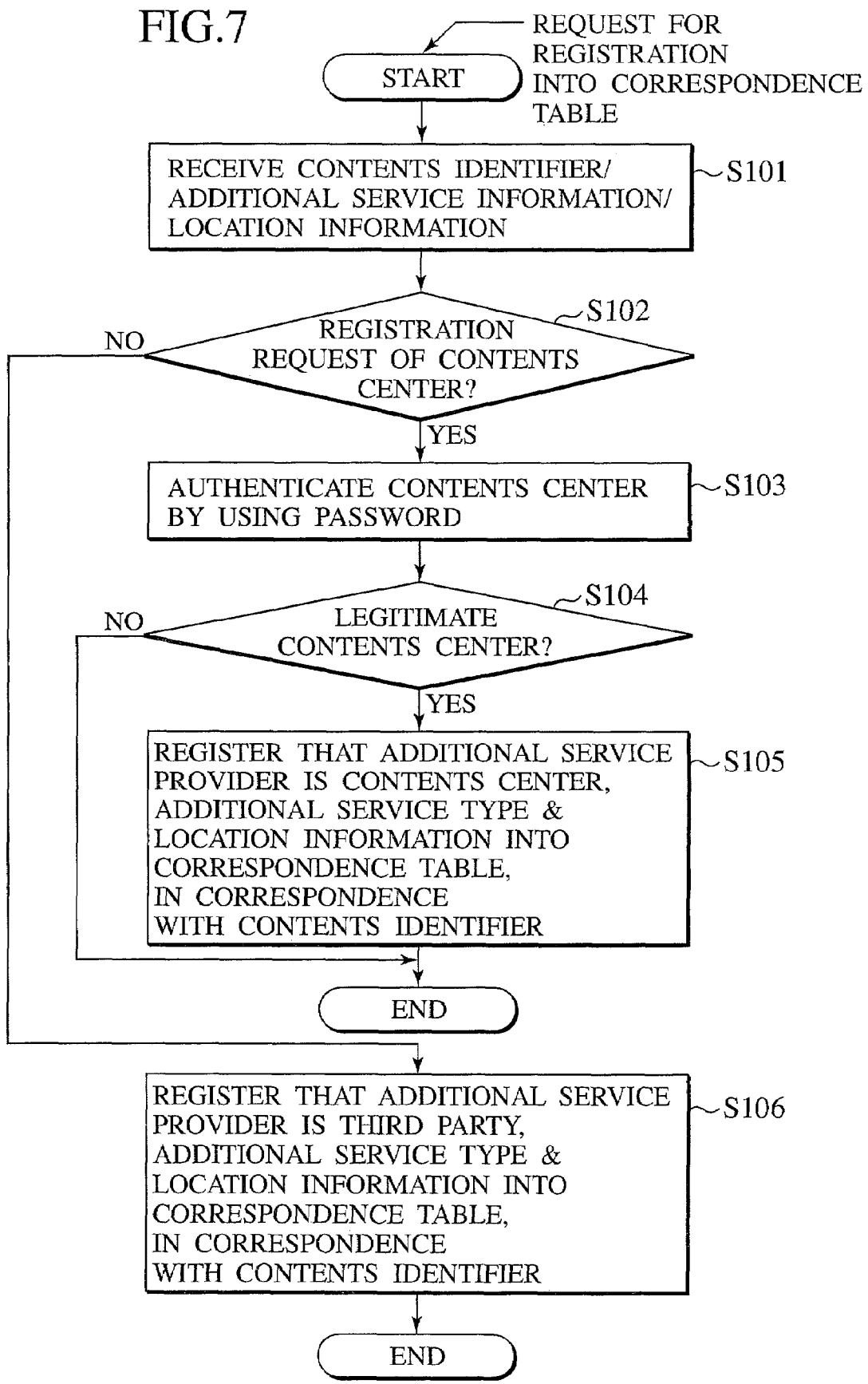
FIG. 7 is one example of a processing flow to be executed by a contents additional service inquiry server.
Figure 8:
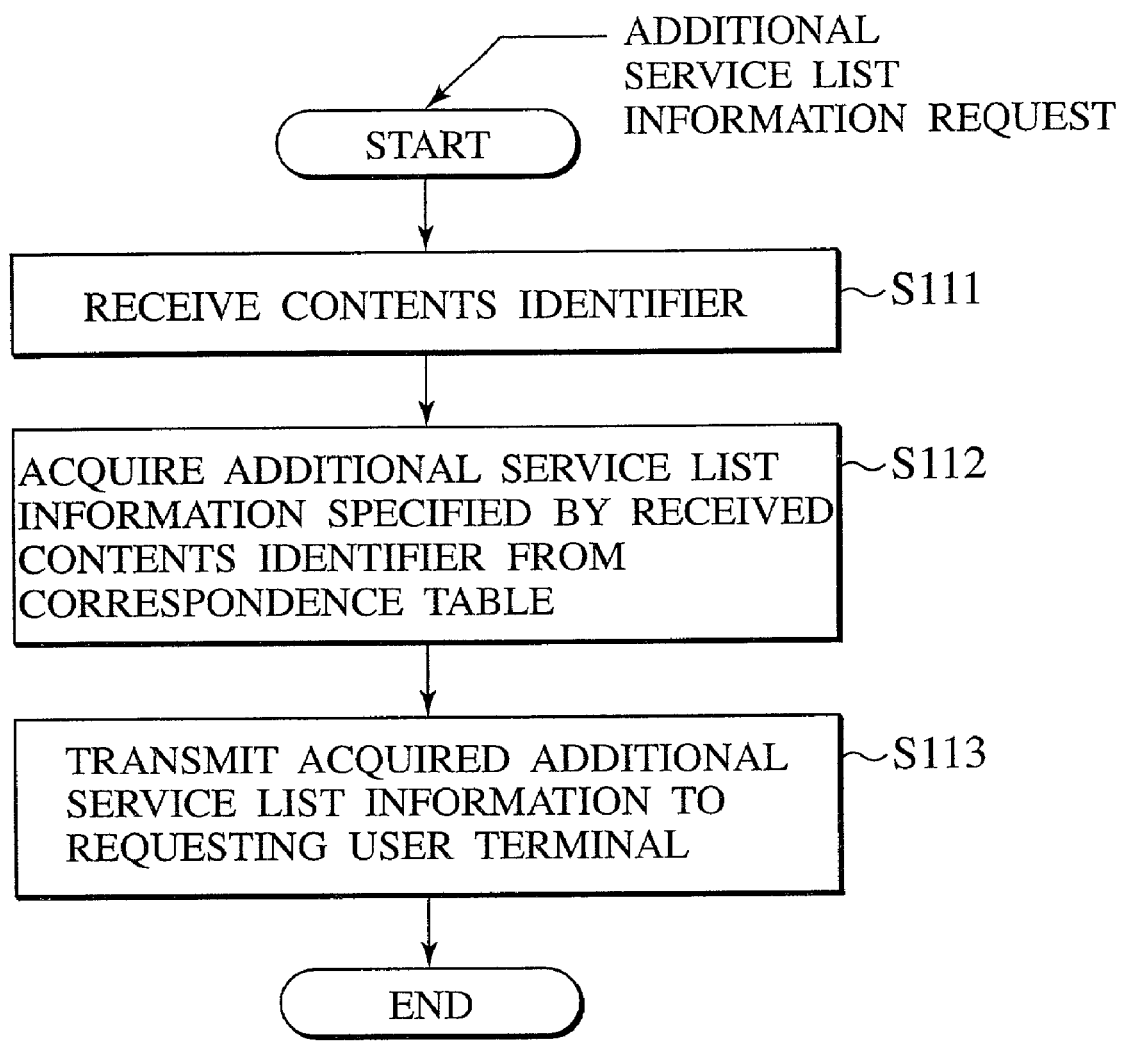
FIG. 8 is one example of a processing flow to be executed by a contents additional service inquiry server.
Figure 9A:
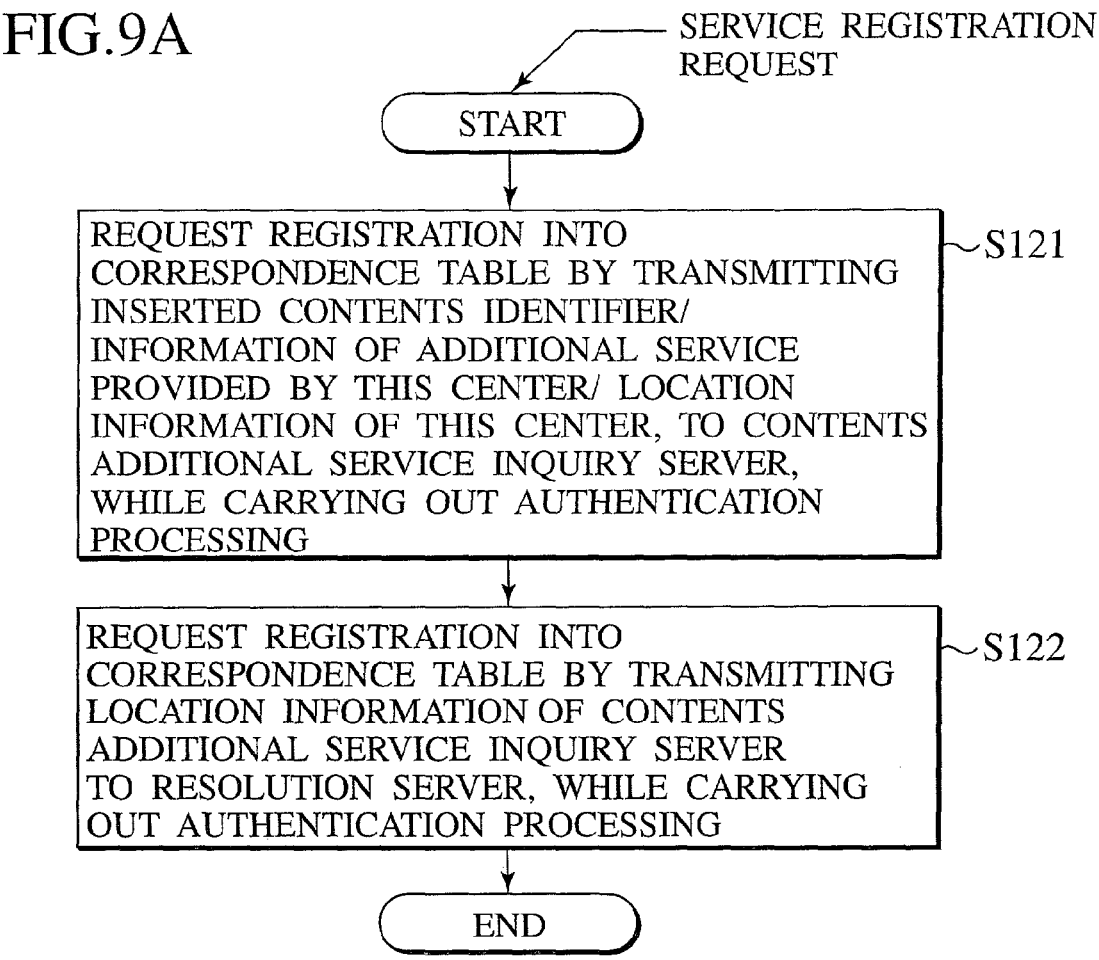
FIGS. 9A and 9B are one example of a processing flow to be executed by a contents center.
Figure 9B:
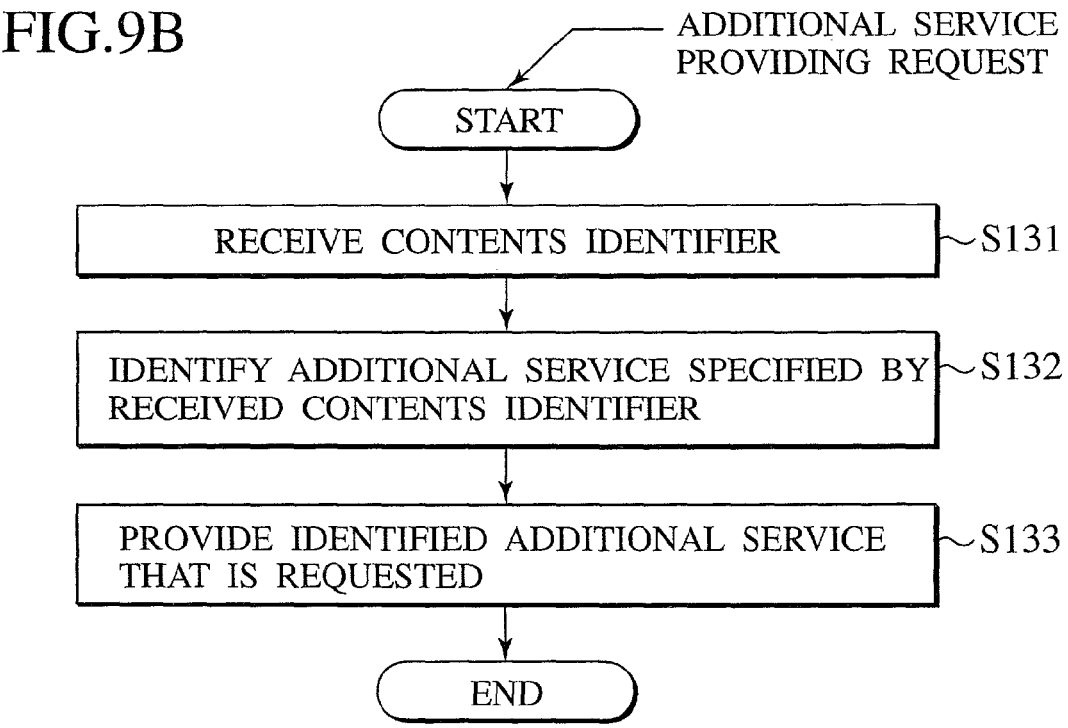
Figure 10A:
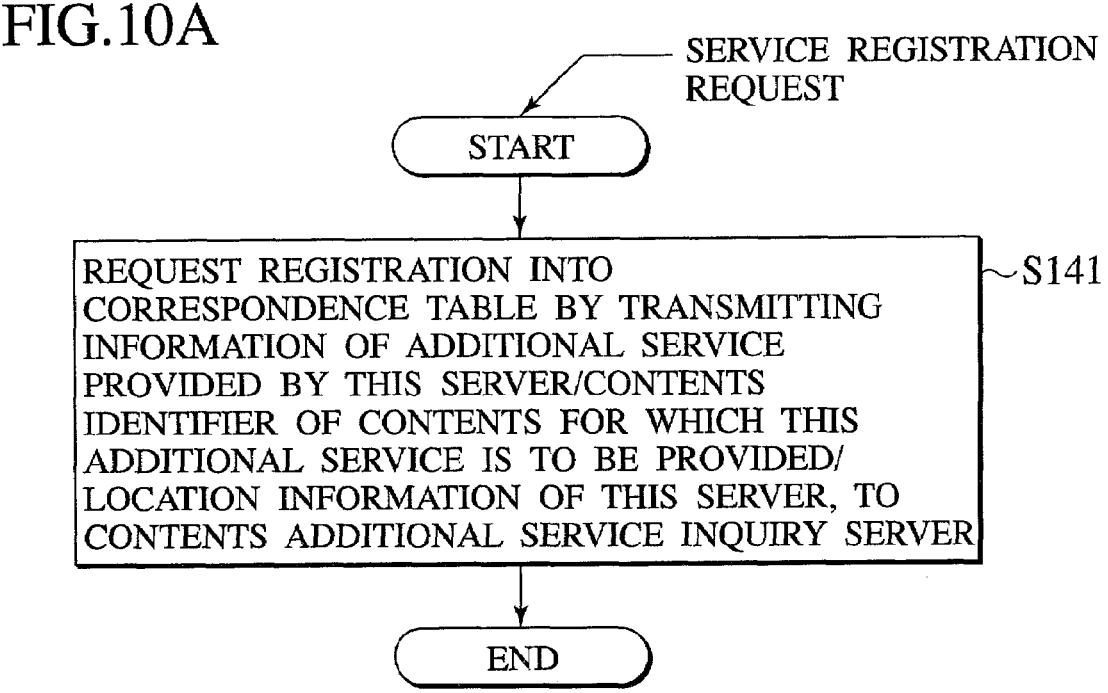
FIGS. 10A and 10B are one example of a processing flow to be executed by an additional service providing server.
Figure 10B:
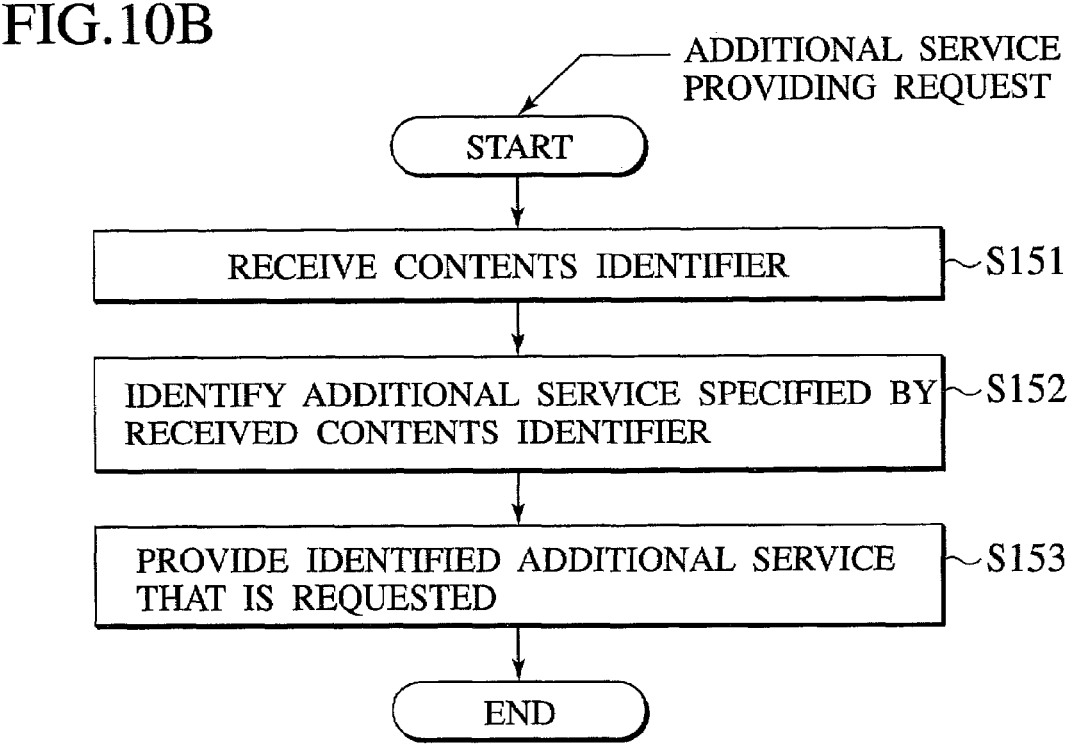
Figure 11A:
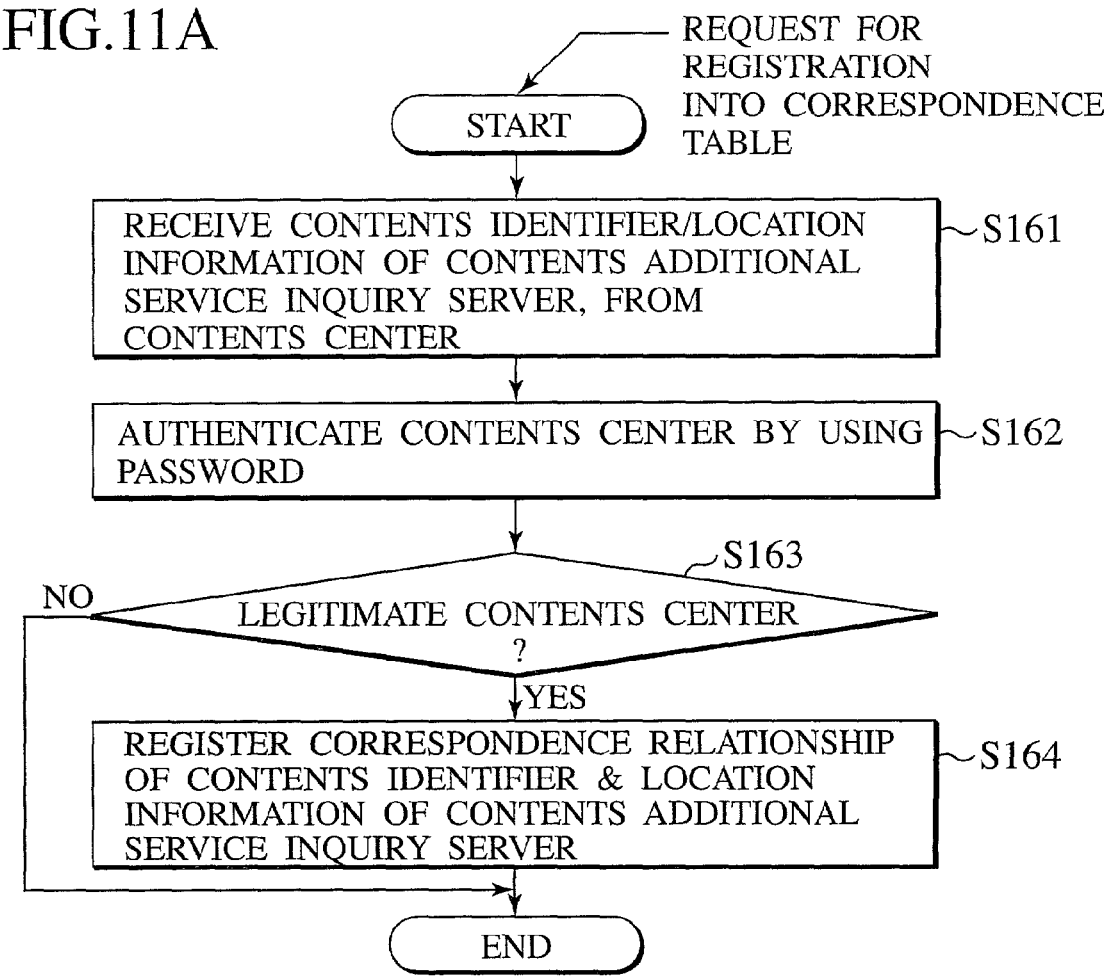
FIGS. 11A and 11B are one example of a processing flow to be executed by a resolution server.
Figure 11B:
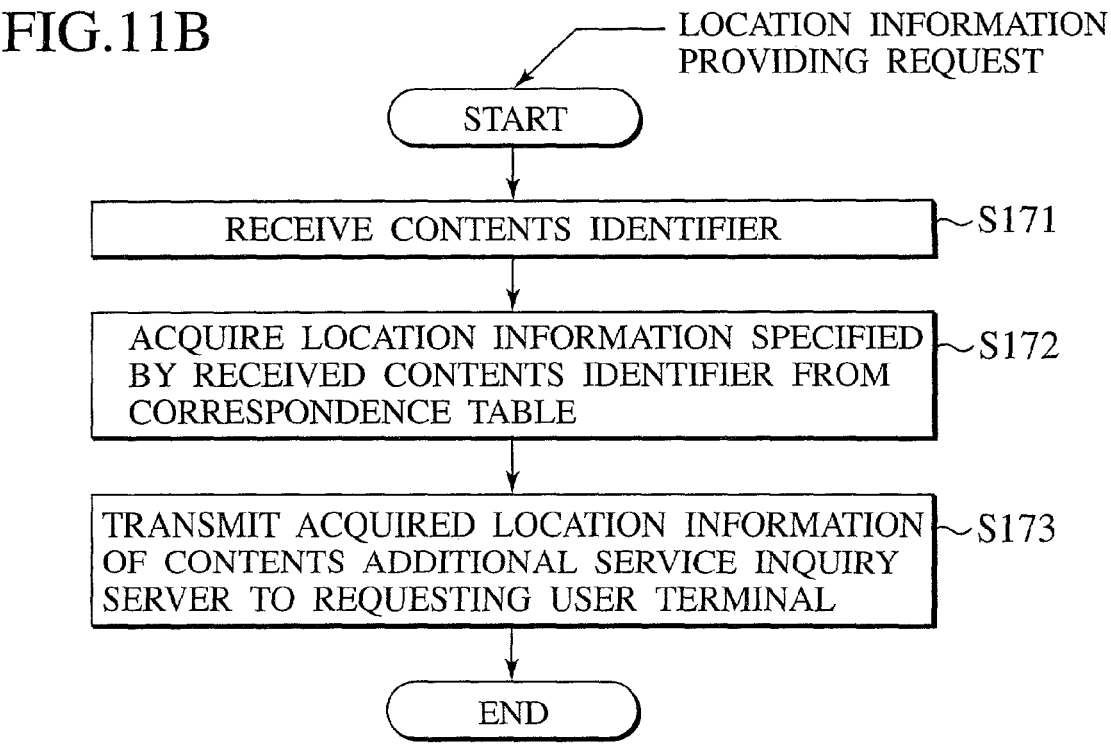
Figure 12:
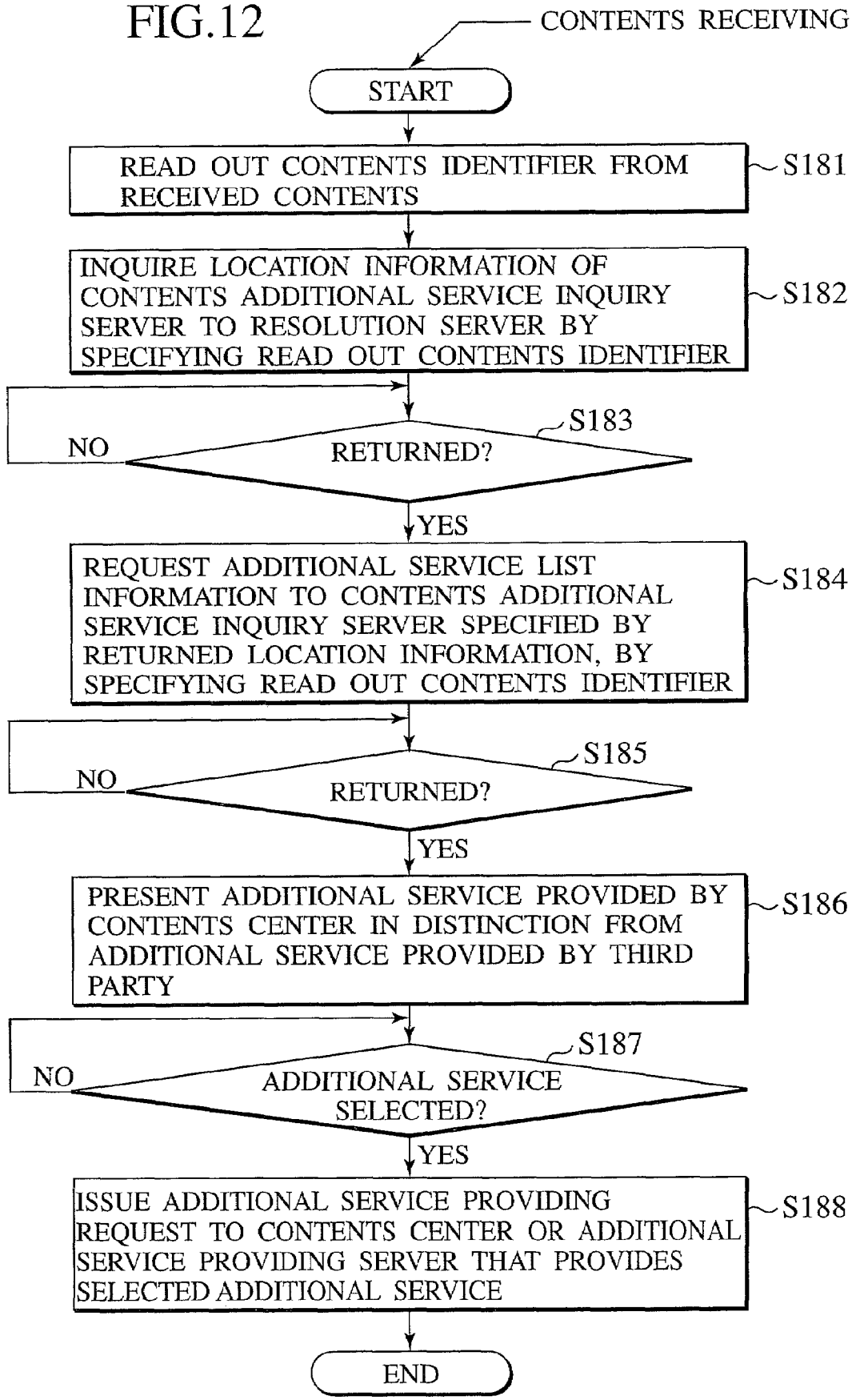
FIG. 12 is one example of a processing flow to be executed by a user terminal.
Figure 13:
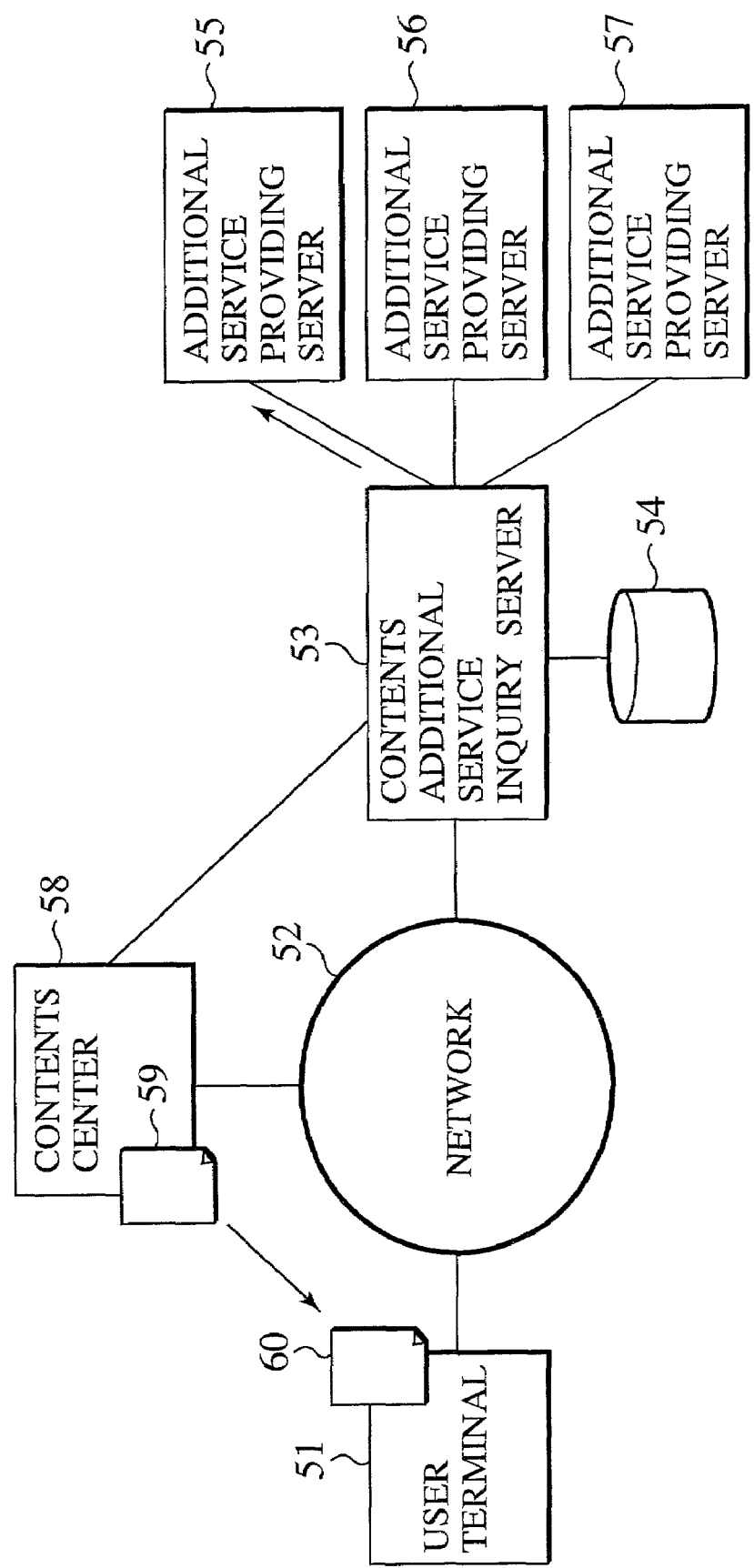
FIG. 13 is a diagram showing one exemplary configuration of a conventional additional service providing system.

Here, FIG. 7 and FIG. 8 are the processing flow to be executed by the contents additional service inquiry server 3, FIGS. 9A and 9B are the processing flow to be executed by the contents center 8, FIGS. 10A and 10B are the processing flow to be executed by the additional service providing servers 5 to 7, FIGS. 11A and 11B are the processing flow to be executed by the resolution server 11, and FIG. 12 is the processing flow to be executed by the user terminal 1.

The computer programs for executing these processing flows can be provided by recording them in appropriate recording medium such as computer readable portable medium memory, semiconductor memory, hard disk, etc.

(1) Processing to be Executed by the Contents Additional Service Inquiry Server 3

When the request for registration to the correspondence table 4 is issued, as shown in the processing flow of FIG. 7, the contents additional service inquiry server 3 first receives ① the contents identifier specified by that registration request/② the information of the additional service (the information of the additional service provided by the registration request source with respect to the contents having that contents identifier)/③ the location information (the location information of the registration request source that provides the additional service) (step S101).

Then, whether that registration request is one that is issued by the contents center 8 or not is judged (step S102), and in the case where the contents center 8 has issued the registration request, whether the legitimate contents center 8 that is the contents delivery source has issued it or not is authenticated by using the password (step S103), and in the case where it is authenticated (step S104), the fact that the provider of the additional service is the contents center 8, the type of that additional service and the location information of that contents center 8 are registered with respect to the correspondence table 4 while taking a correspondence with the contents identifier of the registration request (step S105).

On the other hand, when it is judged that this registration request is not one that is issued by the contents center 8, that is, in the case where it is judged as one that is issued by the additional service providing server 5 to 7, the fact that the provider of the additional service is the third party, the type of that additional service, and the location information of that additional service providing server 5 to 7 are registered with respect to the correspondence table 4 while taking a correspondence with the contents identifier of the registration request (step S106).

In this way, the correspondence table 4 as shown in FIG. 3 will be constructed, and when this correspondence table 4 is constructed, the request for providing the additional service list information will be issued from the user terminal 1 as will be described below.

When this request for providing the additional service list information is issued, as shown in the processing flow of FIG. 8, the contents additional service inquiry server 3 first receives the contents identifier specified by that providing request (step S111), and then, the additional service list information specified by that received contents identifier is acquired by referring to the correspondence table 4 (step S112), and it is transmitted to the user terminal 1 that is the providing request source (step S113).

(2) Process to be executed by the Contents Center 8

When a request for registration for the additional service to the contents additional service inquiry server 3 is issued such as when a new additional service is started, as shown in the processing flow of FIG. 9A, the contents center 8 carries out the authentication processing requested by the contents additional service inquiry server 3, and requests the registration of the additional service information by transmitting ①the contents identifier inserted into the contents. ②the information for the additional service provided by the contents center (the information for the additional service provided with respect to the contents having that contents identifier). ③the location information for the contents center, with respect to the contents additional service inquiry server 3 (step S121).

Upon receiving this registration request, the contents additional service inquiry server 3 executes the processing for the registration of the additional service information to the correspondence table 4, as described above.

Then, while carrying out the authentication processing requested from the resolution server 11, the location information of the contents additional service inquiry server 3 that is the registration target of the additional service information is transmitted with respect to the resolution server 11, so as to request the registration of the location information of the contents additional service inquiry server 3 that is the registration target of the additional service information (step S122).

Upon receiving the registration request, the resolution server 11 registers the location information for the contents additional service inquiry server 3 the additional service information is registered in correspondence with the contents identifier specified by that registration request, as will be described below.

The user terminal 1 will issue the request for providing the additional service with respect to the contents center 8 by using the correspondence table 4 constructed by the contents additional service inquiry server 3, as will be described below.

When this additional service providing request is issued, as shown in the processing flow of FIG. 9B, the contents center 8 first receives the contents identifier specified by that providing request (step S131), and then, identifies the additional service specified by that received contents identifier from the additional services provided by the own center (step S132), and provides it (step S133).

(3) Processing to be Executed by the Additional Service Providing Server 5 to 7

When the request for registration of the additional service to the contents additional service inquiry server 3 is issued as the new additional service providing is started or the like, as shown in the processing flow of FIG. 10A, the additional service providing server 5 to 7 transmits ①the information of the additional service provided by the own server/②the contents identifier of the contents that is to be a target for providing that additional service/③the location information of the own server, with respect to the contents additional service inquiry server 3, so as to request the registration of the additional service information (step S141).

Upon receiving this registration request, the contents additional service inquiry server 3 executes the processing for the registration of the additional service information to the correspondence table 4, as described above.

The user terminal 1 will issue the request for providing the additional service with respect to the additional service providing server 5 to 7 by using the correspondence table 4 constructed by the contents additional service inquiry server 3, as will be described below.

When this additional service providing request is issued, as shown in the processing flow of FIG. 10B, the additional service providing server 5 to 7 first receives the contents identifier specified by that providing request (step S151), and then, identifies the additional service specified by that received contents identifier from the additional services provided by the own center (step S152), and provides it (step S153).

(4) Processing to be Executed by the Resolution Server 11

When the Request for Registration to the correspondence table 12 is issued from the contents center 8, as shown in the processing flow of FIG. 11A, the resolution server 11 first receives ①the contents identifier specified by that registration request (the contents identifier registered into the contents additional service inquiry server 3)/②the location information of that contents additional service inquiry server 3 (step S161).

Then, whether it is the legitimate contents center 8 or not is authenticated by using the password (step S162), and in the case where it is authenticated (step S163), the correspondence relationship of the contents identifier specified by the registration request and the location information of the contents additional service inquiry server 3 is registered with respect to the correspondence table 12 (step S164).

In this way, the correspondence table 12 as shown in FIG. 6 will be constructed, and when this correspondence table 12 is constructed, the request for providing the location information of the contents additional service inquiry server 3 will be issued from the user terminal 1 as will be described below.

When this request for providing the location information of the contents additional service inquiry server 3 is issued, as shown in the processing flow of FIG. 11B, the resolution server 11 first receives the contents identifier specified by that providing request (step S171), and then, the location information of the contents additional service inquiry server 3 specified by that received contents identifier is acquired by referring to the correspondence table 12 (step S172), and it is transmitted to the user terminal 1 that is the providing request source (step S173).

(5) Processing to be Executed by the User Terminal 1

When the contents delivered from the contents center 8 is received, as shown in the processing flow of FIG. 12, the user terminal 1 reads out the contents identifier inserted into that contents, from the received contents (step S181).

Then, the location information of the contents additional service inquiry server 3 is inquired by specified that read out contents identifier, with respect to the resolution server 11 (step S182), and it is acquired (step S183). Then, the additional service information list information is requested by specifying that read out contents identifier, with respect to the contents additional service inquiry server 3 specified by that acquired location information (step S184), and it is acquired (step S185).

Then, according to the information acquired from the contents additional service inquiry server 3, it is presented to the user in a form that distinguishes the type of the additional service provided by the contents center 8 and the type of the additional service provided by the third party, in a style as shown in FIG. 4, for example (step S186). Then, when the user selects the additional service in response to that presentation (step S187), the additional service providing request is issued with respect to the contents center 8 or the additional service providing server 5 to 7 that provides that selected additional service (step S188).

Figure 15:
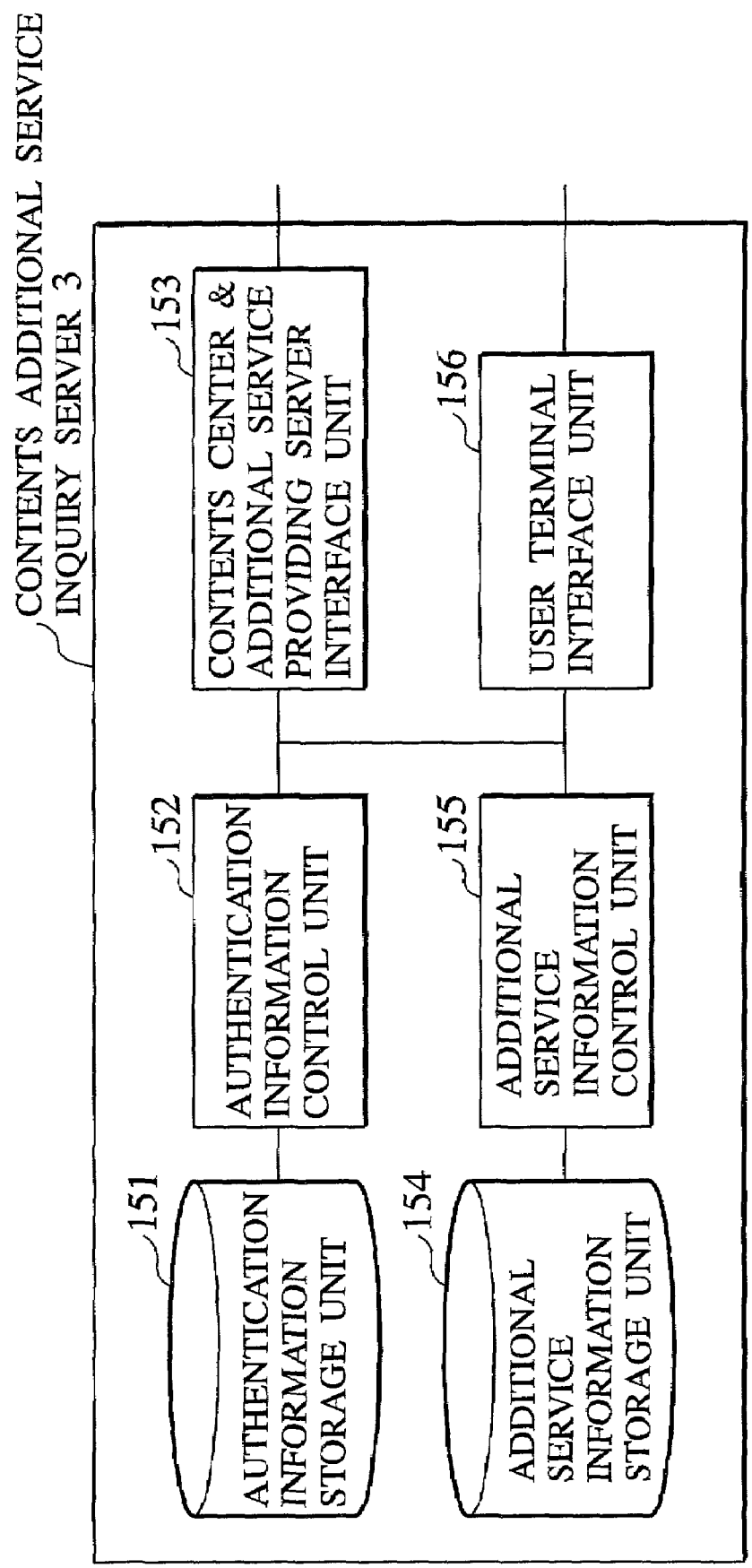
FIG. 15 is one exemplary configuration of a contents additional service inquiry server in the case of implementing a contents center authentication system.

FIG. 15 shows an internal configuration of the contents additional service inquiry server 3, which is the embodiment of the contents center authentication system in particular, in the additional service providing system which is one embodiment of the present invention.

In the figure, 151 is an authentication information storage unit for storing information such as the password that is utilized at a time of the authentication of the contents center 8, 152 is an authentication information control unit for carrying out the information control at a time of the authentication of the contents center 8, 153 is a contents center and additional service providing server interface unit for carrying out exchanges of information with the contents center 8 and the additional service providing servers 5 to 7, 154 is an additional service information storage unit for storing the related additional service information for each contents identifier, 155 is an additional service information control unit for carrying out the control of the registration and the reading of the additional service information, and 156 is a user terminal interface unit for carrying out exchanges of information with the user terminal 1.

The additional service information storage unit 154, the additional service information control unit 155 and the user terminal interface unit 156 are the same as the configuration of the correspondence table 4 and the contents additional service inquiry server 3 of FIG. 1, so that their description will be omitted.

FIG. 16 is a table showing that the internal configuration of the authentication information storage unit 151, the authentication information control unit 152 and the contents center and additional service providing server interface unit 153 in this embodiment has six kinds of configurations depending on the authentication methods. They are showing the following cases respectively.

(1a) The case where the identifier embedding means used by the contents center 8 and the original contents before the identifier embedding are available at the contents center 8, and the identifier embedding means and the original contents can be used by the contents additional service inquiry server 3.

(1b) The case where the identifier embedding means used by said contents center 8 and the original contents before the identifier embedding are available at the contents center 8, and it is not possible to use the identifier embedding means and the original contents at the contents additional service inquiry server 3 and the contents after the identifier embedding or the representative value, such as its hash value, alone is used.

(2a) The case where the original of contents before the identifier embedding that is possessed by said contents center 8 is available at the contents center 8, and it is possessed at the contents additional service inquiry server 3.

(2b) The case where the original of contents before the identifier embedding that is possessed by said contents center 8 is available at the contents center 8, and it is not possible to possess it at the contents additional service inquiry server 3 and the representative value such as a hash value of the original of contents before the identifier embedding alone is possessed.

(3a) The case where the identifier embedding means that is possessed by said contents center 8 is available at the contents center 8, and it is possessed at the contents additional service inquiry server 3.

(3b) The case where the identifier embedding means that is possessed by said contents center 8 is available at the contents center 8, and it is not possible to possess it at the contents additional service inquiry server 3 and the contents after the identifier embedding or the representative value such as its hash value alone is possessed.

Figure 17:
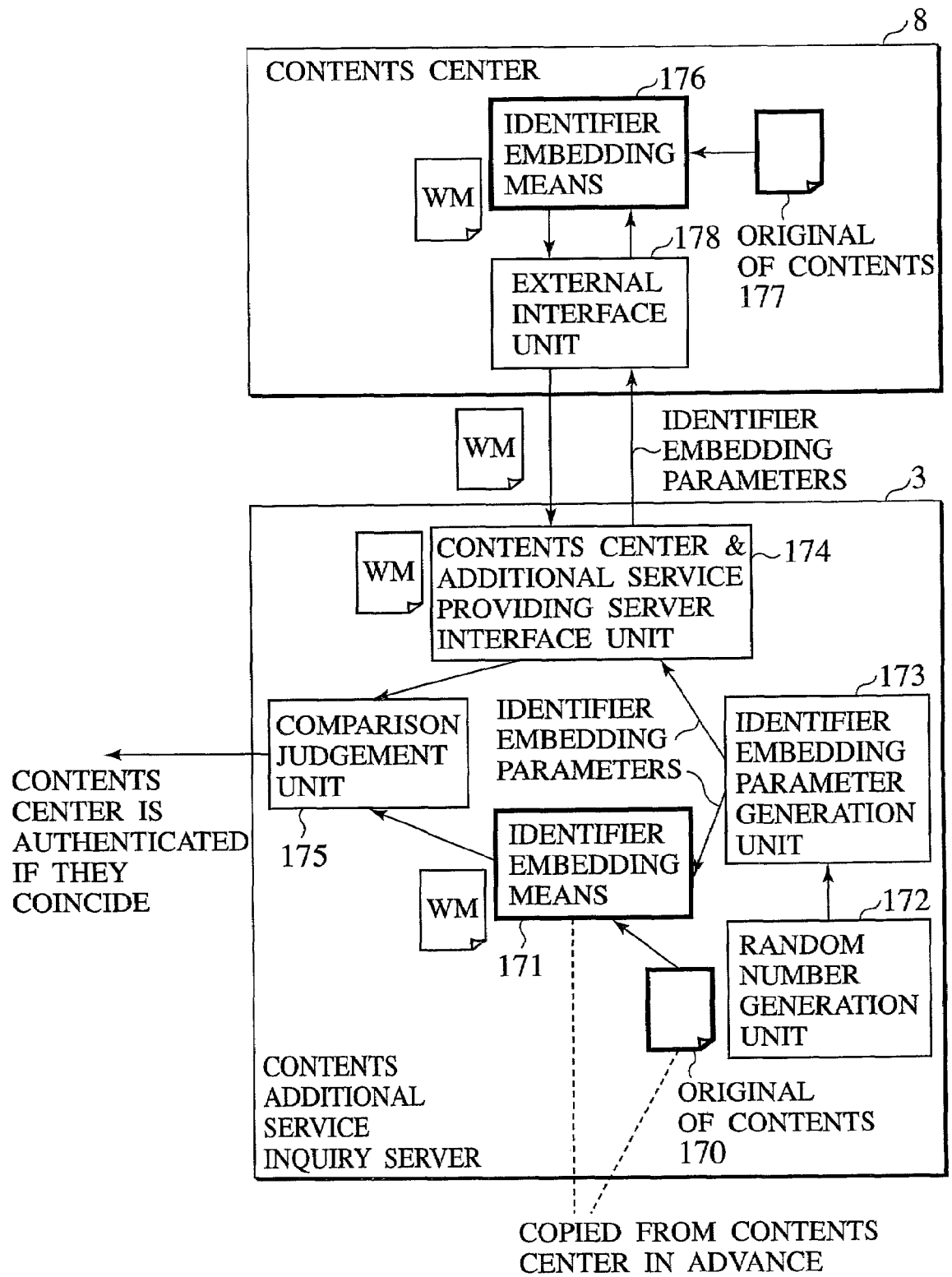
FIG. 17 is one example of an internal configuration of the contents center authentication system and a processing scheme in the case of (1a).

FIG. 17 shows the internal configuration and the processing scheme in the case of (1a). This scheme is the contents center authentication scheme that utilizes the fact that only the genuine contents center 8 includes the "original contents" (original contents before the identifier is embedded) and the "identifier embedding means".

In FIG. 17, in the contents additional service inquiry server 3, 170 and 171 are the original of contents before the identifier embedding and the identifier embedding means that are received in advance from the contents center, 172 is a random number generation unit for generating a random number to be used in generating the parameters of the identifier embedding means, 173 is an identifier embedding parameter generation unit for generating the parameters of the identifier embedding means according to the generated random number, 174 is a contents center and additional service providing server interface unit for transmitting said generated parameters of the identifier embedding means to the contents center 8 and receiving the contents after the identifier is embedded or the representative value such as its hash value, and 175 is a comparison judgement unit for comparing the contents after the identifier is embedded in the contents center 8 or the representative value such as its hash value with the contents after the identifier is embedded in the contents additional service inquiry server or the representative value such as its hash value, and authenticating the contents center 8 if they coincide.

Also, in the contents center 8, 178 is an external interface unit for receiving said generated parameters of the identifier embedding means from the contents additional service inquiry server 3 and transmitting the contents after the identifier is embedded or the representative value such as its hash value, 176 is the identifier embedding means for embedding the identifier with respect to the original of contents before the identifier embedding according to these parameters, and 177 is the original of contents.

Next, according to FIG. 17, the processing scheme of the contents center authentication system in the-case of (1a) will be described.

First, the contents additional service inquiry server 3 receives the identifier embedding means and the original of contents before the identifier embedding from the contents center 8 in advance, and stores them in the identifier embedding means 171 and the original of contents 170.

In the case where the registration request for the additional service corresponding to the contents identifier is received from the registration source, the identifier embedding parameter generation unit 173 generates the parameters of the identifier embedding means according to the random number generated by the random number generation unit 172.

These parameters are to be used in embedding the identifier by the identifier embedding means 171 and the original of contents 170, while it is also transmitted to the contents center 8 through the contents center and additional service providing server interface unit 174. At the contents center 8, the identifier is embedded by the identifier embedding means 176 and the original of contents 177 according to these parameters received by the external interface unit 178, and the contents after the identifier embedding (WM) is transmitted to the contents additional service inquiry server 3 through the external interface unit 178.

At the contents additional service inquiry server 3, that contents received by the contents center and additional service providing server interface unit 174 is compared with the contents after the identifier is embedded by the identifier embedding means 171 and the original of contents 170 at the comparison judgement unit 175, and the contents center 8 is authenticated if they coincide.

Here, depending on the speed of the communication path between the contents additional service inquiry server 3 and the contents center 8, it is possible to consider the case where it is difficult to transmit the contents, and in that case, it is possible to use a configuration that utilizes the representative value such as the hash value instead of the contents. In this configuration, there is a need to provide a hash value calculation means in the identifier embedding means, but it is the already existing means in the contents center 8 in many cases, so that there is no need to provide a separate means.

Also, the identifier embedding means and the original of contents before the identifier embedding are things that have properties of being already managed at the contents center 8 such that they are not leaked to begin with, so that it automatically also has the tolerance against the leakage in the authentication, and there is no need to provide a separate means.

In addition, at the communication path, the identifier embedding parameters and the contents after the watermark embedding or the representative value such as its hash value are transmitted/received, but these are things that have properties that the identifier embedding means and the original of contents before the identifier embedding will not be decoded even if they are eavesdropped to begin with, so that it has the tolerance against the pretending in the authentication.

Also, these parameters have their contents changed at every occasion of transmission/reception utilizing the random number, so that it also has the tolerance against the pretending that eavesdrops and interrupts the communications without carrying out the decoding.

Figure 18:
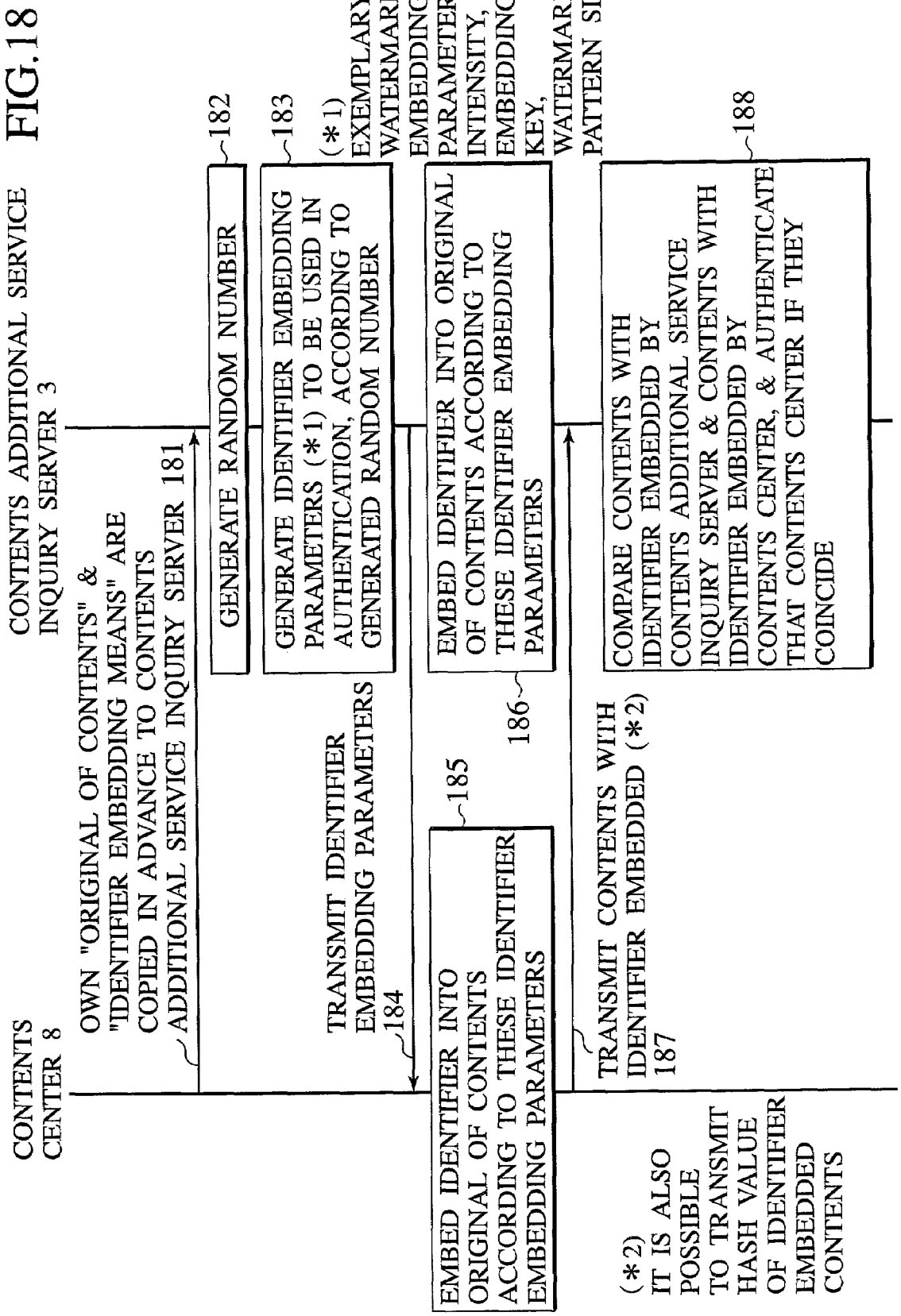
FIG. 18 is a processing sequence chart in the case of (1a).

FIG. 18 shows the processing sequence chart indicating what processing is carried out by each of the contents center 8 and the contents additional service inquiry server 3 in this case of (1a).

Next, according to FIG. 18, the processing sequence of the contents center authentication system in the case of (1a) will be described.

The contents center 8 copies the "original of contents" and the "identifier embedding means" possessed by itself to the contents additional service inquiry server 3 in advance (procedure 181). Here, the identifier embedding means is a program for embedding an electronic watermark, for example, to be concrete. The contents additional service inquiry server 3 generates the random number (procedure 182), and generates the identifier embedding parameters to be used in the authentication according to that generated random number value (procedure 183).

The identifier embedding parameters are a combination of a watermark intensity, a watermark basic pattern size, and a read out key, in the case of using the electronic watermark for the identifier embedding, for example. As a method for generating the identifier embedding parameters from the random number, there is a method for selecting the parameters corresponding to the generated random number, by preparing a table of numbers and the electronic watermark embedding parameter sets such as (1: watermark intensity 1, watermark basic pattern size 128, read out key 0022), (2: watermark intensity 2, watermark basic pattern size 128, read out key 0022), (3: watermark intensity 1, watermark basic pattern size 256, read out key 0022), for example.

The contents additional service inquiry server 3 transmits the identifier embedding parameters to the contents center 8 (procedure 184), and the contents center 8 embeds the identifier into the original of contents according to these identifier parameters (procedure 185). Also at the contents additional service inquiry server 3, the identifier is embedded into the original of contents according to the identical parameters (procedure 186).

The contents center 8 transmits the contents for which the embedding of the identifier is finished to the contents additional service inquiry server 3 (procedure 187). The contents additional service inquiry server 3 carries out the comparison of that contents and the contents for which the embedding of the identifier is made by the identical parameters, and authenticates that contents center 8 if they coincide (procedure 188).

It is also possible to use a method in which the hash calculation is carried out with respect to the contents for which the embedding of the identifier is made, and the hash values are compared. At this point, as the hash function, SHA-1 (Secure Hash Algorithm 1; FIPS180-1) for generating the hash value of 160 bits as developed by the U.S. National Bureau of Standards, MD5 (Message Digest 5; RFC1321) for generating the hash value of 128 bits as invented by Mr. Ronald L. Rivest, etc., will be used.

When these functions are used, it is possible to contract the huge still image contents or dynamic image contents to 160 bits or 128 bits, and use it as the representative value. This hash value is known to be calculated as different values at sufficiently high probability if the original contents are different, and can be utilized in the judgement as to whether the identifier embedded contents are the same thing or not.

Figure 19:
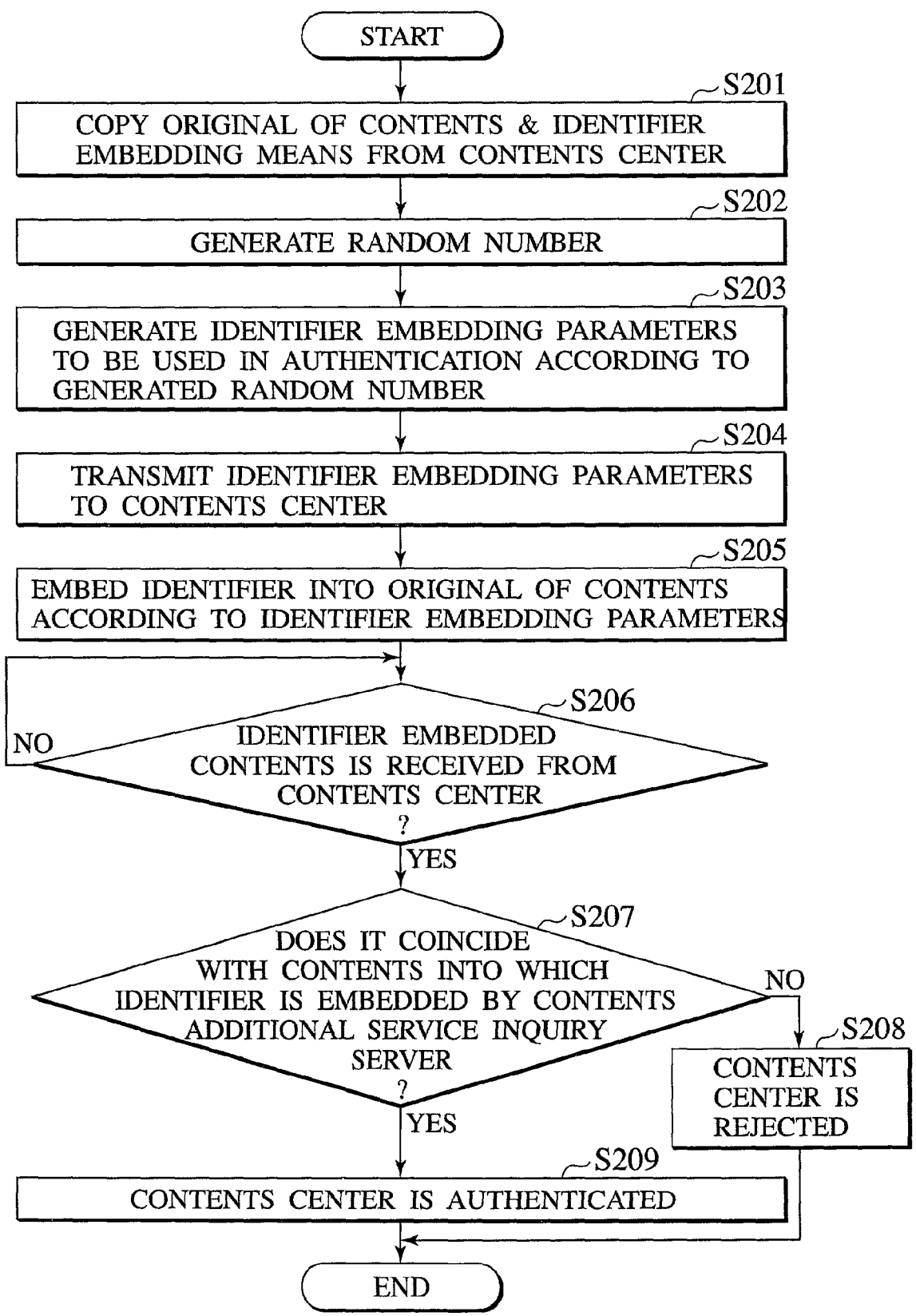
FIG. 19 is one example of a processing flow to be executed by the contents additional service inquiry server in FIG. 18.

FIG. 19 shows one example of the processing flow to be executed by the contents additional service inquiry server 3 in the case of (1a).

Next, according to FIG. 19, the processing to be executed by the contents additional service inquiry server 3 in the case of (1a) will be described.

First, the original of contents and the identifier embedding means are copied from the contents center 8 in advance (step S201). Next, the random number is generated (step S202), and the identifier embedding parameters to be used in the authentication are generated according to that generated random number value (step S203). The concrete example of the identifier embedding parameters includes the watermark intensity, the watermark basic pattern size, the read out key, etc.

The contents additional service inquiry server 3 transmits the identifier embedding parameters to the contents center 8 (step S204), embeds the identifier into the original of contents according to the identical parameters (step S205), and waits for receiving the contents for which the embedding of the identifier is finished from the contents center 8 (step S206).

When that contents is received, the comparison of that contents and the contents for which the embedding of the identifier is made by the identical parameters is carried out (step S207), and if they coincide, that contents center 8 is authenticated (step S208). If they do not coincide, that contents center 8 is rejected (step S209). It is also possible to use a method in which the hash calculation with respect to the contents for which the identifier embedding is made is carried out if the hash value is received instead of that contents, and the hash values are compared.

Figure 20:
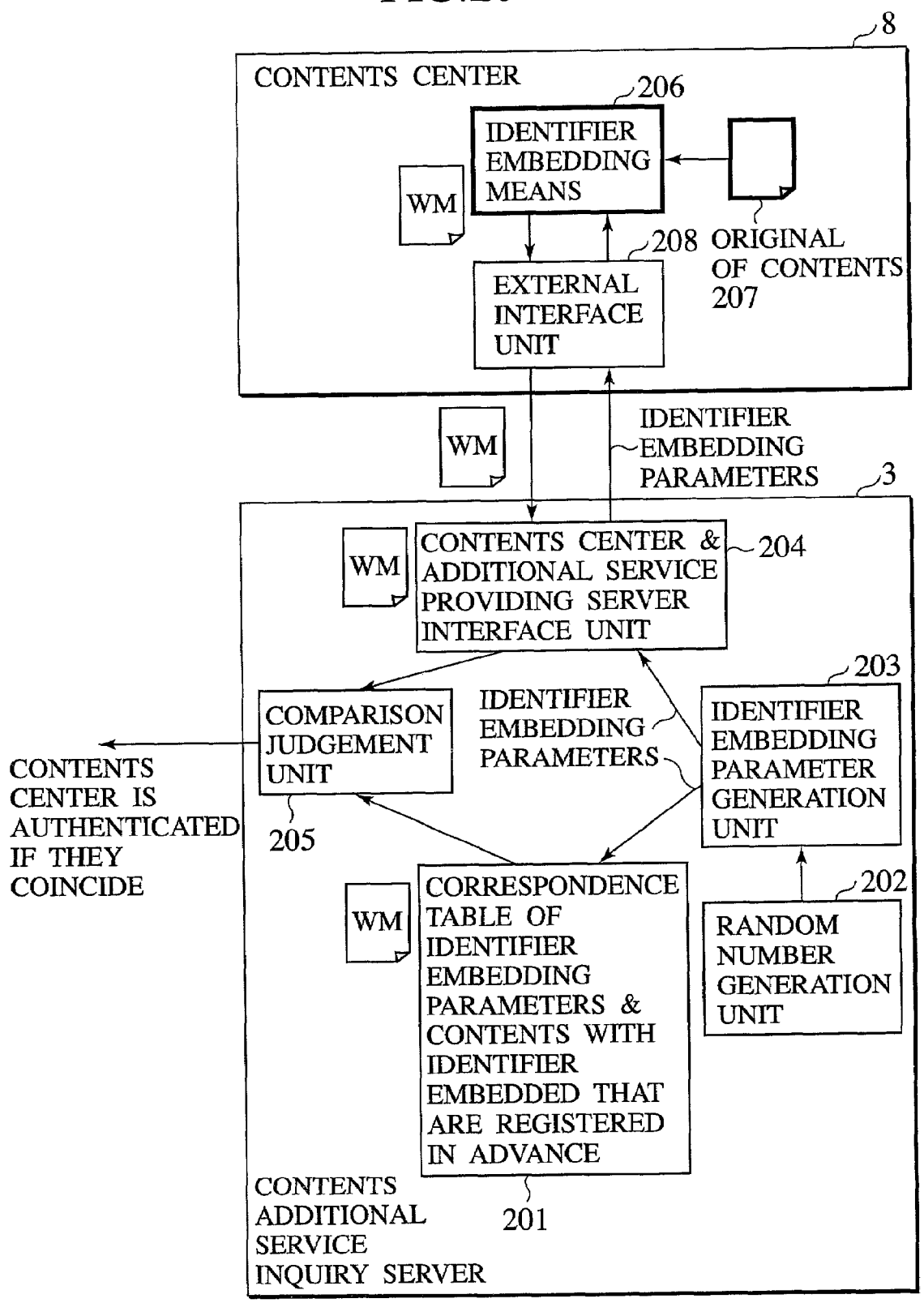
FIG. 20 is one example of an internal configuration of the contents center authentication system and a processing scheme in the case of (1b).

FIG. 20 shows the internal configuration and the processing scheme in the case of (1b). This scheme is the contents center authentication scheme in which the identifier embedded contents is generated in the contents additional service inquiry server 3 by looking up the correspondence table of the identifier embedding parameters and the identifier embedded contents that are registered from the contents center 8 in advance, in the case where the "original of contents" and the "identifier embedding means" identical to those of the contents center 8 cannot be possessed in the contents additional service inquiry server 3 unlike the scheme of (1a).

In FIG. 20, in the contents additional service inquiry server 3, 201 is a correspondence table of the parameter values and the contents after the embedding or the representative value such as its hash value in the case of carrying out the embedding of the identifier by changing the embedding parameters such as the embedding intensity to various values, 202 is a random number generation unit for generating a random number to be used in generating the identifier embedding parameters, 203 is an identifier embedding parameter generation unit for generating the identifier embedding parameters according to the generated random number, 204 is a contents center and additional service providing server interface unit for transmitting said generated parameters of the identifier embedding means to the contents center 8 and receiving the contents after the identifier is embedded or the representative value such as its hash value, and 205 is a comparison judgement unit for comparing the contents after the identifier is embedded in the contents center or the representative value such as its hash value with the contents after the identifier embedding that is generated by using the correspondence table 201 in the contents additional service inquiry server or the representative value such as its hash value, and authenticating the contents center 8 if they coincide.

Also, in the contents center 8, 208 is an external interface unit for receiving said generated parameters of the identifier embedding means from the contents additional service inquiry server 3 and transmitting the contents after the identifier is embedded or the representative value such as its hash value, 206 is the identifier embedding means for embedding the identifier with respect to the original of contents before the identifier embedding according to these parameters, and 207 is the original of contents.

Next, according to FIG. 20, the processing scheme of the contents center authentication system in the case of (1b) will be described.

First, the contents additional service inquiry server 3 receives and stores the correspondence table of the parameter values and the contents after the embedding or the representative value such as its hash value in the case of carrying out the embedding of the identifier by changing the embedding parameters such as the embedding intensity to various values, from the contents center 8 in advance.

In the case where the registration request for the additional service corresponding to the contents identifier is received from the registration source, the identifier embedding parameter generation unit 203 generates the parameters of the identifier embedding means according to the random number generated by the random number generation unit 202. These parameters are to be used in generating the contents after the embedding or the representative value such as its hash value by the correspondence table 201, while it is also transmitted to the contents center 8 through the contents center and additional service providing server interface unit 204.

At the contents center 8, the identifier is embedded by the identifier embedding means 206 and the original of contents 207 according to these parameters received by the external interface unit 208, and the contents after the identifier embedding (WM) is transmitted to the contents additional service inquiry server 3 through the external interface unit 208.

At the contents additional service inquiry server 3, that contents received by the contents center and additional service providing server interface unit 204 is compared with the contents after the embedding generated by the correspondence table 201 at the comparison judgement unit 205, and the contents center 8 is authenticated if they coincide.

Here, depending on the speed of the communication path between the contents additional service inquiry server 3 and the contents center 8, it is possible to consider the case where it is difficult to transmit/receive the contents, and in that case, it is possible to use a configuration that utilizes the representative value such as the hash value instead of the contents. In this configuration, there is a need to provide a hash value calculation means in the identifier embedding means, but it is the already existing means in the contents center 8 in many cases, so that there is no need to provide a separate means.

Also, the identifier embedding means and the original of contents before the identifier embedding are things that have properties of being already managed at the contents center 8 such that they are not leaked to begin with, so that it automatically also has the tolerance against the leakage in the authentication, and there is no need to provide a separate means.

In addition, at the communication path, the identifier embedding parameters and the contents after the watermark embedding or the representative value such as the hash value are transmitted/received, but these are things that have properties that the identifier embedding means and the original of contents before the identifier embedding will not be decoded even if they are eavesdropped to begin with, so that it has the tolerance against the pretending in the authentication.

Also, these parameters have their contents changed at every occasion of transmission/reception utilizing the random number, so that it also has the tolerance against the pretending that eavesdrops and interrupts the communications without carrying out the decoding.

Figure 21:
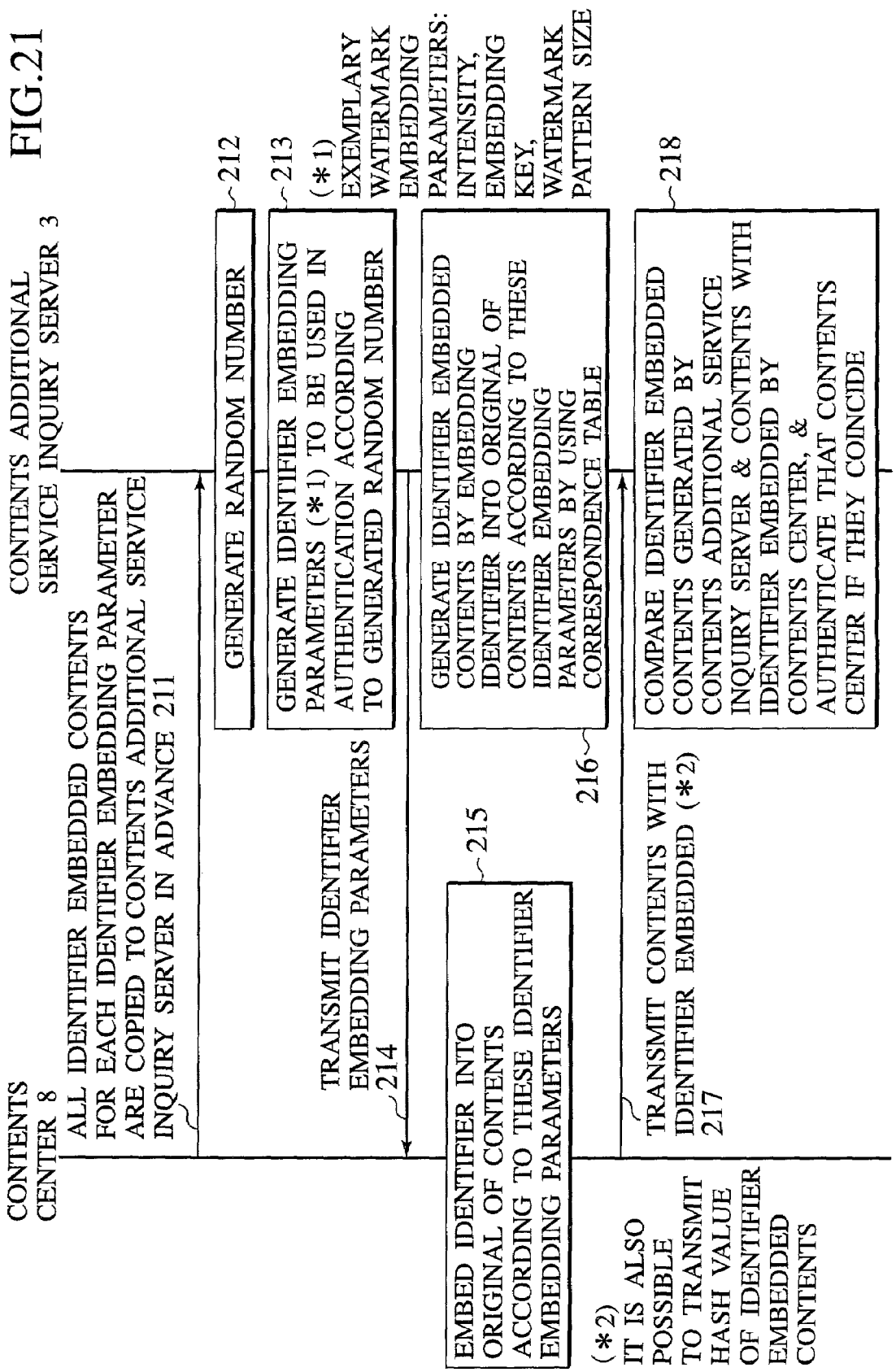
FIG. 21 is a processing sequence chart in the case of (1b).

FIG. 21 shows the processing sequence chart indicating what processing is carried out by each of the contents center 8 and the contents additional service inquiry server 3 in this case of (1b).

Next, according to FIG. 21, the processing sequence of the contents center authentication system in the case of (1b) will be described.

The contents center 8 copies the correspondence table of the identifier embedding parameters and the identifier embedded contents to the contents additional service inquiry server 3 in advance (procedure 211). The contents additional service inquiry server 3 randomly generates an integer from 1 to the number of rows of the correspondence table (procedure 212), and generates the identifier embedding parameters to be used in the authentication as described in the row of the correspondence table corresponding to that randomly generated integer (procedure 213).

The concrete example of the identifier embedding parameters includes the watermark intensity, the watermark basic pattern size, and the read out key, etc.

The contents additional service inquiry server 3 transmits the identifier embedding parameters to the contents center 8 (procedure 214), and the contents center 8 embeds the identifier into the original of contents according to these identifier parameters (procedure 215). The contents additional service inquiry server 3 generates the identifier embedded contents as described in the row of the correspondence table corresponding to that randomly generated integer (procedure 216).

The contents center 8 transmits the contents for which the embedding of the identifier is finished to the contents additional service inquiry server 3 (procedure 217). The contents additional service inquiry server 3 carries out the comparison of that contents and the identifier embedded contents generated by the identical parameters, and authenticates that contents center 8 if they coincide (procedure 218). It is also possible to use a method in which the hash calculation is carried out with respect to the contents for which the embedding of the identifier is made, and the hash values are compared.

Figure 22:
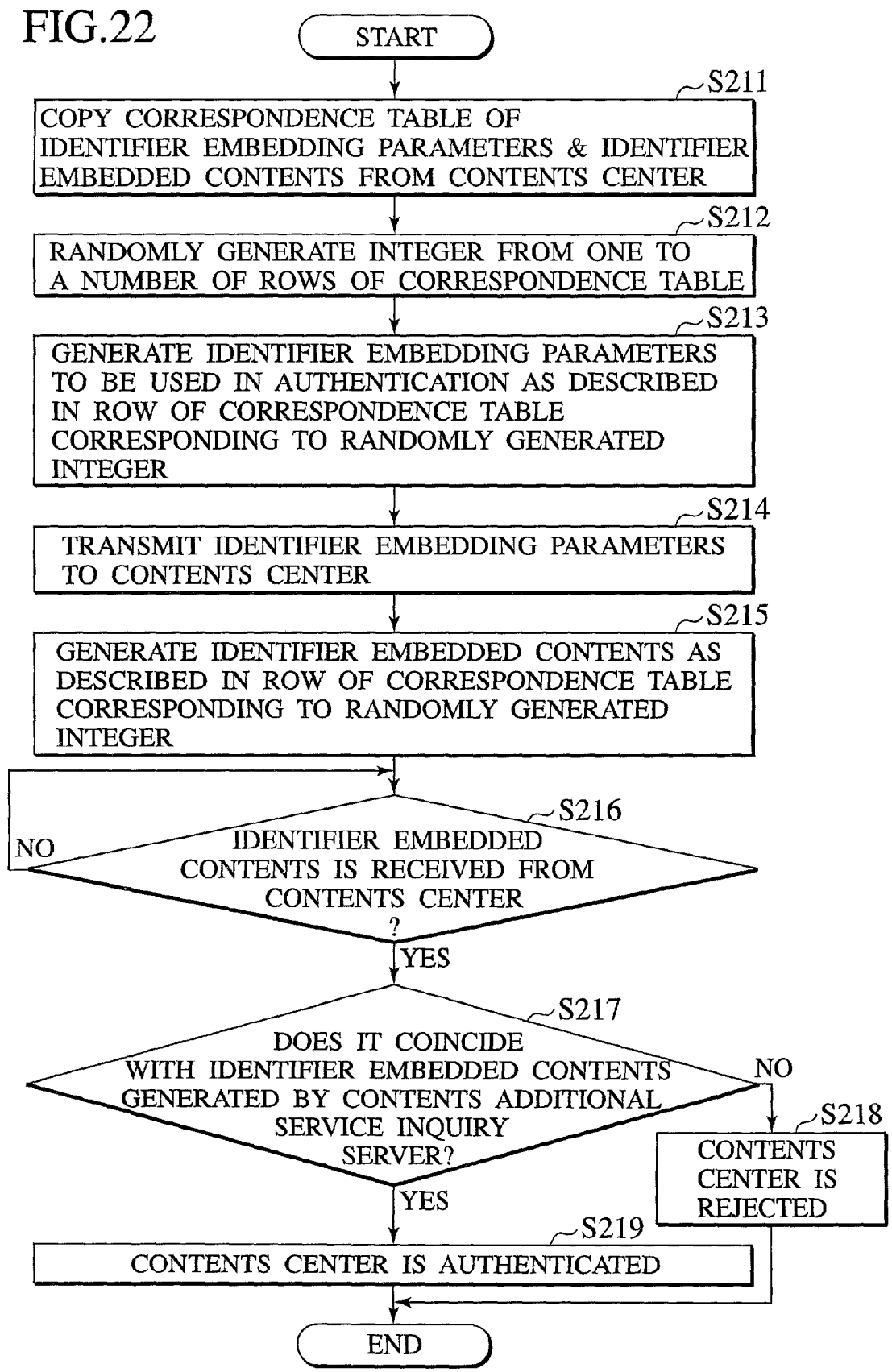
FIG. 22 is one example of a processing flow to be executed by the contents additional service inquiry server in FIG. 21.

FIG. 22 shows one example of the processing flow to be executed by the contents additional service inquiry server 3 in the case of (1b).

Next, according to FIG. 22, the processing to be executed by the contents additional service inquiry server 3 in the case of (1b) will be described.

First, the correspondence table of the identifier embedding parameters and the identifier embedded contents is copied from the contents center 8 in advance (step S211). Next, the integer from 1 to the number of rows of the correspondence table is randomly generated (step S212), and the identifier embedding parameters to be used in the authentication are generated according to that randomly generated integer (step S213). The concrete example of the identifier embedding parameters includes the watermark intensity, the watermark basic pattern size, the read out key, etc.

The contents additional service inquiry server 3 transmits the identifier embedding parameters to the contents center 8 (step S214), generates the identifier embedded contents in the case of embedding the identifier into the original of contents by using said correspondence table according to the identical parameters (step S215), and waits for receiving the contents for which the embedding of the identifier is finished from the contents center 8 (step S216).

When that contents is received, the comparison of that contents and the identifier embedded contents generated by the identical parameters is carried out (step S217), and if they coincide, that contents center 8 is authenticated (step S218). If they do not coincide, that contents center 8 is rejected (step S219). It is also possible to use a method in which the hash calculation with respect to the contents generated by the contents additional service inquiry server 3 is carried out if the hash value is received instead of that contents, and the hash values are compared.

FIG. 23 shows an exemplary configuration of this correspondence table. The correspondence table has a format of a list of the corresponding watermark embedded contents for each combination of parameters such as the watermark intensity, the watermark basic pattern size, and the read out key, as shown in this FIG. 23. In the correspondence table shown in FIG. 23, regarding the contents, it is a file name that indicates the location of the contents, and the entity of the contents uses the separate file management, but it is also possible to directly write the representative value such as the hash value into the correspondence table instead.

Also, it is preferable that the correspondence table registers many combinations and many patterns are generated according to the random numbers and transmitted/received through the communication path, in view of the tolerance against the pretending. There is a limit to the combinations, but it is possible to maintain the tolerance by copying the correspondence table constructed from new combinations from the contents center to the contents additional service inquiry server, regularly or occasionally.

Figure 24:
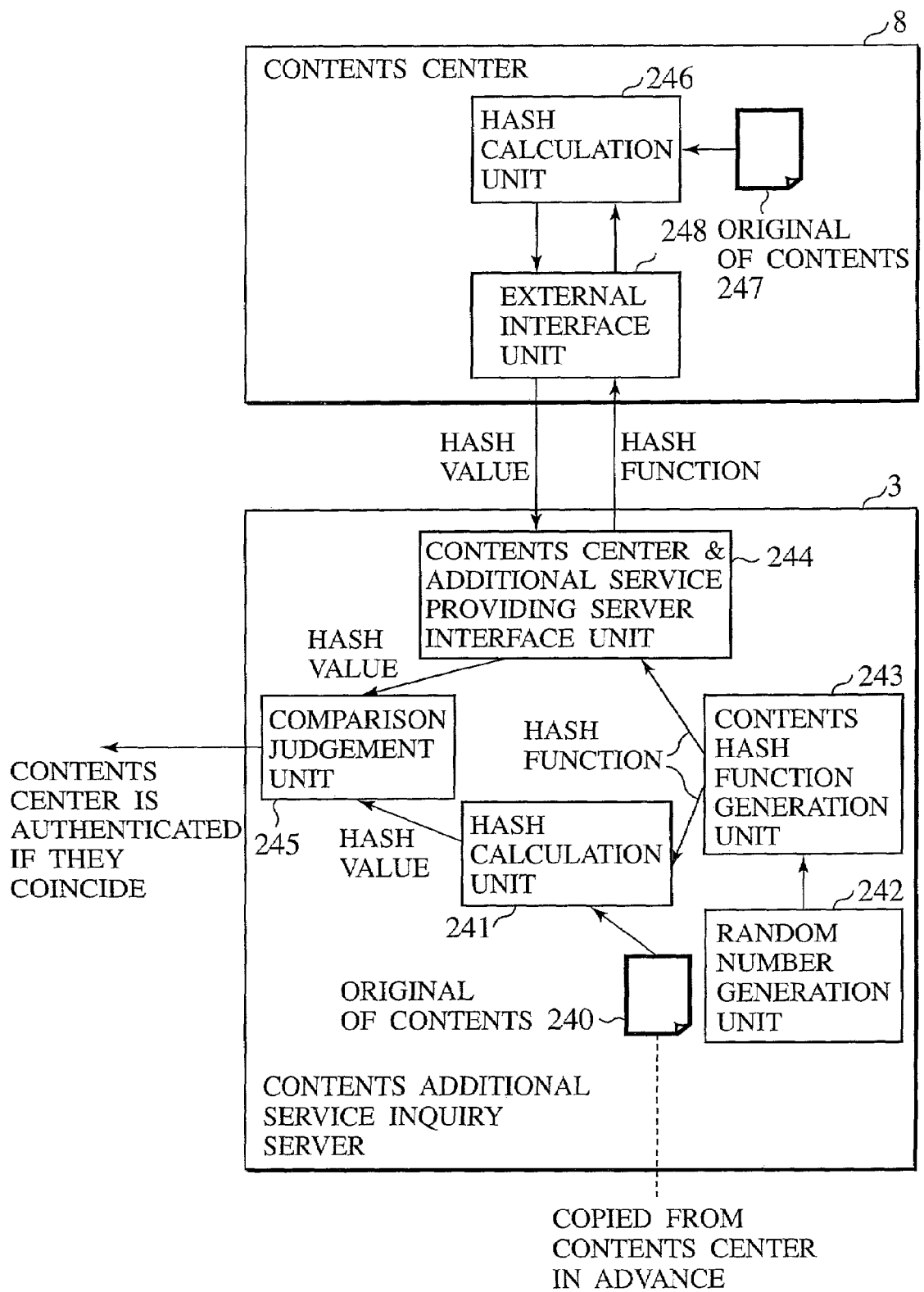
FIG. 24 is one example of an internal configuration of the contents center authentication system and a processing scheme in the case of (2a).

FIG. 24 shows the internal configuration and the processing scheme in the case of (2a). This scheme is the contents center authentication scheme that only utilizes the fact that only the genuine contents center 8 has the "original of contents (original of contents before the identifier embedding)", unlike (1a).

In FIG. 24, in the contents additional service inquiry server 3, 240 is the original of contents, 241 is a hash calculation unit for storing the original of contents before the identifier embedding from the contents center 8 in advance and carrying out the hash calculation, 242 is a random number generation unit for generating a random number to be used in generating the hash function, 243 is a hash function generation unit for generating the hash function according to the generated random number, 244 is a contents center and additional service providing server interface unit for transmitting said generated hash function to the contents center 8 and receiving the hash value, and 245 is a comparison judgement unit for comparing the hash value calculated in the contents center 8 with the hash value calculated in the contents additional service inquiry server 3, and authenticating the contents center 8 if they coincide.

Also, in the contents center 8, 248 is an external interface unit for receiving said generated hash function from the contents additional service inquiry server 3 and transmitting the hash value, 246 is a hash calculation unit for carrying out the hash calculation with respect to the original of contents before the identifier embedding according to that hash function, and 247 is the original of contents.

Next, according to FIG. 24, the processing scheme of the contents center authentication system in the case of (2a) will be described.

First, the contents additional service inquiry server 3 receives the original of contents before the identifier embedding from the contents center 8 in advance, and stores them in the hash calculation unit 241 and the original of contents 240.

In the case where the registration request for the additional service corresponding to the contents identifier is received from the registration source, the hash function generation unit 243 generates the hash function according to the random number generated by the random number generation unit 242. These parameters are to be used in carrying out the hash calculation by the hash calculation unit 241 and the original of contents 240, while it is also transmitted to the contents center 8 through the contents center and additional service providing server interface unit 244.

At the contents center 8, the hash calculation is carried out by the hash calculation unit 246 and the original of contents 247 according to that hash function received by the external interface unit 248, and the hash value is transmitted to the contents additional service inquiry server 3 through the external interface unit 248.

At the contents additional service inquiry server 3, that hash value received by the contents center and additional service providing server interface unit 244 is compared with the hash value calculated by the hash calculation unit 241 and the original of contents 240 at the comparison judgement unit 245, and the contents center is authenticated if they coincide.

Here, unlike (1a), the contents are not transmitted/received through the communication path. This is because the original of contents is the only available contents but the original of contents has property of being already managed at the contents center 8 such that it is not leaked to begin with, so that it cannot be utilized at the communication path. Note that the hash calculation unit is the already existing means in the contents center 8 in many cases, so that there is no need to provide a separate means.

Also, the identifier embedding means and the original of contents before the identifier embedding are things that have properties of being already managed at the contents center 8 such that they are not leaked to begin with, so that it automatically also has the tolerance against the leakage in the authentication, and there is no need to provide a separate means.

In addition, at the communication path, the hash function and the hash value are transmitted/received, but these are things that have properties that the original of contents before the identifier embedding will not be decoded even if it is eavesdropped to begin with, so that it has the tolerance against the pretending in the authentication.

Also, that hash function has its content changed at every occasion of transmission/reception utilizing the random number, so that it also has the tolerance against the pretending that eavesdrops and interrupts the communications without carrying out the decoding.

Figure 25:
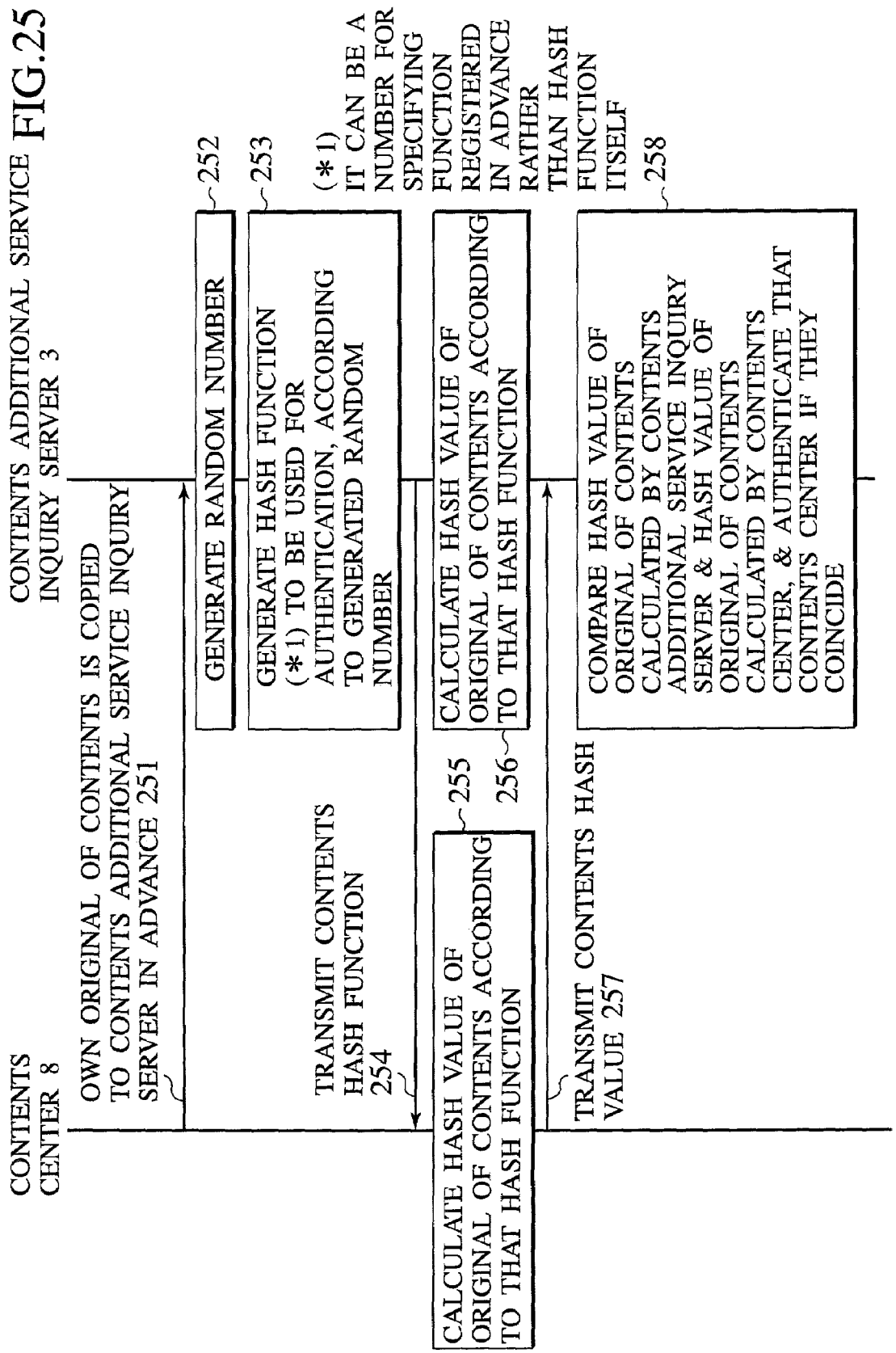
FIG. 25 is a processing sequence chart in the case of (2a).

FIG. 25 shows the processing sequence chart indicating what processing is carried out by each of the contents center 8 and the contents additional service inquiry server 3 in this case of (2a).

Next, according to FIG. 25, the processing sequence of the contents center authentication system in the case of (2a) will be described.

The contents center 8 copies the "original of contents" possessed by itself to the contents additional service inquiry server 3 in advance (procedure 251). The contents additional service inquiry server 3 generates the random number (procedure 252), and generates the hash function to be used in the authentication according to that generated random number value (procedure 253). At this point, as a concrete hash function generation method, there is a method in which a correspondence table of numbers and the hash function programs is prepared and the hash function program corresponding to the generated random number is selected. Also, as another embodiment, there is also a method in which the hash function of the type called message authentication code (MAC) where the hash function is operated by a secret key is registered in advance and utilized at the contents center and the additional service providing servers, and the random number is regarded as that secret key.

The contents additional service inquiry server 3 transmits the hash function to the contents center 8 (procedure 254), and the contents center 8 calculates the hash value of the original of contents according to that hash function (procedure 255). Also at the contents additional service inquiry server 3, the hash value of the original of contents is calculated according to the identical parameters (procedure 256).

The contents center 8 transmits the hash value to the contents additional service inquiry server (procedure 257). The contents additional service inquiry server carries out the comparison of that hash value and the hash value calculated by the contents additional service inquiry server 3, and authenticates that contents center 8 if they coincide (procedure 258).

Note that the information to be transmitted at the procedure 254 may be a number for specifying a function that is registered in the contents center 8 and the contents additional service inquiry server 3 in advance, rather than the hash function itself.

Figure 26:
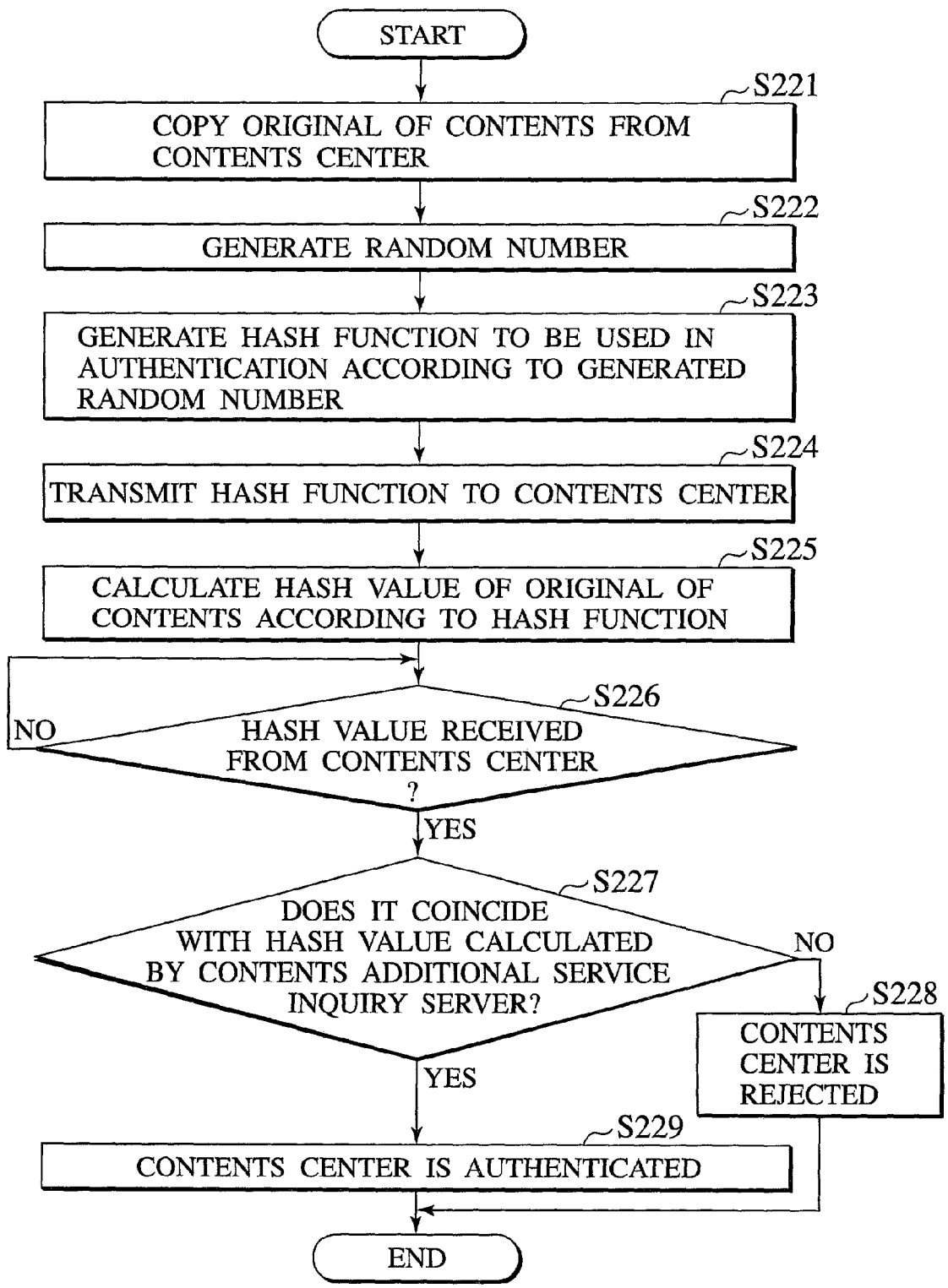
FIG. 26 is one example of a processing flow to be executed by the contents additional service inquiry server in FIG. 25.

FIG. 26 shows one example of the processing flow to be executed by the contents additional service inquiry server 3 in the case of (2a).

Next, according to FIG. 26, the processing to be executed by the contents additional service inquiry server 3 in the case of (2a) will be described.

First, the original of contents is copied from the contents center 8 in advance (step S221). Next, the random number is generated (step S222), and the hash function to be used in the authentication is generated according to that generated random number value (step S223).

The contents additional service inquiry server 3 transmits the hash function to the contents center 8 (step S224), calculates the hash value of the original of contents according to the identical hash function (step S225), and waits for receiving the hash value from the contents center 8 (step S226).

When that hash value is received, the comparison of that hash value and the hash value calculated by the contents additional service inquiry server is carried out (step S227), and if they coincide, that contents center 8 is authenticated (step S229). If they do not coincide, that contents center 8 is rejected (step S228).

Figure 27:
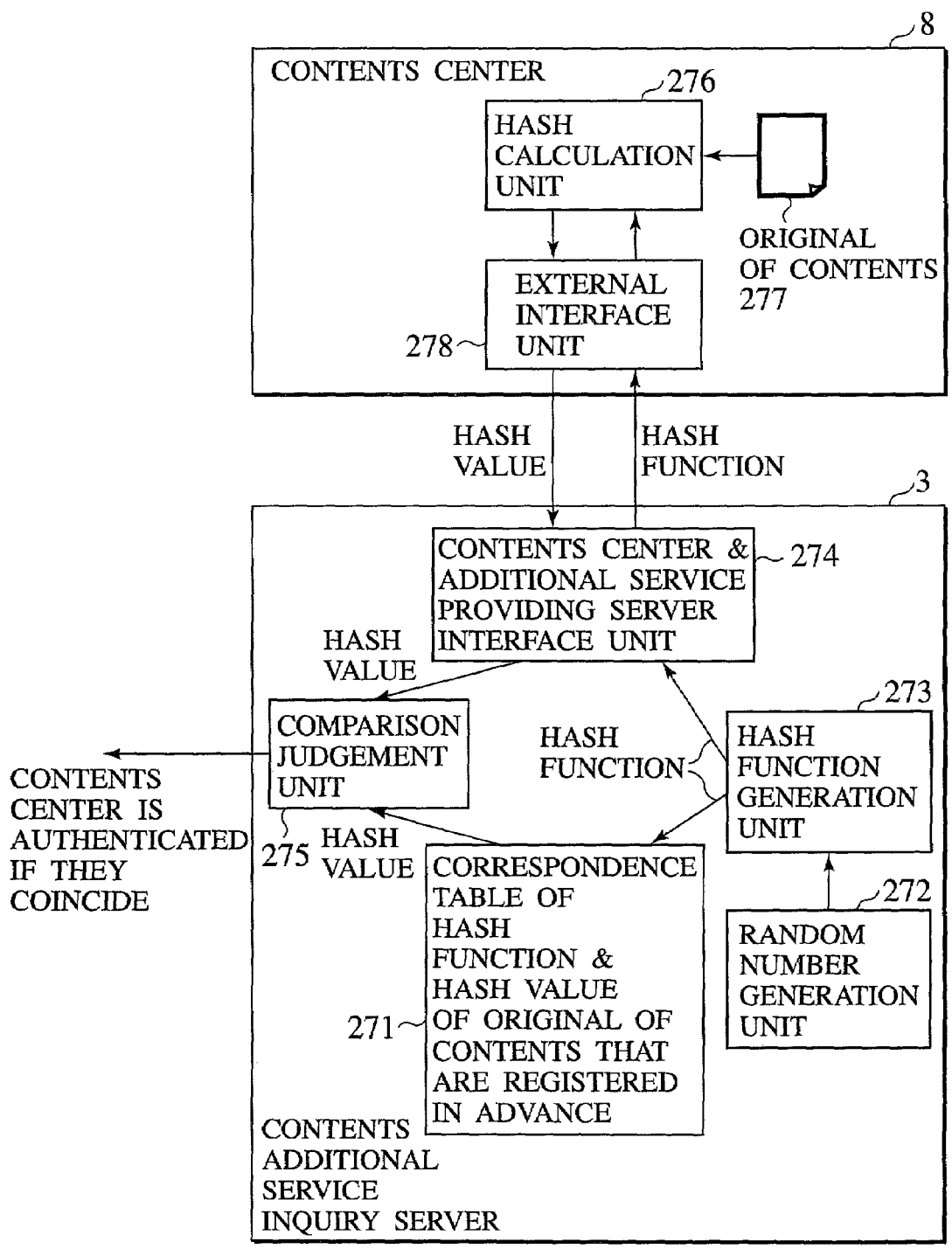
FIG. 27 is one example of an internal configuration of the contents center authentication system and a processing scheme in the case of (2b).
Figure 28:
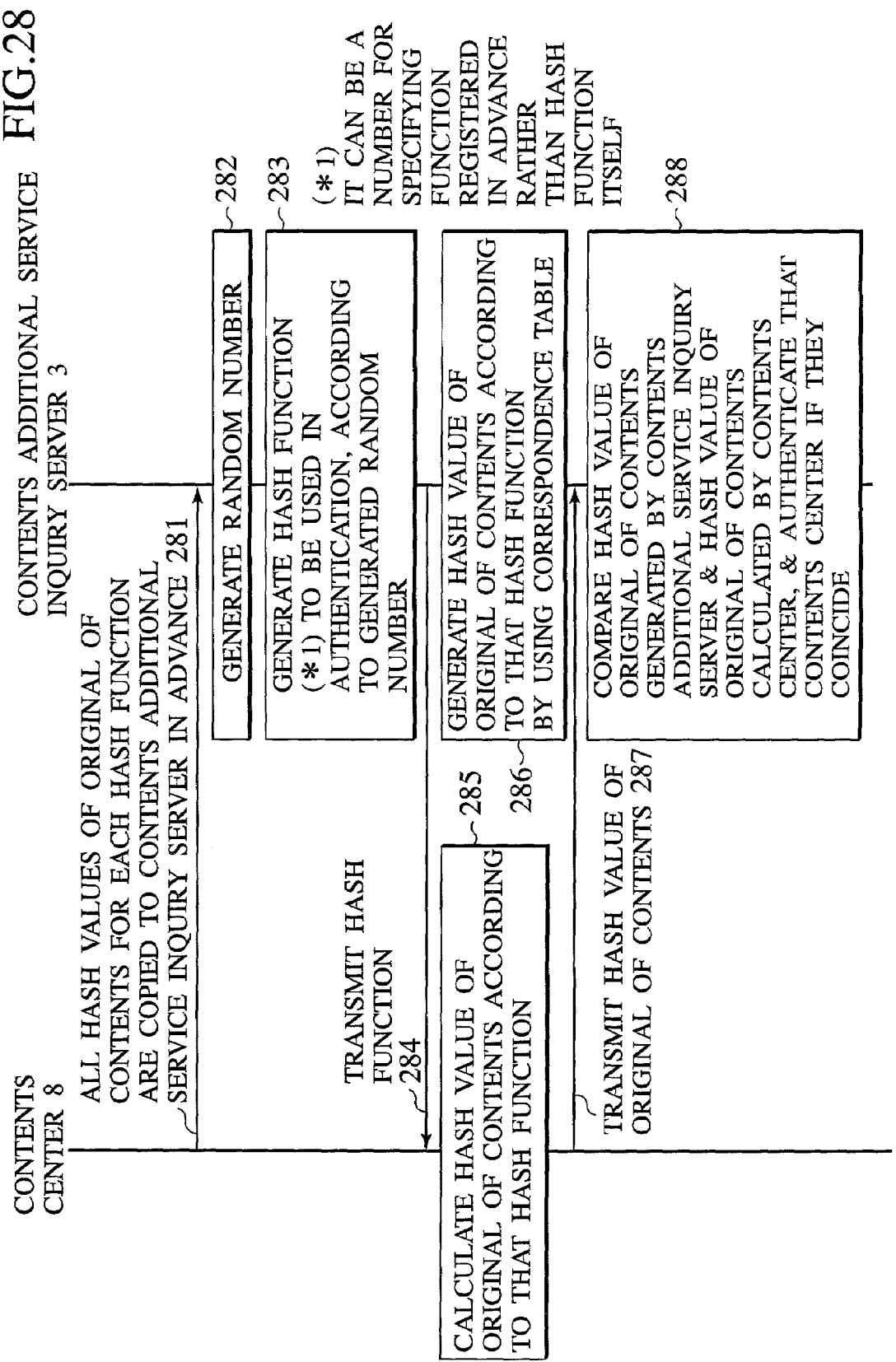
FIG. 28 is a processing sequence chart in the case of (2b).

FIG. 27 shows the internal configuration and the processing scheme in the case of (2b). This scheme is the contents center authentication scheme in which the hash value of the original of contents is generated in the contents additional service inquiry server 3 by looking up the correspondence table of the hash function and the hash value of the original of contents that are registered from the contents center 8 in advance, in the case where the "original of contents" identical to that of the contents center 8 cannot be possessed in the contents additional service inquiry server 3 unlike the scheme of (2a).

In FIG. 27, in the contents additional service inquiry server 3, 271 is a correspondence table of the hash function and the hash value of the original of contents in the case of calculating the hash value of the original of contents by changing the hash function variously, 272 is a random number generation unit for generating a random number to be used in generating the hash function, 273 is an identifier embedding parameter generation unit for generating the hash function according to the generated random number, 274 is a contents center and additional service providing server interface unit for transmitting said generated hash function to the contents center 8 and receiving the hash value, and 275 is a comparison judgement unit for comparing the has value calculated in the contents center with the hash value generated by using said table in the contents additional service inquiry server 3, and authenticating the contents center if they coincide.

Also, in the contents center 8, 278 is an external interface unit for receiving said generated hash function from the contents additional service inquiry server and transmitting the hash value, 276 is the hash calculation unit for calculating the hash value with respect to the original of contents according to that hash function, and 277 is the original of contents.

Next, according to FIG. 27, the processing scheme of the contents center authentication system in the case of (2b) will be described.

First, the contents additional service inquiry server 3 receives and stores the correspondence table 271 of the hash function and the hash value of the original of contents in the case of calculating the hash value of the original of contents by changing the hash function variously, from the contents center 8 in advance.

In the case where the registration request for the additional service corresponding to the contents identifier is received from the registration source, the hash function generation unit 273 generates the hash function according to the random number generated by the random number generation unit 272. This hash function is to be used in generating the hash value of the original of contents by the correspondence table 271, while it is also transmitted to the contents center 8 through the contents center and additional service providing server interface unit 274.

At the contents center 8, the hash calculation is carried out by the hash calculation unit 276 and the original of contents 277 according to that hash function received by the external interface unit 278, and the hash value is transmitted to the contents additional service inquiry server 3 through the external interface unit 278.

At the contents additional service inquiry server 3, that has value received by the contents center and additional service providing server interface unit 274 is compared with the hash value generated by the correspondence table 271 at the comparison judgement unit 275, and the contents center 8 is authenticated if they coincide.

Here, unlike (1b), the contents are not transmitted/received through the communication path. This is because the original of contents is the only available contents but the original of contents has property of being already managed at the contents center 8 such that it is not leaked to begin with, so that it cannot be utilized at the communication path. Note that the hash calculation unit is the already existing means in the contents center 8 in many cases, so that there is no need to provide a separate means.

Also, the identifier embedding means and the original (procedure 284), and the contents center 8 calculates the hash value of the original of contents according to that hash function (procedure 285). Also at the contents additional service inquiry server 3, the hash value of the original of contents is calculated according to the identical hash function by using said correspondence table (procedure 286).

The contents center 8 transmits the calculated hash value to the contents additional service inquiry server 3 (procedure 287). The contents additional service inquiry server 3 carries out the comparison of that hash value and the hash value generated from said correspondence table, and authenticates that contents center 8 if they coincide (procedure 288).

Note that the information to be transmitted at the procedure 284 may be a number for specifying a function that is registered in the contents center 8 and the contents additional service inquiry server 3 in advance, rather than the hash function itself.

Figure 29:
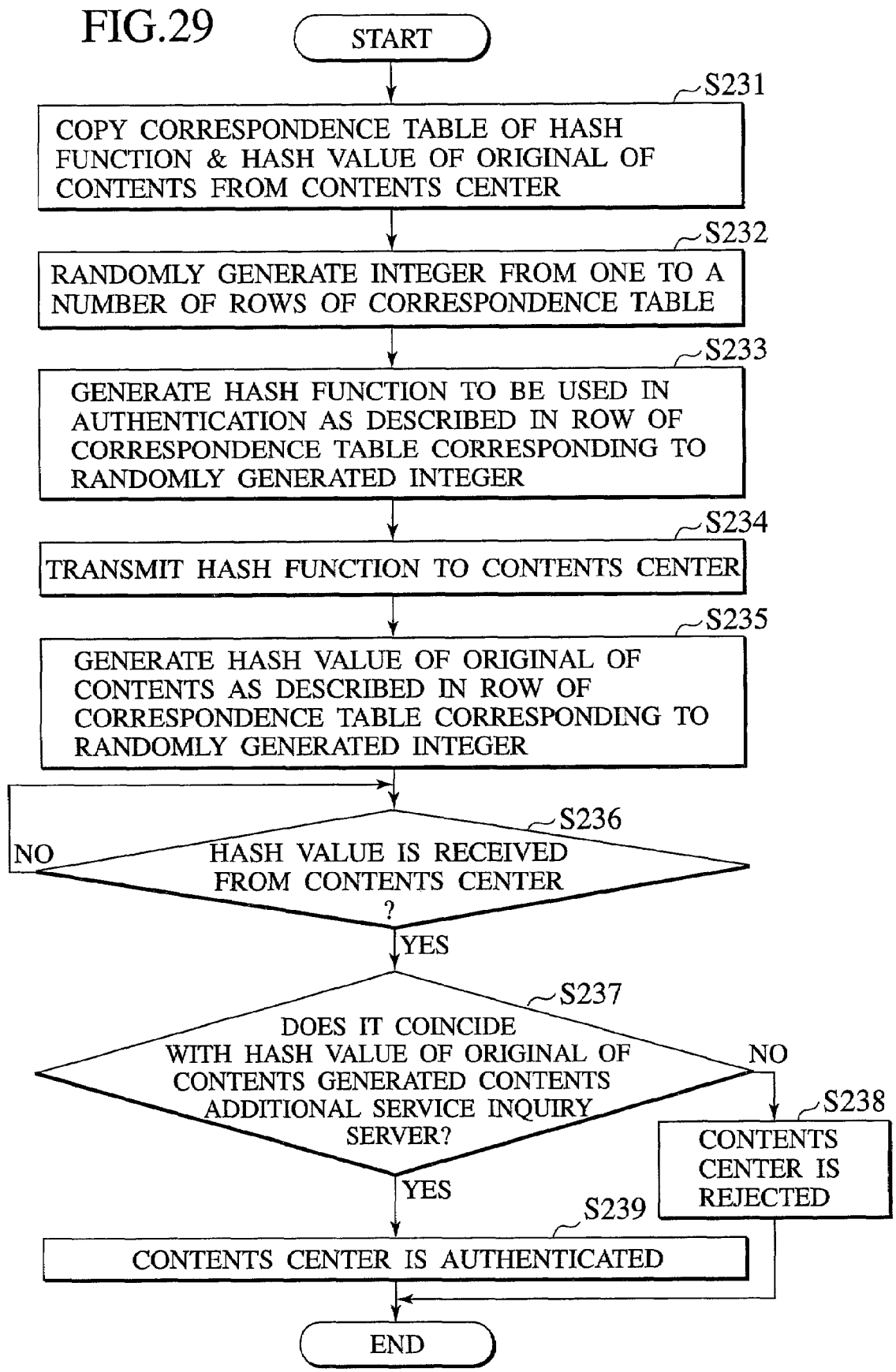
FIG. 29 is one example of a processing flow to be executed by the contents additional service inquiry server in FIG. 28.

FIG. 29 shows one example of the processing flow to be executed by the contents additional service inquiry server 3 in the case of (2b).

Next, according to FIG. 29, the processing to be executed by the contents additional service inquiry server 3 in the case of (2b) will be described.

First, the correspondence table of the hash function and the hash value of the original of contents is copied from the contents center 8 in advance (step S231). Next, the integer from 1 to the number of rows of the correspondence table is randomly generated (step S232), and the hash function to be used in the authentication as described in the row of the correspondence table corresponding to that randomly generated integer is generated (step S233).

The contents additional service inquiry server 3 transmits the hash function to the contents center 8 (step S234), generates the hash value of the original of contents as described in the row of the correspondence table corresponding to that randomly generated integer (step S235), and waits for receiving the hash value from the contents center 8 (step S236).

When that hash value is received, the comparison of that hash value and the hash value generated by the contents additional service inquiry server 3 is carried out (step S237), and if they coincide, that contents center 8 is authenticated (step S239). If they do not coincide, that contents center 8 is rejected (step S238).

The configuration of the correspondence table only comprises a plurality of rows of a combination of the hash function and the original of contents as described above, so that the description of the exemplary configuration will be omitted.

Also, it is preferable that the correspondence table registers many combinations and many patterns are generated according to the random numbers and transmitted/received through the communication path, in view of the tolerance against the pretending. There is a limit to the combinations, but it is possible to maintain the tolerance by copying the correspondence table constructed from new combinations from the contents center to the contents additional service inquiry server, regularly or occasionally.

Figure 30:
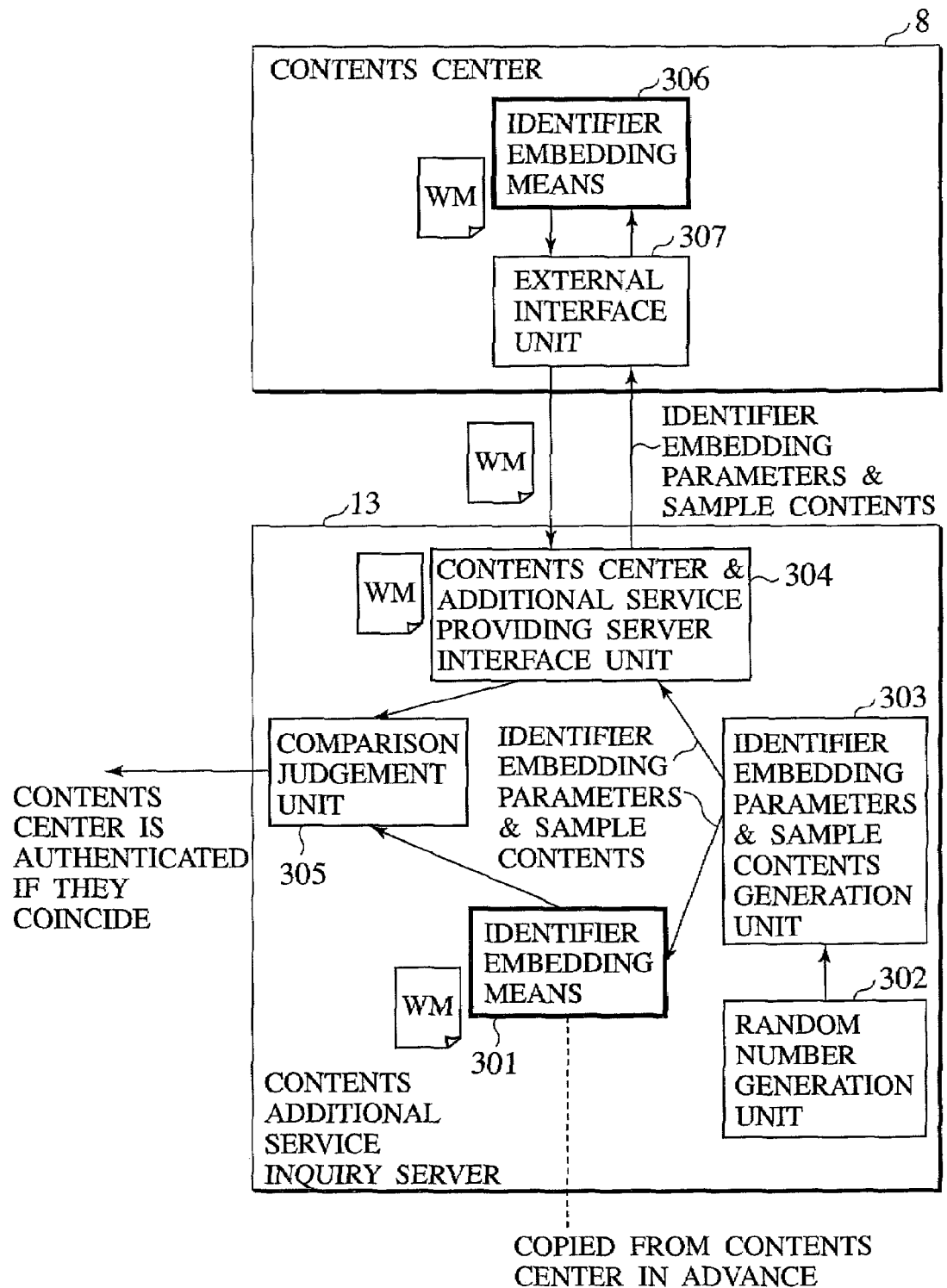
FIG. 30 is one example of an internal configuration of the contents center authentication system and a processing scheme in the case of (3a).

FIG. 30 shows the internal configuration and the processing scheme in the case of (3a). This scheme is the contents center authentication scheme that only utilizes the fact that only the genuine contents center 8 has the "identifier embedding means", unlike (1a).

In FIG. 30, in the contents additional service inquiry server 3, 301 is an identifier embedding means for storing the identifier embedding means received from the contents center 8 in advance and embedding the identifier into the sample contents, 302 is a random number generation unit for generating a random number to be used in generating the parameters of the identifier embedding means, 303 is an identifier embedding parameters and sample contents generation unit for generating the parameters of the identifier embedding means and the sample contents according to the generated random number, 304 is a contents center and additional service providing server interface unit for transmitting said generated parameters of the identifier embedding means and sample contents to the contents center 8 and receiving the sample contents after the identifier is embedded or the representative value such as its hash value, and 307 is a comparison judgement unit for comparing the sample contents after the identifier is embedded in the contents center 8 or the representative value such as its hash value with the sample contents after the identifier is embedded in the contents additional service inquiry server 3 or the representative value such as its hash value, and authenticating the contents center 8 if they coincide.

Also, in the contents center 8, 307 is an external interface unit for receiving said generated parameters of the identifier embedding means and sample contents from the contents additional service inquiry server 3 and transmitting the sample contents after the identifier is embedded or the representative value such as its hash value, and 306 is the identifier embedding means for embedding the identifier with respect to the sample contents according to these parameters.

Next, according to FIG. 30, the processing scheme of the contents center authentication system in the case of (3a) will be described.

First, the contents additional service inquiry server 3 receives the identifier embedding means 306 from the contents center 8 in advance, and stores it in the identifier embedding means 301.

In the case where the registration request for the additional service corresponding to the contents identifier is received from the registration source, the identifier embedding parameter generation unit 303 generates the parameters of the identifier embedding means 301 and the sample contents according to the random number generated by the random number generation unit 302. These parameters and sample contents are to be used in embedding the identifier by the identifier embedding means 301, while they are also transmitted to the contents center 8 through the contents center and additional service providing server interface unit 304.

At the contents center 8, the identifier is embedded by the identifier embedding means 306 according to these parameters and that sample contents received by the external interface unit 307, and the sample contents after the identifier embedding (WM) is transmitted to the contents additional service inquiry server 3 through the external interface unit 307.

At the contents additional service inquiry server 3, that sample contents received by the contents center and additional service providing server interface unit 304 is compared with the sample contents in which the identifier is embedded by the identifier embedding means 301 at the comparison judgement unit 307, and the contents center 8 is authenticated if they coincide.

Here, depending on the speed of the communication path between the contents additional service inquiry server 3 and the contents center 8, it is possible to consider the case where it is difficult to transmit/receive the contents, and in that case, it is possible to use a configuration that utilizes the representative value such as the hash value instead of the contents. In this configuration, there is a need to provide a hash value calculation means in the identifier embedding means, but it is the already existing means in the contents center 8 in many cases, so that there is no need to provide a separate means.

Also, the identifier embedding means is a thing that has property of being already managed at the contents center 8 such that it is not leaked to begin with, so that it automatically also has the tolerance against the leakage in the authentication, and there is no need to provide a separate means.

In addition, at the communication path, the identifier embedding parameters and the sample contents after the watermark embedding or the representative value such as its hash value are transmitted/received, but these are things that have properties that the identifier embedding means will not be decoded even if they are eavesdropped to begin with, so that it has the tolerance against the pretending in the authentication.

Also, these parameters have their contents changed at every occasion of transmission/reception utilizing the random number, so that it also has the tolerance against the pretending that eavesdrops and interrupts the communications without carrying out the decoding.

Figure 31:
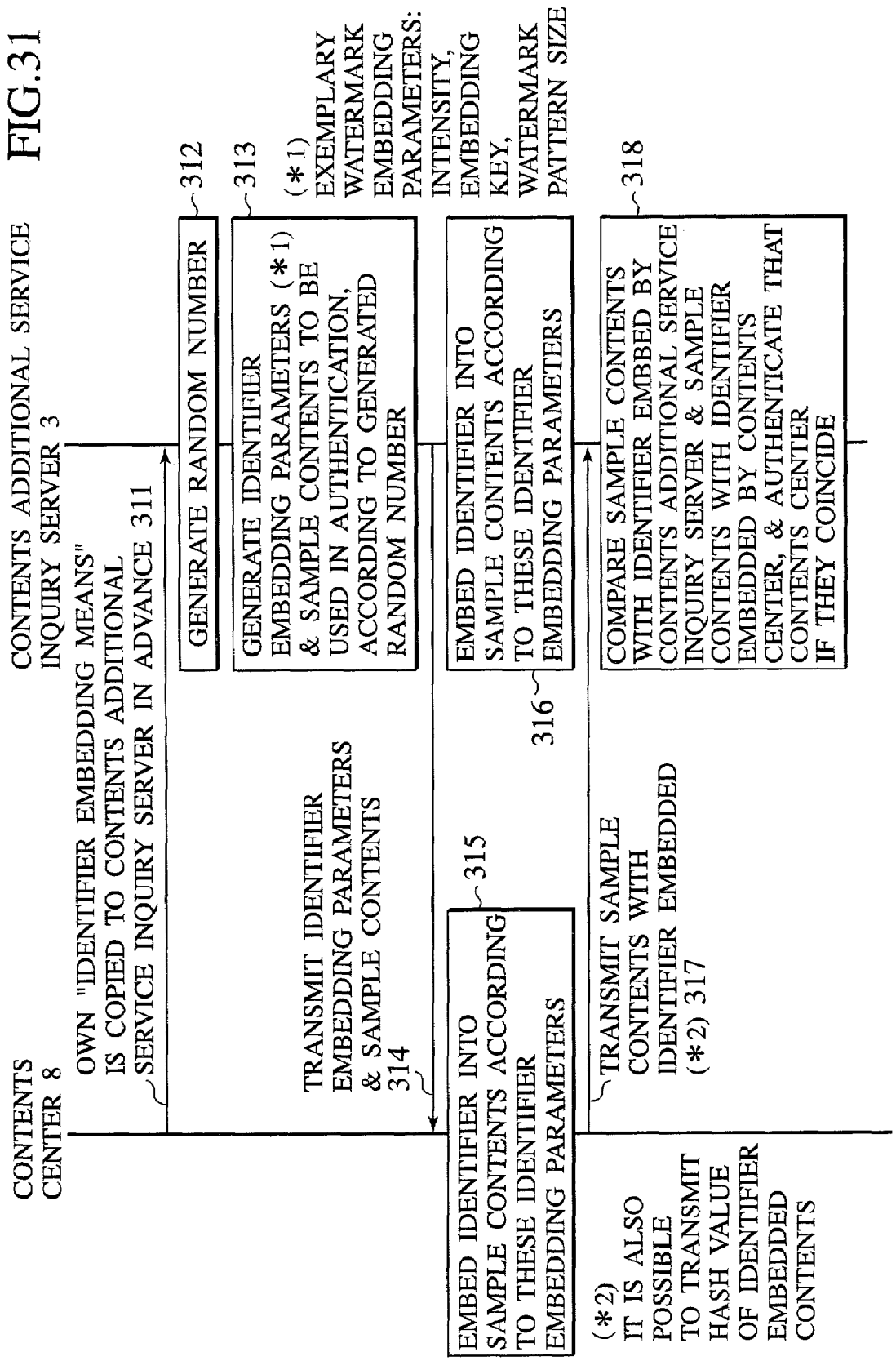
FIG. 31 is a processing sequence chart in the case of (3a).

FIG. 31 shows the processing sequence chart indicating what processing is carried out by each of the contents center 8 and the contents additional service inquiry server 3 in this case of (3a).

Next, according to FIG. 31, the processing sequence of the contents center authentication system in the case of (3a) will be described.

The contents center 8 copies the "identifier embedding means" possessed by itself to the contents additional service inquiry server 3 in advance (procedure 311). The contents additional service inquiry server 3 generates the random number (procedure 312), and generates the identifier embedding parameters and the sample contents to be used in the authentication according to that generated random number value (procedure 313). The concrete example of the identifier embedding parameters includes the watermark intensity, the watermark basic pattern size, the read out key, etc.

The contents additional service inquiry server 3 transmits the identifier embedding parameters and the sample contents to the contents center 8 (procedure 314), and the contents center 8 embeds the identifier into the sample contents according to these identifier parameters (procedure 315). Also at the contents additional service inquiry server 3, the identifier is embedded into the sample contents according to the identical parameters (procedure 316).

The contents center 8 transmits the sample contents for which the embedding of the identifier is finished to the contents additional service inquiry server 3 (procedure 317). The contents additional service inquiry server 3 carries out the comparison of that sample contents and the sample contents for which the embedding of the identifier is made by the contents additional service inquiry server 3, and authenticates that contents center 8 if they coincide (procedure 318). It is also possible to use a method in which the hash calculation is carried out with respect to the sample contents for which the embedding of the identifier is made, and the hash values are compared.

Figure 32:
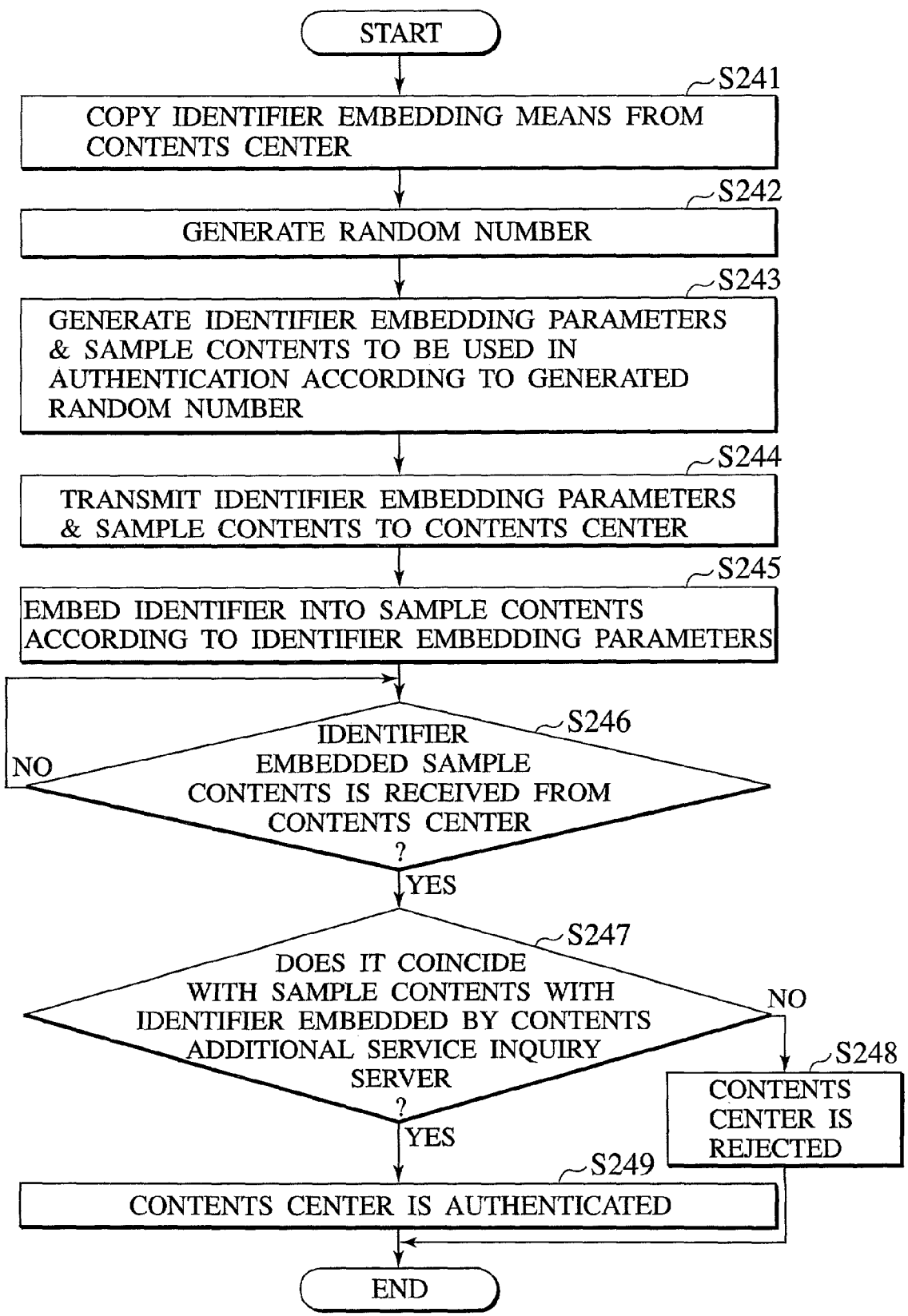
FIG. 32 is one example of a processing flow to be executed by the contents additional service inquiry server in FIG. 31.

FIG. 32 shows one example of the processing flow to be executed by the contents additional service inquiry server 3 in the case of (3a).

Next, according to FIG. 32, the processing to be executed by the contents additional service inquiry server 3 in the case of (3a) will be described.

First, the identifier embedding means is copied from the contents center 8 in advance (step S241). Next, the random number is generated (step S242), and the identifier embedding parameters and the sample contents to be used in the authentication are generated according to that generated random number value (step S243). The concrete example of the identifier embedding parameters includes the watermark intensity, the watermark basic pattern size, the read out key, etc.

The contents additional service inquiry server 3 transmits the identifier embedding parameters and the sample contents to the contents center 8 (step S244), embeds the identifier into the sample contents according to the identical parameters (step S245), and waits for receiving the sample contents for which the embedding of the identifier is finished from the contents center 8 (step S246).

When that sample contents is received, the comparison of that sample contents and the sample contents for which the embedding of the identifier is made by the contents additional service inquiry server 3 is carried out (step S247), and if they coincide, that contents center 8 is authenticated (step S249). If they do not coincide, that contents center 8 is rejected (step S248). It is also possible to use a method in which the hash calculation with respect to the sample contents for which the identifier embedding is made is carried out if the hash value is received instead of that sample contents, and the hash values are compared.

Figure 33:
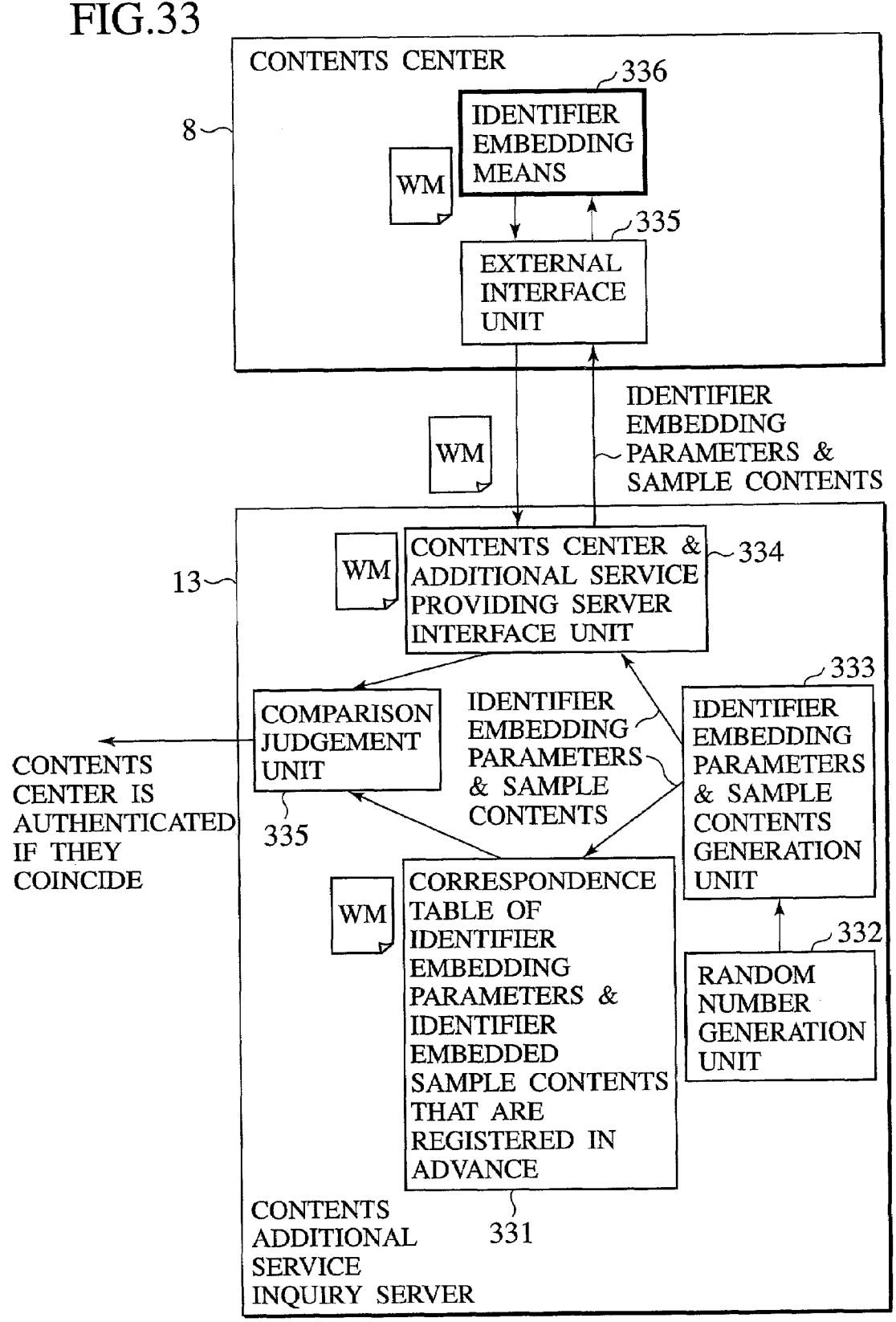
FIG. 33 is one example of an internal configuration of the contents center authentication system and a processing scheme in the case of (3b).

FIG. 33 shows the internal configuration and the processing scheme in the case of (3b). This scheme is the contents center authentication scheme in which the identifier embedded sample contents is generated in the contents additional service inquiry server 3 by looking up the correspondence table of the identifier embedding parameters and the identifier embedded sample contents that are registered from the contents center 8 in advance, in the case where the "identifier embedding means" identical to that of the contents center 8 cannot be possessed in the contents additional service inquiry server 3 unlike the scheme of (3a).

In FIG. 33, in the contents additional service inquiry server 3, 331 is a correspondence table of the parameter values and the sample contents after the embedding or the representative value such as its hash value in the case of carrying out the embedding of the identifier by changing the embedding parameters such as the embedding intensity to various values, 332 is a random number generation unit for generating a random number to be used in generating the identifier embedding parameters, 333 is an identifier embedding parameter generation unit for generating the identifier embedding parameters according to the generated random number, 334 is a contents center and additional service providing server interface unit, for transmitting said generated parameters of the identifier embedding means and sample contents to the contents center 8 and receiving the sample contents after the identifier is embedded or the representative value such as its hash value, and 335 is a comparison judgement unit for comparing the sample contents after the identifier is embedded in the contents center 8 or the representative value such as its hash value with the sample contents after the identifier embedding that is generated by using said correspondence table in the contents additional service inquiry server 3 or the representative value such as its hash value, and authenticating the contents center 8 if they coincide.

Also, in the contents center 8, 337 is an external interface unit for receiving said generated parameters of the identifier embedding means and sample contents from the contents additional service inquiry server 3 and transmitting the sample contents after the identifier is embedded or the representative value such as its hash value, and 336 is the identifier embedding means for embedding the identifier with respect to the sample contents according to these parameters.

Next, according to FIG. 33, the processing scheme of the contents center authentication system in the case of (3b) will be described.

First, the contents additional service inquiry server 3 receives and stores the correspondence table 331 of the parameter values and the sample contents after the embedding or the representative value such as its hash value in the case of carrying out the embedding of the identifier by changing the embedding parameters such as the embedding intensity to various values, from the contents center 8 in advance.

In the case where the registration request for the additional service corresponding to the contents identifier is received from the registration source, the identifier embedding parameter generation unit 333 generates the parameters of the identifier embedding means and the sample contents according to the random number generated by the random number generation unit 332. These parameters and sample contents are to be used in generating the sample contents after the embedding or the representative value such as its hash value by the correspondence table 331, while they are also transmitted to the contents center 8 through the contents center and additional service providing server interface unit 334.

At the contents center 8, the identifier is embedded by the identifier embedding means 336 according to these parameters and sample contents received by the external interface unit 337, and the sample contents after the identifier embedding (WM) is transmitted to the contents additional service inquiry server 3 through the external interface unit 337.

At the contents additional service inquiry server 3, that sample contents received by the contents center and additional service providing server interface unit 334 is compared with the sample contents after the embedding generated by the correspondence table 331 at the comparison judgement unit 335, and the contents center 8 is authenticated if they coincide.

Here, depending on the speed of the communication path between the contents additional service inquiry server 3 and the contents center 8, it is possible to consider the case where it is difficult to transmit/receive the contents, and in that case, it is possible to use a configuration that utilizes the representative value such as the hash value instead of the contents. In this configuration, there is a need to provide a hash value calculation means in the identifier embedding means, but it is the already existing means in the contents center 8 in many cases, so that there is no need to provide a separate means.

Also, the identifier embedding means is a thing that has property of being already managed at the contents center 8 such that it is not leaked to begin with, so that it automatically also has the tolerance against the leakage in the authentication, and there is no need to provide a separate means.

In addition, at the communication path, the identifier embedding parameters and the sample contents or the representative value such as the hash value are transmitted/received, but these are things that have properties that the identifier embedding means will not be decoded even if they are eavesdropped to begin with, so that it has the tolerance against the pretending in the authentication.

Also, these parameters have their contents changed at every occasion of transmission/reception utilizing the random number, so that it also has the tolerance against the pretending that eavesdrops and interrupts the communications without carrying out the decoding.

Figure 34:
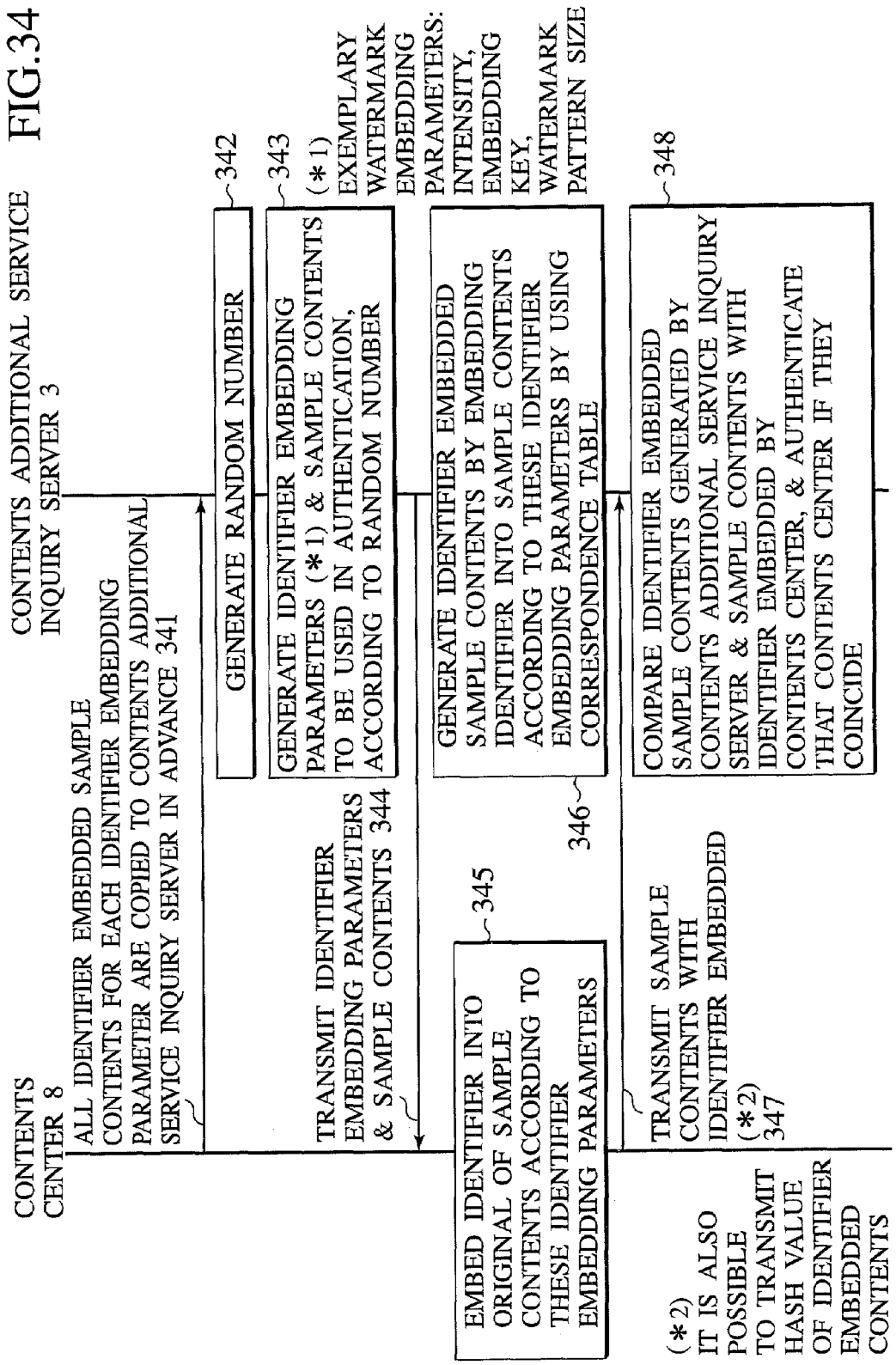
FIG. 34 is a processing sequence chart in the case of (3b).

FIG. 34 shows the processing sequence chart indicating what processing is carried out by each of the contents center 8 and the contents additional service inquiry server 3 in this case of (3b).

Next, according to FIG. 34, the processing sequence of the contents center authentication system in the case of (3b) will be described.

The contents center 8 copies the correspondence table of the identifier embedding parameters and the identifier embedded sample contents to the contents additional service inquiry server 3 in advance (procedure 341). The contents additional service inquiry server 3 generates a random number (procedure 342), and generates the identifier embedding parameters and the sample contents to be used in the authentication according to that generated random number value (procedure 343).

The concrete example of the identifier embedding parameters includes the watermark intensity, the watermark basic pattern size, and the read out key, etc.

The contents additional service inquiry server 3 transmits the identifier embedding parameters and the sample contents to the contents center 8 (procedure 344), and the contents center 8 embeds the identifier into the sample contents according to these identifier parameters (procedure 345). The contents additional service inquiry server 3 generates the identifier embedded contents in the case of embedding the identifier into the sample contents according to the identical parameters by using said correspondence table (procedure 346).

The contents center 8 transmits the sample contents for which the embedding of the identifier is finished to the contents additional service inquiry server 3 (procedure 347). The contents additional service inquiry server 3 carries out the comparison of that sample contents and the identifier embedded sample contents generated by the identical parameters, and authenticates that contents center 8 if they coincide (procedure 348). It is also possible to use a method in which the hash calculation is carried out with respect to the sample contents for which the embedding of the identifier is made, and the hash values are compared.

Figure 35:
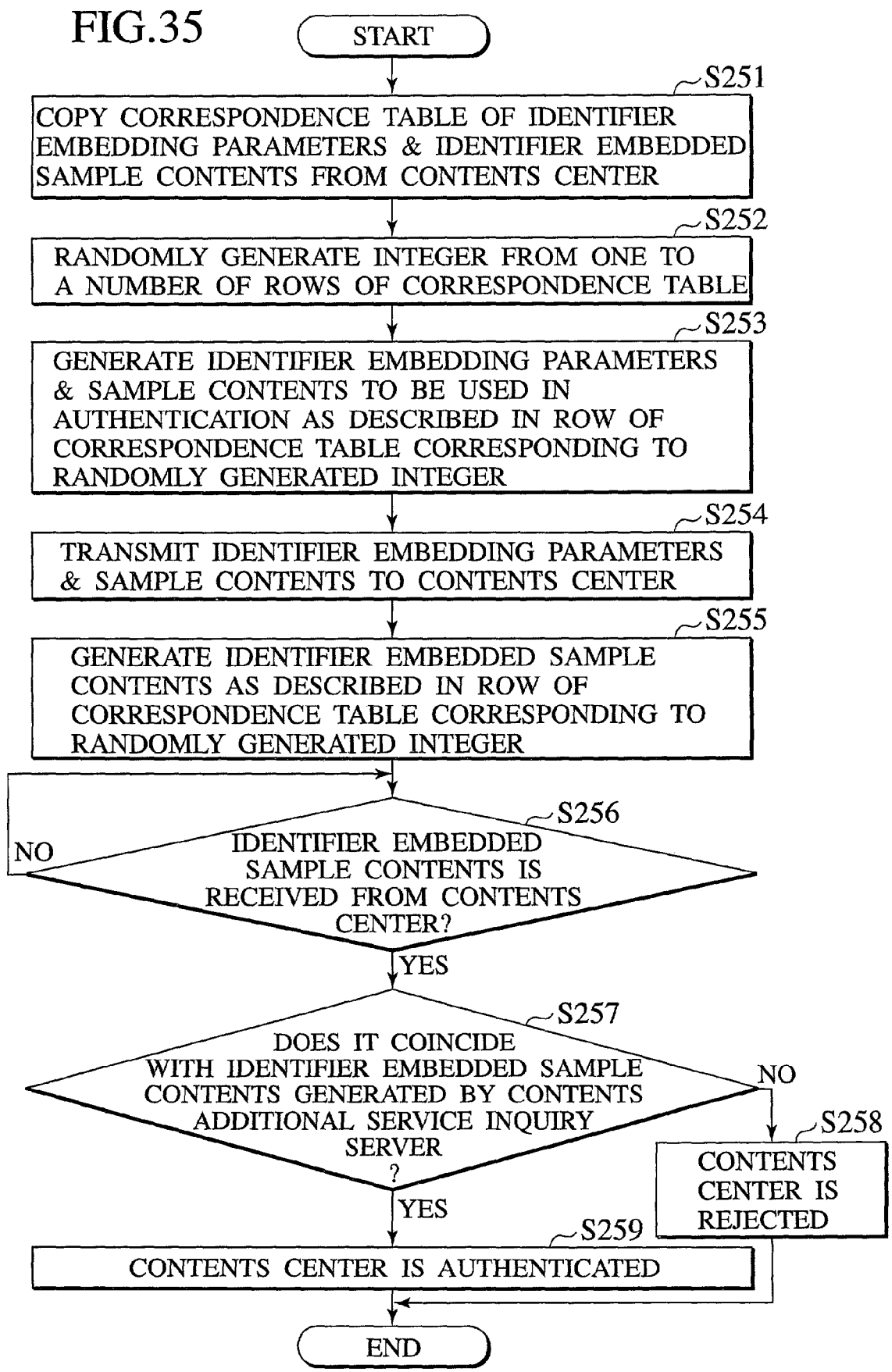
FIG. 35 is one example of a processing flow to be executed by the contents additional service inquiry server in FIG. 34.

FIG. 35 shows one example of the processing flow to be executed by the contents additional service inquiry server 3 in the case of (3b).

Next, according to FIG. 35, the processing to be executed by the contents additional service inquiry server 3 in the case of (3b) will be described.

First, the correspondence table of the identifier embedding parameters and the identifier embedded sample contents is copied from the contents center 8 in advance (step S251). Next, the integer from 1 to the number of rows of the correspondence table is randomly generated (step S252), and the identifier embedding parameters and the sample contents to be used in the authentication as described in the row of the correspondence table corresponding to that randomly generated integer are generated (step S253). The concrete example of the identifier embedding parameters includes the watermark intensity, the watermark basic pattern size, the read out key, etc.

The contents additional service inquiry server 3 transmits the identifier embedding parameters and the sample contents to the contents center 8 (step S254), generates the identifier embedded sample contents as described in the row of the correspondence table corresponding to that randomly generated integer (step S255), and waits for receiving the sample contents for which the embedding of the identifier is finished from the contents center 8 (step S256).

When that sample contents is received, the comparison of that sample contents and the identifier embedded sample contents generated by the contents additional service inquiry server 3 is carried out (step S257), and if they coincide, that contents center 8 is authenticated (step S259). If they do not coincide, that contents center 8 is rejected (step S258). It is also possible to use a method in which the hash calculation with respect to the sample contents generated by the contents additional service inquiry server 3 is carried out if the hash value is received instead of that sample contents, and the hash values are compared.

FIG. 36 shows an exemplary configuration of this correspondence table. The correspondence table has a format of a list of the corresponding watermark embedded sample contents for each combination of parameters such as the watermark intensity, the watermark basic pattern size, and the read out key, as shown in this figure. In the correspondence table shown in FIG. 36, regarding the contents, it is a file name that indicates the location of the contents, and the entity of the sample contents uses the separate file management, but it is also possible to directly write the representative value such as the hash value into the correspondence table instead.

Also, it is preferable that the correspondence table registers many combinations and many patterns are generated according to the random numbers and transmitted/received through the communication path, in view of the tolerance against the pretending. There is a limit to the combinations, but it is possible to maintain the tolerance by copying the correspondence table constructed from new combinations from the contents center to the contents additional service inquiry server, regularly or occasionally.

As described above, according to the present invention, the contents identifier embedded into the contents in advance is read out at the user terminal, and the inquiry of the available additional service is made with respect to the server that carries out the inquiry of the additional services by using that, so that it becomes possible to select the available additional service regardless of the distribution route by which the user obtained the contents, and it becomes possible to make a connection to the server that provides that additional service.

Then, on the server that carries out the inquiry of the additional services in advance, the additional services by the contents holder and the additional services by the third parties are recorded by distinguishing them, so that it becomes possible for the user side to identify whether the server that provides that additional service is one that is operated by the contents center that has delivered the contents or one that is operated by the third party.

In addition, in the contents center authentication system in which any of the above described six kinds of means is equipped, as the means for recognizing whether the registration source of the additional service related to the contents is really the contents center of that contents or not, the original of contents before the identifier embedding and the identifier embedding means of the contents center that originally embedded the identifier into that contents are utilized, so that no separate means is necessary, and it has the tolerance against the pretending because that contents and that means that cannot be decoded even when the communication path is eavesdropped and that can only be known by the contents center to begin with are utilized.

The invention claimed is:

1. A contents additional service inquiry server for receiving inquiries for additional services provided by a contents center and a third-party contents additional service providing server from a user, comprising:

means for receiving a registration request from the contents center or the third-party contents additional service providing server which specifies a contents identifier that uniquely identifies contents in clear distinction from any other contents and which is embedded into the contents solely by the contents center before distribution of the contents, the registration request also requesting registration of registration request information including additional service information regarding each additional service that can be provided with respect to the contents having the contents identifier and provider location information regarding a location of a respective provider of said each additional service, means for authenticating whether said contents center is a delivery source of the contents having the contents identifier specified by said registration request only when said registration request is issued by said contents center, means for storing the registration request information received by said means for receiving, in correspondence to the contents identifier, such that registration request information registered by said contents center and registration request information registered by said third-party contents additional service providing server are separately stored in clear distinction from each other, and means for searching and returning said registration request information specified by the contents identifier when an inquiry request for the additional service that specifies the contents identifier is issued by the user, by uniquely identifying the registration request information corresponding to the contents identifier specified by the inquiry request, wherein the registration request information registered by the contents center and the registration request information registered by the third-party contents additional service providing server are separately presented in clear distinction from each other.

2. The contents additional service inquiry server as described in claim 1, wherein said means for authenticating comprises:

means for receiving an identifier embedding means and original contents from said contents center, means for generating parameters for the identifier embedding means, means for embedding the contents identifier into said original contents according to the parameters, wherein the parameters are also used by said contents center in embedding the contents identifier in said original contents, and means for comparing contents after the identifier is embedded by said contents center and contents after the contents identifier is embedded by the contents additional service inquiry server, or comparing representative values of contents after the contents identifier is embedded by said contents center and contents after the contents identifier is embedded by the contents additional service inquiry server.

3. The contents additional service inquiry server as described in claim 1, wherein said means for authenticating comprises:

means for receiving a correspondence table of parameter values and contents with embedded contents identifier for the original contents, from the contents center, means for generating parameters for an identifier embedding means, means for looking up the contents with embedded contents identifier from said correspondence table using the parameters, wherein the parameters are also used by said contents center in embedding the contents identifier in said original contents, and means for comparing contents after the contents identifier is embedded by said contents center and contents with embedded contents identifier looked up from said correspondence table by the contents additional service inquiry server, or comparing representative values of contents after the identifier is embedded by said contents center and contents with embedded contents identifier looked up from said correspondence table by the contents additional service inquiry server.

4. The contents additional service inquiry server as described in claim 1, wherein said means for authenticating comprises:

means for receiving original contents from said contents center, means for generating a calculation formula for a representative value of the original contents, means for calculating the representative value with respect to said original contents according to the calculation formula, wherein the calculation formula is also used by said contents center in calculating the representative value of the contents, and means for comparing the representative value of the original of contents calculated by said contents center and the representative value of the original contents calculated by the contents additional service inquiry server.

5. The contents additional service inquiry server as described in claim 1, wherein said means for authenticating comprises:

means for receiving a correspondence table of representative values and representative value calculation formula from the contents center, means for generating a calculation formula for a representative value for original contents, means for looking up the representative value from said correspondence table according to the calculation formula, wherein the calculation formula is also used by said contents center in calculating the representative value of the original contents, and means for comparing the representative value of the original contents calculated by said contents center and the representative value of the original contents that is looked up from said correspondence table by the contents additional service inquiry server.

6. The contents additional service inquiry server as described in claim 1, wherein said means for authenticating comprises:

means for receiving identifier embedding means from said contents center, means for generating parameters of said identifier embedding means and sample contents for the authentication, means for embedding a contents identifier with respect to said sample contents using the parameters, wherein the parameters are also used by said contents center to embed the contents identifier with respect to said sample contents, and means for comparing the sample contents after the contents identifier is embedded by said contents center and the sample contents after the contents identifier is embedded by the contents additional service inquiry server, or comparing representative values of the sample contents after the contents identifier is embedded by said contents center and the sample contents after the contents identifier is embedded by the contents additional service inquiry server.

7. The contents additional service inquiry server as described in claim 1, wherein said means for authenticating comprises:

means for receiving a correspondence table of contents with an embedded identifier, embedding parameter values, and sample contents, from said contents center, means for generating parameters for an identifier embedding means and sample contents for the authentication, means for looking up the contents with the embedded identifier in the case of embedding the identifier with respect to the sample contents from said correspondence table according to the parameters, wherein the parameters are also used by said contents center in embedding the contents identifier with respect to said sample contents, and means for comparing the sample contents after the contents identifier is embedded by said contents center and the sample contents with the embedded contents identifier that is looked up from said correspondence table by the contents additional service inquiry server, or comparing representative values of the sample contents after the contents identifier is embedded by said contents center and the sample contents with embedded contents identifier that is looked up from said correspondence table by the contents additional service inquiry server.

8. A contents additional service inquiry server processing program embedded in a computer-readable storage medium for causing a computer-implemental method realizing the contents additional service inquiry server, as described in claim 1.

9. A computer-readable storage medium having computer-executable instructions for causing a computer to function as a contents additional service inquiry server processing program for receiving inquires for additional services provided by a contents center and a third-party contents additional service providing server from a user, the instructions comprising:

instructions for causing said computer to receive a registration request from the contents center or the third-party contents additional service providing server which specifies a contents identifier that uniquely identifies contents in clear distinction from any other contents and which is embedded into the contents solely by the contents center before distribution of the contents, the registration request also requiring registration of registration request information including additional service information regarding each additional service that can be provided with respect to the contents having the contents identifier and provider location information regarding a location of a respective provider of said each additional service;

instructions for causing said computer to authenticate whether said contents center is a delivery source of the contents having the contents identifier specified by said registration request only when said registration request is issued by said contents center;

instructions for causing said computer to store the registration request information, in correspondence to the contents identifier, such that registration request information registered by said contents center and registration request information registered by said third-party contents additional service providing server are separately stored in clear distinction from each other, and instructions for causing said computer to search and return said registration request information specified by the contents identifier when an inquiry request for the additional service that specifies the contents identifier is issued by the user, by uniquely identifying the registration request information corresponding to the contents identifier specified by the inquiry request, wherein the registration request information registered by the contents center and the registration request information registered by the third-party contents additional service providing server are separately presented in clear distinction from each other.

10. A contents additional service providing system comprising:

a contents center for delivering contents to a user terminal and providing a prescribed additional service with respect to the contents, a third-party contents additional service providing server for providing additional services with respect to the contents, and a contents additional service inquiry server for receiving inquiries for additional services for the contents provided by said contents center and said third-party contents additional service providing server from a user, wherein said contents additional service inquiry server comprises:

means for receiving a registration request from the contents center or the third-party contents additional service providing server which specifies a contents identifier that uniquely identifies the contents in clear distinction from any other contents and which is embedded into the contents solely by the contents center before distribution of the contents, the registration request also requesting registration of registration request information including additional service information regarding each additional service that can be provided with respect to the contents having the contents identifier and provider location information regarding a location of a respective provider of said each additional service, means for authenticating whether said contents center is a delivery source of the contents having the contents identifier specified by said registration request only when said registration request is issued by said contents center, means for storing the registration request information received by said means for receiving, in correspondence to the contents identifier, such that registration request information registered by said contents center and registration request information registered by said third-party contents additional service providing server are separately stored in clear distinction from each other, and means for searching and returning said registration request information specified by the contents identifier when an inquiry request for the additional service that specifies the contents identifier is issued by the user, by uniquely identifying the registration request information corresponding to the contents identifier specified by the inquiry request, wherein the registration request information registered by the contents center and the registration request information registered by the third-party contents additional service providing server are separately presented in clear distinction from each other.

11. The contents additional service providing system as described in claim 10, wherein said contents center inserts the contents identifier into the contents to be delivered, and registers information for an additional service provided by the contents center and location information of the contents center into said contents additional service inquiry server in correspondence with the contents identifier inserted into the contents.

12. The contents additional service providing system as described in claim 11 wherein said contents center inserts the contents identifier into the contents to be delivered by embedding the contents identifier into the contents to be delivered using an electronic watermark.

13. The contents additional service providing system as described in claim 11 wherein said contents center inserts the contents identifier into the contents to be delivered by recording the contents identifier in a contents header.

14. The contents additional service providing system as described in claim 11 wherein said contents center inserts the contents identifier into the contents to be delivered by writing the contents identifier in superposition to the contents to be delivered using a visible electronic watermark.

15. The contents additional service providing system as described in claim 10, wherein the contents additional service providing system further comprises a resolution server for managing a correspondence relationship of the contents identifier and the location information of said contents additional service inquiry server, and said contents center registers a correspondence relationship of the contents identifier inserted into the contents and the location information of said contents additional service inquiry server into said resolution server.

16. The contents additional service providing system as described in claim 10, wherein said user terminal reads out the contents identifier inserted in the delivered contents, acquires the information for the additional service that can be provided with respect to the delivered contents and the location information of its provider by making an inquiry to said contents additional service inquiry server by specifying the read out contents identifier, such that registration requests provided by said contents center and registration requests provided by said contents additional service providing server are distinguished, and outputs the acquired information for the additional service that can be provided such that registration requests provided by said contents center and registration requests provided by said contents additional service providing server are separately presented.

17. The contents additional service providing system as described in claim 10, wherein the contents additional service providing system further comprises a resolution server for managing a correspondence relationship of the contents identifier and the location information of said contents additional service inquiry server, and said user terminal reads out the contents identifier inserted in the delivered contents, and acquires the location information of said contents additional service inquiry server by making an inquiry to said resolution server by specifying the read out contents identifier.

18. The contents additional service providing system as described in claim 10, wherein said contents additional service providing server registers information for an additional service provided by that contents additional service providing server and location information for the contents additional service providing server at said contents additional service inquiry server in correspondence with the contents identifier for the contents for which the additional service is provided.

* * * * *